US011805724B2

(12) United States Patent
Corelli et al.

(10) Patent No.: US 11,805,724 B2
(45) Date of Patent: Nov. 7, 2023

(54) PLANTERS FOR PLANTING SEEDS IN FIELDS, AND RELATED METHODS OF PLANTING

(71) Applicant: Monsanto Technology LLC, St. Louis, MO (US)

(72) Inventors: Christopher Louis Corelli, St. Louis, MO (US); Timothy Edward Reitz, St. Louis, MO (US); Andrew D. Thielen, Scranton, IA (US); Roger A. Weyhrich, Boone, IA (US); Charles Wolfersberger, Ferguson, MO (US)

(73) Assignee: Monsanto Technology LLC, St. Louis, MO (US)

( * ) Notice: Subject to any disclaimer, the term of this patent is extended or adjusted under 35 U.S.C. 154(b) by 413 days.

(21) Appl. No.: 16/849,721

(22) Filed: Apr. 15, 2020

(65) Prior Publication Data

US 2020/0329629 A1 Oct. 22, 2020

Related U.S. Application Data

(60) Provisional application No. 62/835,334, filed on Apr. 17, 2019.

(51) Int. Cl.
*A01C 7/10* (2006.01)
*A01C 7/16* (2006.01)
*A01C 7/20* (2006.01)

(52) U.S. Cl.
CPC ............... *A01C 7/102* (2013.01); *A01C 7/16* (2013.01); *A01C 7/203* (2013.01)

(58) Field of Classification Search
CPC .. A01C 7/102; A01C 7/16; A01C 7/10; A01C 7/08; A01C 7/00; A01C 7/203; A01C 7/201; A01C 7/20
See application file for complete search history.

(56) References Cited

U.S. PATENT DOCUMENTS

| 4,407,371 A | 10/1983 | Hohl |
| 4,771,713 A | 9/1988 | Kinzenbaw |
| 5,170,730 A | 12/1992 | Swallow |
| 5,205,228 A | 4/1993 | Mitchell |

(Continued)

FOREIGN PATENT DOCUMENTS

| CL | 1085-06 | 5/2006 |
| DE | 1457765 U | 12/1969 |

(Continued)

*Primary Examiner* — Christopher J. Novosad
(74) *Attorney, Agent, or Firm* — Harness, Dickey & Pierce, P.L.C.

(57) ABSTRACT

A planter comprises an automated planting unit for planting plots of seeds in a field. The planting unit includes a first seed storage unit configured to provide seeds to the planting unit and a second seed storage unit configured to provide seeds to the planting unit. The planting unit also includes a seed meter configured to plant seeds from the first seed storage unit and the second seed storage unit in a field, and a diverter unit coupled to the first and second seed storage units and to the seed meter. The diverter, then, is configured to selectively direct seeds from either the first seed storage unit or the second seed storage unit to the seed meter, whereby the seeds from the first and second seed storage units may be planted separately or together (e.g., for mixed planting, etc.).

21 Claims, 45 Drawing Sheets

(56) References Cited

U.S. PATENT DOCUMENTS

| | | |
|---|---|---|
| 5,535,917 A | 7/1996 | Ribouleau |
| 5,913,915 A | 6/1999 | McQuinn |
| 5,915,313 A | 6/1999 | Bender et al. |
| 6,070,538 A | 6/2000 | Flamme et al. |
| 6,474,500 B1 | 11/2002 | Carr et al. |
| 6,615,754 B2 | 9/2003 | Unruh et al. |
| 6,672,228 B1 | 1/2004 | Groelz et al. |
| 7,174,839 B2 | 2/2007 | Tsing |
| 7,673,572 B2 | 3/2010 | Deppermann et al. |
| 7,775,167 B2 | 8/2010 | Stehling et al. |
| 9,635,799 B2 | 5/2017 | Hundley et al. |
| 10,159,176 B2 | 12/2018 | Baitinger et al. |
| 2002/0062771 A1 | 5/2002 | Unruh et al. |
| 2006/0243179 A1 | 11/2006 | Landphair |
| 2014/0165890 A1 | 6/2014 | Graham |
| 2015/0351314 A1* | 12/2015 | Sauder ............... A01C 21/005 700/275 |
| 2016/0050842 A1 | 2/2016 | Sauder et al. |
| 2016/0095274 A1 | 4/2016 | Wendte et al. |
| 2016/0143212 A1 | 5/2016 | Wendte et al. |
| 2016/0302353 A1 | 10/2016 | Wendte et al. |
| 2017/0086351 A1 | 3/2017 | Garner et al. |
| 2018/0000009 A1 | 1/2018 | Baitinger et al. |
| 2018/0317375 A1 | 11/2018 | Weis et al. |
| 2019/0075719 A1 | 3/2019 | Schoeny et al. |

FOREIGN PATENT DOCUMENTS

| | | |
|---|---|---|
| DE | 3917438 C1 | 10/1990 |
| DE | 29718303 U1 | 1/1998 |
| EP | 0636305 B1 | 11/1998 |
| EP | 3409089 A1 | 12/2018 |
| WO | WO-2006121973 A2 | 11/2006 |
| WO | WO-2016118277 A1 | 7/2016 |
| WO | WO-2016200825 A1 | 12/2016 |

\* cited by examiner

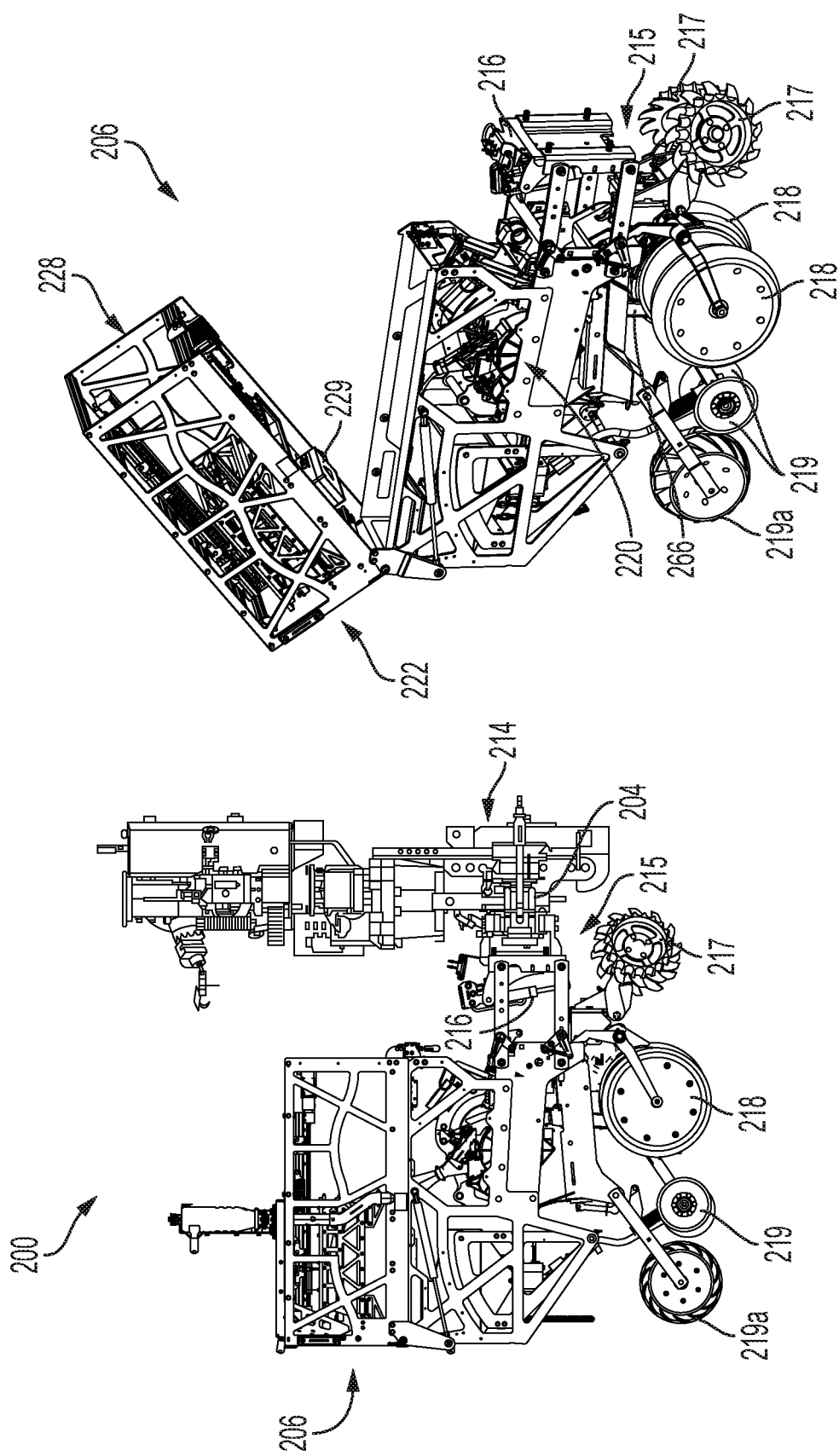

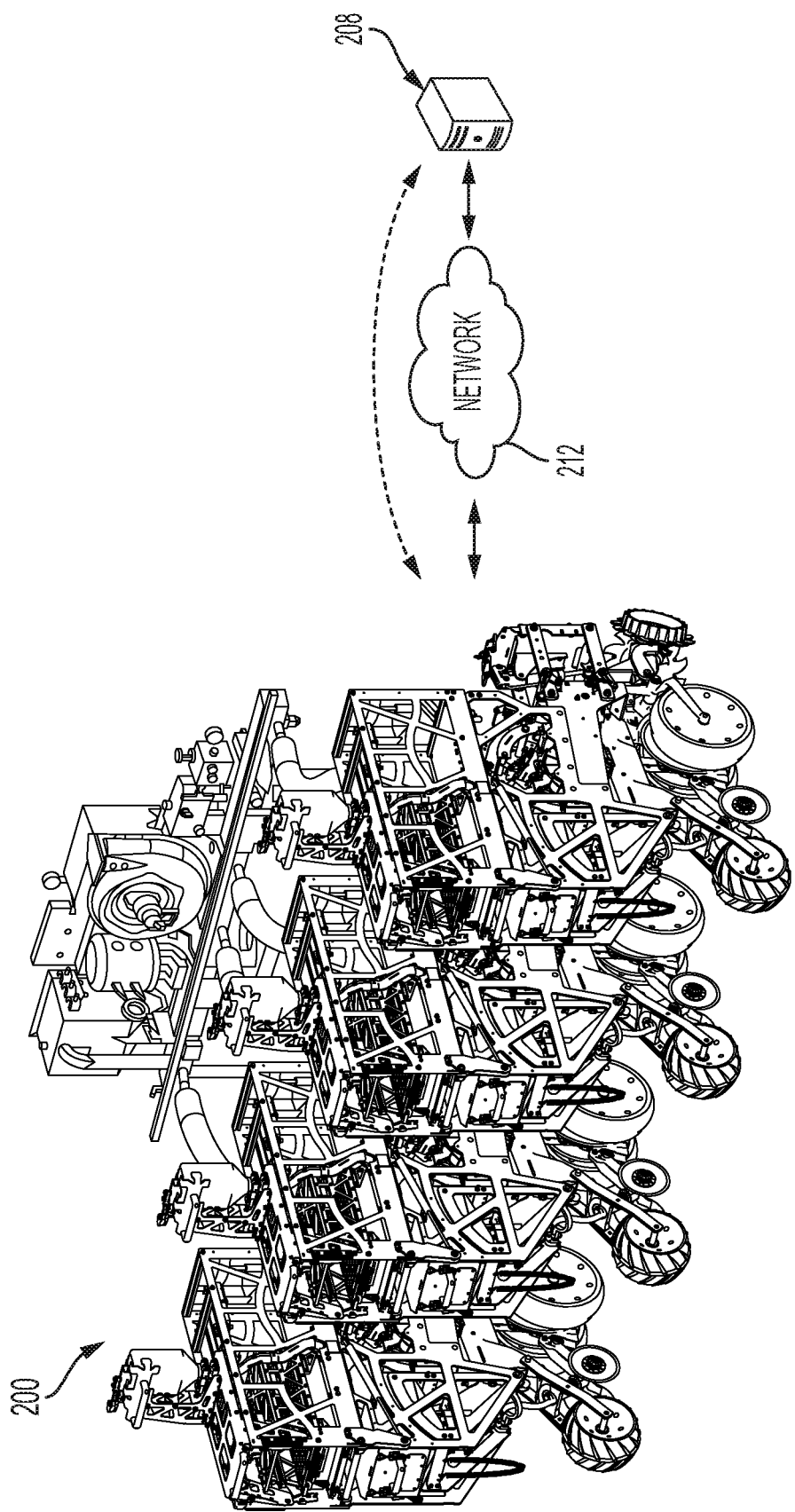

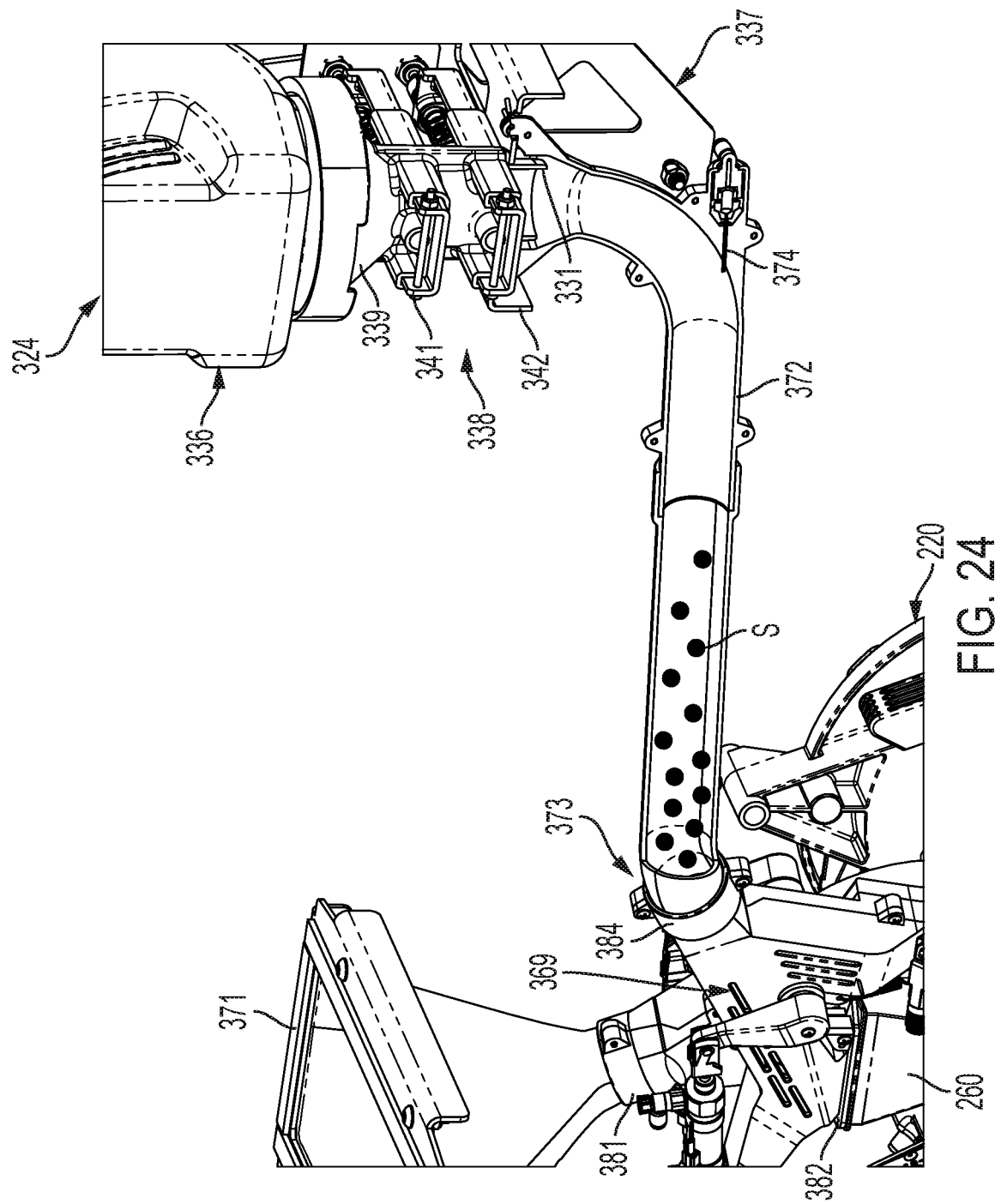

PLANTERS FOR PLANTING SEEDS IN FIELDS, AND RELATED METHODS OF PLANTING

CROSS-REFERENCE TO RELATED APPLICATION

This application claims the benefit of, and priority to, U.S. Provisional Application No. 62/835,334, filed on Apr. 17, 2019. The entire disclosure of the above application is incorporated herein by reference.

FIELD

The present disclosure generally relates to planters and to related methods of planting seeds.

BACKGROUND

This section provides background information related to the present disclosure which is not necessarily prior art.

Plant researchers often cultivate thousands or tens of thousands of small plots of numerous different types of seeds in order to test/analyze different genotypic and/or phenotypic traits of the seeds and/or selected treatments applied thereto. In so doing, fields can comprise multiple such plots, and each of the plots may be planted with different types of the seeds (in multiple different passes through the fields by planters). As an example, a plant researcher may plant, using a planter, a first plot in a given field with a first type of seeds in order to test/analyze the seeds. The plant researcher may then change the seed type at the planter to a second type of seeds and proceed in the field to plant the second type of seeds in order to test/analyze the seeds. In some instances, filler seeds, not intended to be tested by the plant researcher, may also be planted in the field (in still another pass through the filed by the planter), around the test plots of the first and second types of seeds, to provide a buffer between the different ones of the test plots in the field.

SUMMARY

This section provides a general summary of the disclosure, and is not a comprehensive disclosure of its full scope or all of its features.

Example embodiments of the present disclosure generally relate to planting units for planting plots of seeds in fields. In one such example embodiment, the planting unit is associated with a first seed storage unit configured to provide seeds to the planting unit and a second seed storage unit configured to provide seeds to the planting unit. The planting unit also includes a seed meter configured to plant seeds from the first seed storage unit and the second seed storage unit in a field, and a diverter unit coupled to the seed meter. The diverter, then, is configured to selectively direct seeds from the first seed storage unit and the second seed storage unit to the seed meter.

In another such example embodiment, a planter for planting multiple rows of seeds in a field includes multiple ones of the planting units.

Example embodiments of the present disclosure also generally relate to methods of planting seeds in fields using automated planting units. One example method includes delivering a first set of seeds from a seed storage unit to a seed meter of the planting unit through a diverter, along a first flow path of the diverter; dispensing one or more of the first set of seeds from the seed meter to the field; moving a gate of the diverter to block the first flow path; and delivering a second set of seeds from the seed storage unit to either the seed meter or a planting tube of the planting unit through the diverter, along a second flow path of the diverter, and dispensing one or more of said second set of seeds to the field.

Another example method is directed toward planting seeds in a field (e.g., mixed plots of seeds, etc.) using an automated planting unit. This example method includes delivering a first set of seeds to a seed meter of the planting unit (e.g., from a seed storage unit, etc.) through a diverter coupled to the seed meter, along a first flow path of the diverter; moving a gate of the diverter to block the first flow path; delivering a second set of seeds to the seed meter (e.g., from the same seed storage unit, from another seed storage unit, etc.) through the diverter, along a second flow path of the diverter; and dispensing one or more of said first and second sets of seeds to the field (e.g., as a mixed combination of the first and second sets of seeds, etc.).

Further, example embodiments of the present disclosure generally relate to diverters for use in planting units for planting seeds in fields. In one such example embodiment, a diverter includes a housing, a first port configured to receive seeds into the housing from a seed storage unit associated with the planting unit, a second port in fluid communication with the first port along a pathway defined by the housing where the second port is configured to deliver seeds out of the housing to a seed meter of the planting unit, and a third port in fluid communication with the first port along the pathway where the third port is configured to deliver seeds out of the housing to either the seed meter or a planting tube of the planting unit. The diverter unit also includes a gate disposed within the housing along the pathway, wherein the gate is configured to move relative to the housing to selectively block either the second port or the third port and whereby the seeds received into the housing through the first port are able to flow through the housing along the pathway to either the second port or the third port based on a position of the gate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a side elevation view of the planter of FIG. 2;

FIG. 5 is a fragmentary perspective view of a planting unit of the planter of FIG. 2, with a second seed storage unit removed therefrom;

FIG. 21 is a block diagram of an example relationship between the planter of FIG. 2 and a control system suitable for use therewith;

FIGS. 23-24 are fragmentary perspective views of the second seed storage unit and the diverter of FIG. 22;

Corresponding reference numerals indicate corresponding parts throughout the several views of the drawings.

DETAILED DESCRIPTION

Figure 1:
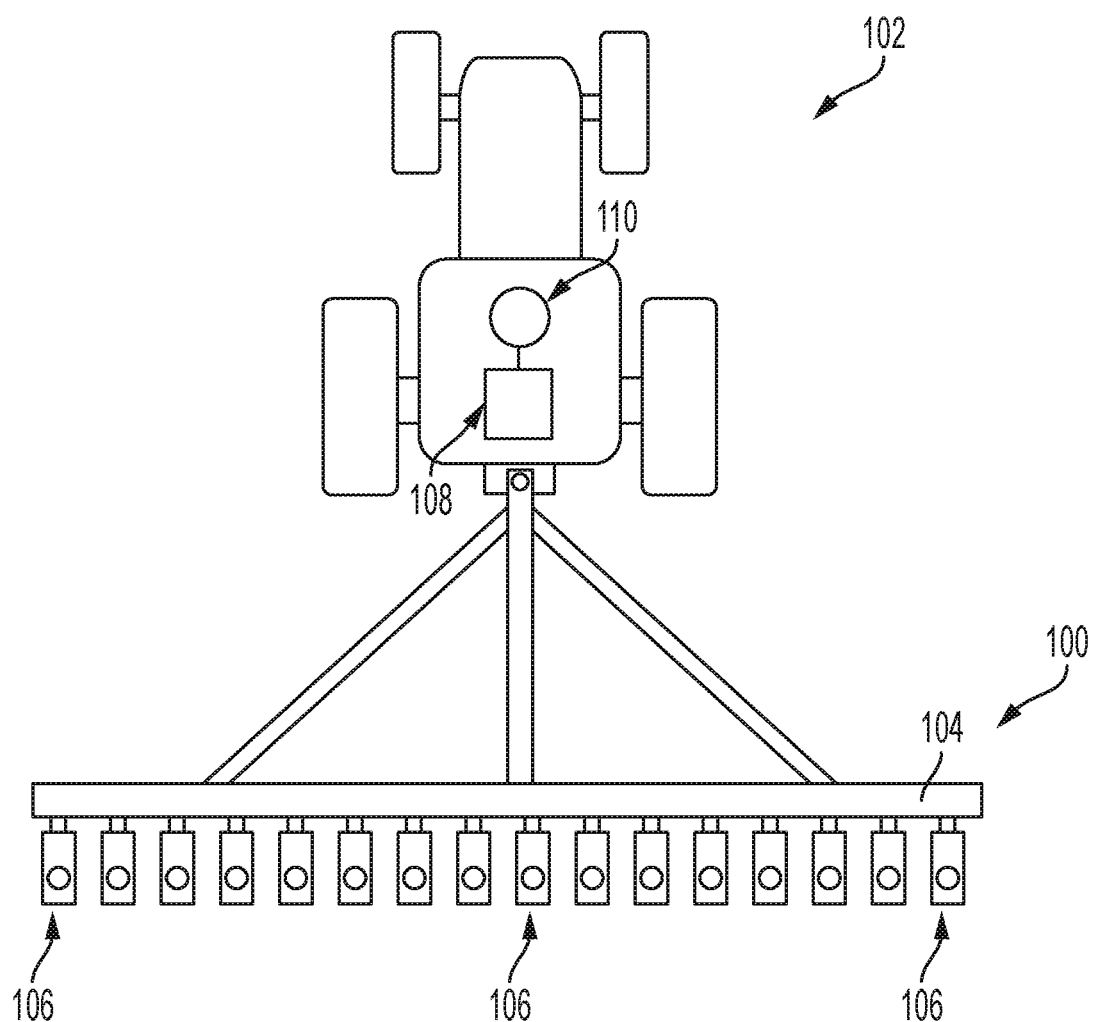
FIG. 1 is a schematic view of an example embodiment of a planter including one or more aspects of the present disclosure and configured to plant seeds in a field.

In cassette planting systems (e.g., in systems that use electronically-mapped (or indexed), multi-population seed containers, etc.), planters are often operated, in accordance with predefined planting plans, to plant relatively small numbers of seeds from cassette storage units (or other seed storage units in which different types of seeds are still separately stored and indexed so that a particular location of the different types of seeds in the storage units is known (e.g., other seed storage units not necessarily requiring use of cassettes, etc.)) into relatively small plots in the fields (e.g., 15 to 30 plants (or more) per plot in strips ranging from about ten feet all the way up to a few hundred feet (e.g., for testing purposes, etc.), etc.) in order to test/analyze different genotypic and/or phenotypic traits of the seeds and/or selected treatments applied thereto. In certain circumstances, it may be desired to plant other seeds between and/or around the smaller plots (e.g., as buffers on the borders of the smaller plots, in alleys within and/or between the smaller plots, etc.). Such other seeds may include any desired seeds, for example, and without limitation, filler seeds that are not intended for testing, seeds that are intended to be tested for aspects other than the seeds in the smaller plots, seeds that are not in competition with the seeds in the smaller plots, seeds that are to be utilized for other purposes (e.g., erosion control, refuge, breaks, etc.), seeds that already have a predictable and/or proven performance record, etc. Typically, such other seeds are also included in the cassette storage units, or such other seeds may be planted in subsequent operations of the planter (e.g., after refilling the cassette storage units with the other seeds, etc.). As can be appreciated, in the former, maintaining the other seeds in the cassette storage units may use up substantial space with the seeds, leaving minimal/reduced space for the seeds actually intended for testing. And, in the later, the subsequent planting may inadvertently overlap on the smaller plots previously planted (potentially contaminating the plots with the other seeds) and/or may involve substantial additional time to perform/complete.

To accomplish such planting of seeds from the cassette storage units, the planters often include seed meters configured to dispense desired seeds from the cassette storage units into furrows created by the planters in the fields (e.g., in desired quantities, at desired rates, at desired spacing, etc.) (see, e.g., Applicant's co-owned U.S. Pat. No. 10,159,176, the entire disclosure of which is incorporated herein by reference). And, the seed meters typically include chambers for use in receiving the seeds into the seed meters (e.g., staging chambers, etc. to allow for quick planting of multiple different types of seeds received from the cassette storage units; etc.), chambers for use in planting the received seeds in the fields (e.g., planting chambers or metering chambers, etc.), and then chambers for use in emptying excess seeds from the seed meters when planting is complete for the given seeds (e.g., evacuation chambers, etc.).

In example embodiments of the systems and methods of the present disclosure, desired seeds for planting may uniquely be obtained either from the cassette storage units (broadly, first seed storage units) onboard the planters (or otherwise traveling with the planters and/or accessible to the planters) or from bulk storage units (broadly, second seed storage units) also onboard the planters (or otherwise traveling with the planters and/or accessible to the planters). In connection therewith, the cassette storage units of the planters include multiple cells of different types of seeds, for example, intended to be tested by plant researchers, etc. And, the bulk storage units then include additional seeds, for example, for planting between, around, etc. rows/plots of the seeds planted from the cassette storage units. As can be appreciated, by maintaining the additional seeds in the bulk storage units, apart from the seeds in the cassette storage units, no space is used up and/or wasted in the cassette storage units on the additional seeds, while the additional seeds are still available at the planter for planting. It should be appreciated that reference to the cassette storage units and the bulk storage units herein are not intended to limit the types of storage units that may be implemented as first and/or second seed storage units in the present disclosure.

With that said, in various embodiments, the systems and methods of the present disclosure generally enable seeds from any of the seed storage units associated with the planters to be planted "on the fly", while the planters are moving through the fields (and when the planters reach the particular locations and/or cross into/over the particular locations). In connection therewith, it should be appreciated that the systems and methods herein are not limited to any particular configuration (and/or location) of the seed storage units providing the seeds to the planters, or the manners in which the seeds are ultimately delivered and planted. The seeds may originate from any desired location associated with the planters (be it onboard the planters or not), and then be planted.

For example, the systems and methods herein enable the seed meters of the planters to receive seeds from both the cassette storage units and the bulk storage units during planting operation (for planting in the field). In addition, the systems and methods herein facilitate seamless switching between planting seeds from the cassette storage units and planting the seeds from the bulk storage units. Further, in some implementations, in planting the seeds from the bulk storage units, the seeds may be delivered to the staging chambers of the seed meters or they may bypass the staging chambers and instead proceed directly (from the bulk storage units) to the metering chambers of the seed meters. In the later scenario, larger amounts of the seeds from the bulk storage units may be planted as desired, without first staging limited amounts of the seeds in the staging chambers of the seed meters (i.e., the seeds may bypass the staging chambers). What's more, in other implementations, the seeds from the cassette storage units and/or the seeds from the bulk storage units may bypass the seed meters altogether and be delivered to planting tubes to allow for desired planting spurts of the seeds (e.g., when planting plots on hills having variable elevations (i.e., hill plots), etc.) (e.g., two or more unsingulated seeds at substantially the same time (since the seeds bypass the seed meters), etc.). These bypass features may allow the planters to easily transition between, for example, a digital ag research configuration (whereby precise amounts of seeds from the cassette storage units and/or from the bulk storage units are received in the staging chambers of the seed meters and prepared for planting in particular plots) and a bulk planting configuration (whereby thousands of the seeds from the bulk storage units may be planted as desired around the seeds planted from the cassette storage units or whereby seeds from the cassette storage units may be planted in spurts, etc.). In general, though, it should again be appreciated that the features of the present disclosure facilitate movement of seeds from generally any seed storage units associated with the planters (regardless of the configurations of the storage units) to any other desired locations of the planters (e.g., one or more chambers of seed meters, planting tubes, etc.) for subsequently processing the seeds (be it planting the seeds, evacuating the seeds from the planters, etc.).

In various embodiments, the systems and methods of the present disclosure also include, and facilitate the operation of, fully-automated, GPS-guided planters having the features herein and capable of transitioning between, and planting of, different seeds within the cassette storage units and the seeds within the bulk storage units. In addition, the planters may be configured to effect such transitioning based on prescriptions of the planting plans, which describe particular configurations and locations of seeds that are to be planted in particular growing areas. Alternatively, the planters may be configured to effect such transitioning based on data provided by sensors located onboard the planters (or sensors apart from the planters (e.g., associated with drones flying over the fields, etc.) but in communication therewith, or from artificial intelligence remote from the planters but that have recently analyzed the fields to reveal that new planting plans (e.g., revisions to the planting plans current in effect, etc.) for the fields would be better for breeding pipelines, etc.), whereby the data may relate to soil conditions, temperature conditions, plot geography, etc. and may be used to determine particular seeds to be planted at particular locations in the fields "on the fly", while the planters are moving through the fields (and when the planters reach the particular locations and/or cross into/over the particular locations).

Example embodiments will now be described more fully with reference to the accompanying drawings. The description and specific examples included herein are intended for purposes of illustration only and are not intended to limit the scope of the present disclosure.

FIG. 1 schematically illustrates an example embodiment of a multi-row planter 100 for use in planting seeds in a field (e.g., as part of a plot in the field, etc.) and including one or more aspects of the present disclosure. The planter 100 may be towed or transported on a trailer to the field/plot where it is used. In the field/plot, then, in this example embodiment, the planter 100 may be adapted to be towed by a conventional tractor 102 for planting the seeds. However, in various other embodiments, the planter 100 may be incorporated into a conventional over the road vehicle or other vehicle that could be driven across fields/plots for planting seeds.

Figure 2:
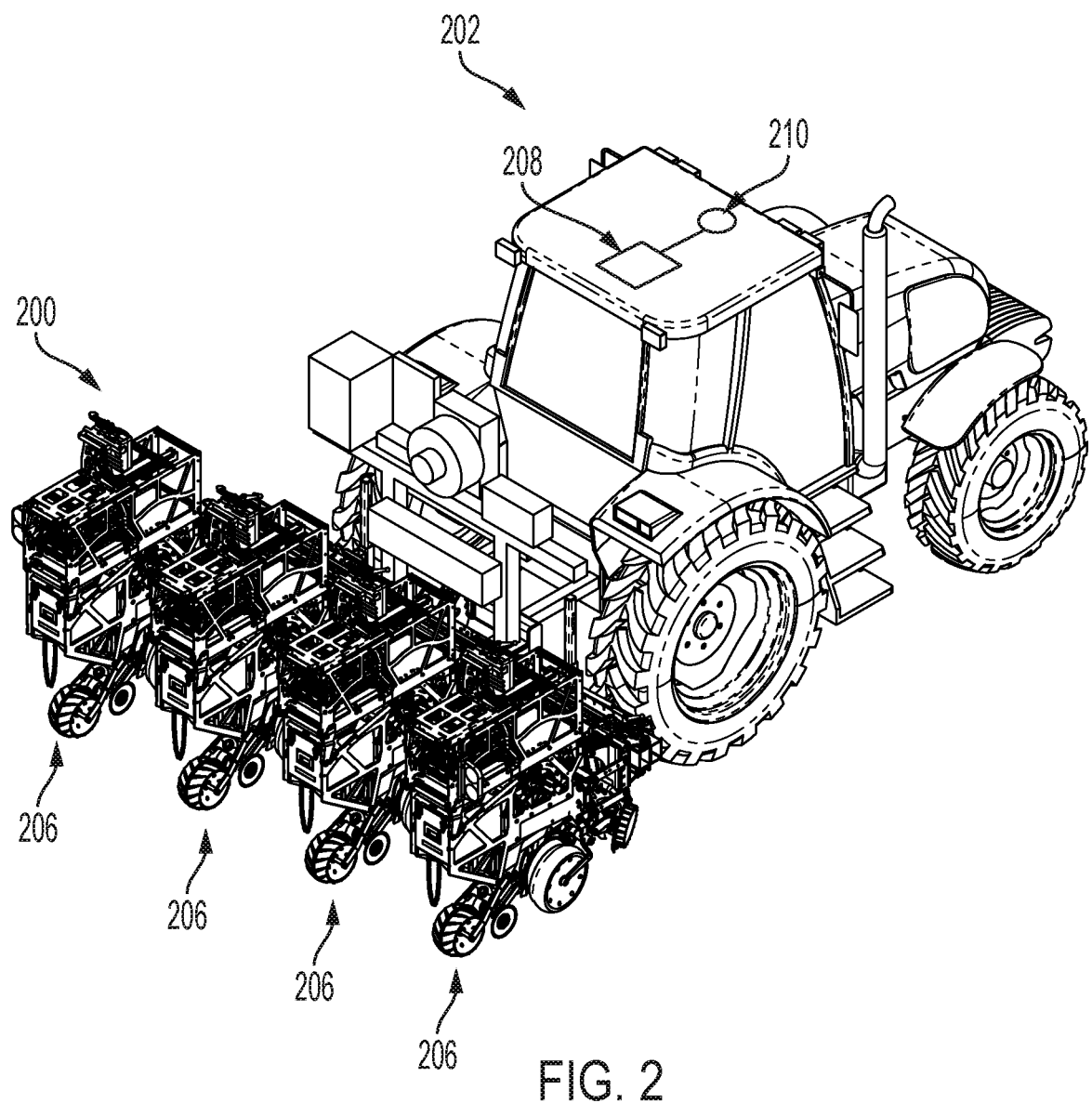
FIG. 2 is a perspective view of another example embodiment of a planter including one or more aspects of the present disclosure and configured to plant seeds in a field.

The planter 100 generally includes a frame 104 supporting multiple planting units 106. And, the planting units 106 are configured to plant seeds as desired in the field/plot. In the illustrated embodiment, the planting units 106 are configured to plant any desired types of seeds (e.g., and without limitation, corn, soybeans, etc.) or dispense any other small objects (i.e., the planter 100 and the description herein should not be construed as limited to any particular type of seeds or to seeds in general). In various embodiments, one or more of the planting units 106 may be adapted to handle more than one type of seed, or may be quickly converted to handle different types of seeds (such that different ones of the planting units 106 may plant different seeds and/or such that the planting units 106 may switch between types of seeds being planting, for example, while planting (e.g., "on the fly", without stopping, etc.)). Also in the illustrated embodiment, the planter 100 includes sixteen planting units 106. However, in other embodiments, the planter 100 may include more than or fewer than sixteen planting units within the scope of the present disclosure (e.g., four planting units such as illustrated in FIG. 2 for the planter 200, six planting units, eight planting units, twenty planting units, etc.).

The planting units 106 of the planter 100 may also be adjustable relative to the frame 104. For example, the planting units 106 may be configured to slide laterally along the frame 104 (e.g., via one or more actuators, etc.) to thereby change spacing between the planting units 106 (e.g., to allow for compact travel, to adjust spacing between the planting units 106 during planting (e.g., on the fly, etc.) to thereby adjust spacing between rows of planted seeds during planting, etc.) and/or collapsed or folded relative to the frame 104 to a width such that it can travel on conventional roads (see, e.g., Applicant's co-owned U.S. Pat. Nos. 7,673,572, 7,775,167, and 9,635,799, the entire disclosures of which are each incorporated herein by reference; etc.). However, such adjustability is not required in all embodiments.

A control system 108 is provided in communication with the planter 100 and the planting units 106 thereof, and is configured to control one or more operations of the planter 100 (and/or the tractor 102) described herein (e.g., such that in some embodiments the planter 100 may be fully automated, may operate without human intervention, etc.). In the illustrated embodiment, the control system 108 is disposed in the tractor 102. However, in other embodiments, the control system 108 may be located otherwise, for example, on the planter 100, remote from the planter 100 and tractor 102 (for remote operation thereof), etc. In connection therewith, the control system 108 may include (and/or be associated with) a global positioning system (GPS) receiver 110, whereby the control system 108 and the GPS receiver 110 may be configured to control operation of the tractor 102 to move through the field/plot (e.g., to move through the field/plot along a desired path, to move to desired locations in the field/plot, etc.), and to control operation of the planting units 106 of the planter 100 to plant seeds in the field/plot (e.g., to plant desired seeds in the field/plot, to plant desired seeds in desired locations in the field/plot, to transition between different seeds stored onboard the planter 100 to effect such planting on the fly, to plant seeds at a desired rate (and/or change the rate on the fly), to plant seeds at a desired row spacing (and/or change the row spacing on the fly), etc.). With that said, it should be appreciated that the planter 100 may be fully automated in various embodiments, as described above. However, in other embodiments, the planter 100 may be utilized with manual-packet planting systems while still implementing one or more of the features described herein.

FIGS. 2-20 illustrate another example embodiment of a multi-row planter 200 for use in planting seeds in a field or plot and including one or more aspects of the present disclosure. The planter 200 is similar to the planter 100 described with reference to FIG. 1 (such that the above-description of the planter 100 generally applies to the planter 200).

As shown in FIG. 2, in this exemplary embodiment, when the planter 200 is in the field, it may be adapted to be towed by a conventional tractor 202 for planting the seeds. And, a control system 208 is provided in communication with the planter 200, and is configured to control one or more operations thereof (and/or of the tractor 202) as described herein. As illustrated, the control system 208 is disposed in the tractor 202. However, the control system 208 may be located otherwise, for example, on the planter 200 or remote therefrom in other embodiments. In connection therewith, the control system 208 may include (and/or be associated with) a global positioning system (GPS) receiver 210, whereby the control system 208 and the GPS receiver 210 may be configured to control operation of the tractor 202 to move through the field/plot, and to control operation of the planter 200 to plant seeds in the field/plot (as generally described herein). In addition, in some embodiments, the planter 200 may be fully automated as described herein (e.g., in a similar fashion to the planter 100, etc.) and may make use of planting plans to determine seeds to be planted (in conjunction with the control system 208 and the GPS receiver 210), and/or may make use of one or more sensors (and/or artificial intelligence from sources remote to the planter 200 but still in communication with the planter 200 via the control system 208, etc.) to identify particular field characteristics and thus particular seeds to be planted (based on the field characteristics) as modifications to the planting plans (or as a basis of the planting plans). Additional features of the planter 200 are described next in more detail.

Figure 3:
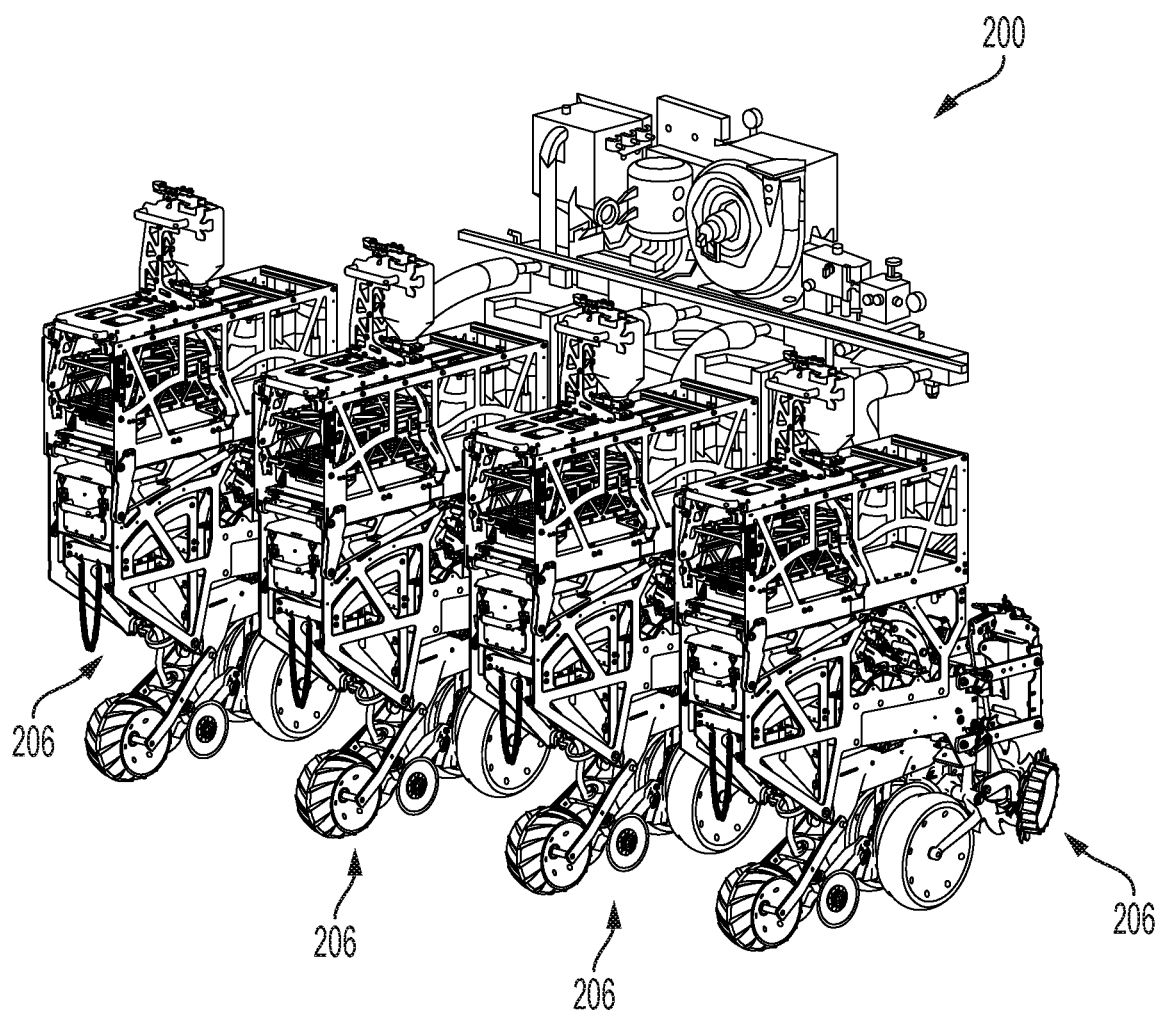
FIG. 3 is another perspective view of the planter of FIG. 2.

As shown in FIGS. 3 and 4, the planter 200 generally includes a frame 204 supporting multiple planting units 206. And, as generally described above with regard to the planter 100, the planting units 206 are adjustable relative to the frame 204. In particular, the planting units 206 are configured to slide laterally along the frame 204 (via a transport mechanism 214 and one or more actuators associated therewith) to thereby change spacing between the planting units 206 (e.g., to allow for compact travel, to adjust spacing between the planting units 206 during planting (e.g., on the fly without stopping, etc.) to thereby adjust spacing between rows of planted seeds, etc.). The planting units 206 may also be configured to be collapsed or folded relative to the frame 204 to a width such that the planter 200 can travel on conventional roads. With that said, in this embodiment, the planter 200 includes four planting units 206. And, each of the planting units 206 is substantially identical in structure and functionality. As such, for clarity and simplicity, a single one of the planting units 206 is described hereinafter with it understood that such description equally applies to each of the other planting units 206 of the planter 200.

With reference to FIGS. 4 and 5, the planting unit 206 includes a parallel linkage assembly 215, having an actuator 216 configured (e.g., structured, operable, etc.) to apply lifting and/or downward force on the planting unit 206 relative to the frame 204 (e.g., during planting, etc.) (again see, e.g., Applicant's co-owned U.S. Pat. No. 10,159,176, the entire disclosure of which is incorporated herein by reference; etc.). The planting unit 206 also includes a pair of row cleaners 217 configured to clear a path for planting, and a pair of furrow opening discs 219 configured (in conjunction with the downward force applied by the parallel linkage assembly 215) to open a V-shaped trench, or furrow, in the soil in the given field (into which seeds are then dispensed by the planting unit 206). The planting unit 206 additionally includes a pair of gauge wheels 218 configured to control a depth of the furrow formed by the opening discs 219. In particular, a height of the gauge wheels 218 relative to the opening discs 219 controls the depth of the furrow. Further, the planting unit 206 includes a closing wheel 219a configured to close the furrow, after the seeds are deposited therein, and to cover the planted seeds.

Figure 6:
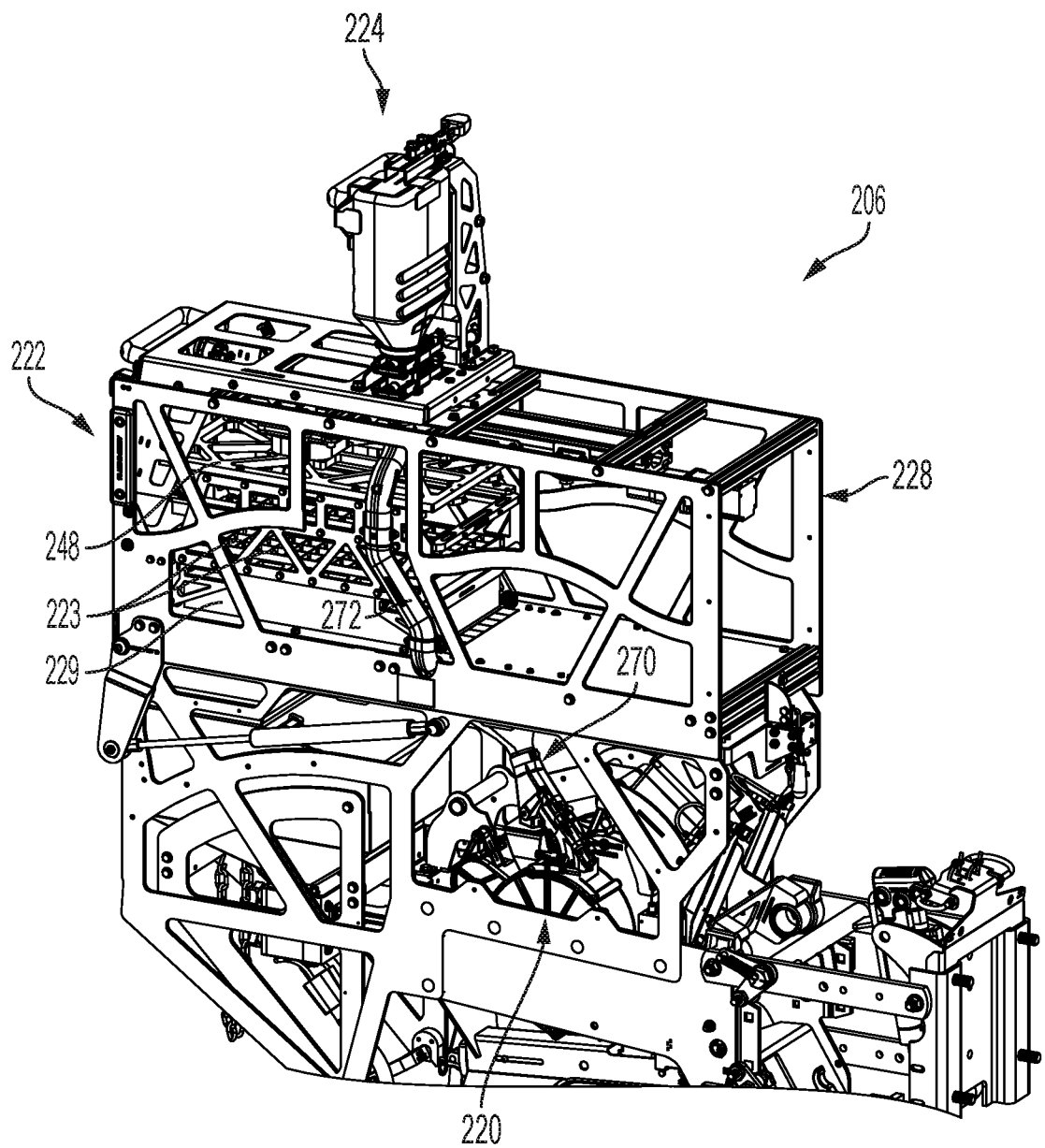
FIG. 6 is another fragmentary perspective view of a planting unit of the planter of FIG. 2.

As shown in FIG. 6, the planting unit 206 also includes a seed meter 220 in communication with onboard first and second seed storage units 222, 224. In this embodiment, the seed meter 220 is disposed generally below the first and second seed storage units 222, 224. As such, based on this positioning, gravity may be used to facilitate movement of the seeds from the storage units 222, 224 to the seed meter 220 (however, air, etc. may also be used as desired in other embodiments). The seed meter 220 is configured to receive seeds from either of the first and second storage units 222, 224 and to dispense the received seeds into the furrow created by the planting unit 206 (i.e., created by the furrow opening discs 219) (via a planting tube 266 in communication with the seed meter 220 (see, FIG. 5)). In particular, the seed meter 220 is configured to receive seeds from the first and second seed storage units 222, 224, meter the seeds, and then deposit (i.e., plant) a particular number (and/or volume) of the seeds into the furrow via the planting tube 266 (again see, e.g., Applicant's co-owned U.S. Pat. No. 10,159,176, the entire disclosure of which is incorporated herein by reference; etc.).

The first and second seed storage units 222, 224 of the planting unit 206 will be described next with reference to FIGS. 6-11C. As shown in FIG. 6, the first seed storage unit 222 is mounted generally toward a top portion of the planting unit 206 and includes a storage system for holding multiple sets of seeds in a mapped or indexed arrangement (e.g., electronically (e.g., stored in memory of a computing device (see, e.g., FIG. 34, etc.), etc.) or otherwise, etc.) (e.g., a cassette storage system, another storage system with similarly mapped containers, etc.) configured to store/hold multiple different groups (or cells) of seeds (with the locations of the different groups or cells known based on the mapping or indexing). The groups (or sets) of seeds in the first seed storage unit 222 may include, for example, different groups of the same type of seeds, different groups of different seeds and/or types of seeds, etc. intended to be cultivated and tested/analyzed for desired genotypic and/or phenotypic traits and/or for efficacy of selected treatments applied thereto; etc. And, the second seed storage unit 224 includes a bulk seed storage unit mounted on the planting unit 206 (e.g., without limitation, generally toward a top portion of the planting unit 206 adjacent or next to or on top of the first seed storage unit 222; etc.) and configured to store/hold a bulk supply of seeds. The seeds in the second seed storage unit 224 may include, for example, any desired seeds such as, without limitation, seeds that are not intended for testing, seeds that are intended to be tested for aspects other than the seeds in the smaller plots, seeds that are not in competition with the seeds in the smaller plots, seeds that are to be utilized for other purposes (e.g., erosion control, refuge, breaks, etc.), seeds that already have a predictable and/or proven performance record, etc. (generally, where the seeds in the bulk supply are different than the various seeds held in the first seed storage unit 222 and serve a different purpose in being planted).

Figure 7:
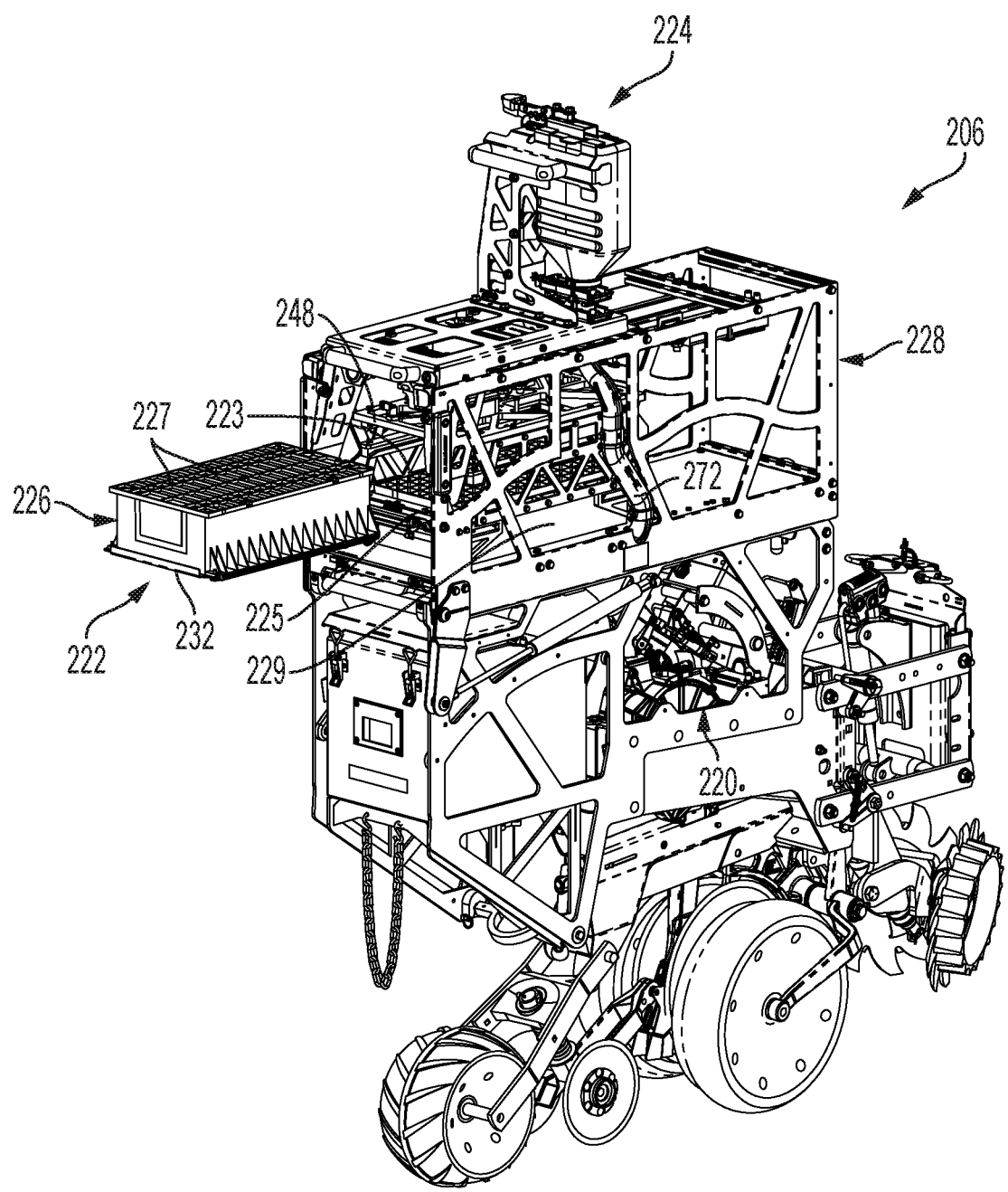
FIG. 7 is a perspective view of a planting unit of the planter of FIG. 2.
Figure 8A:
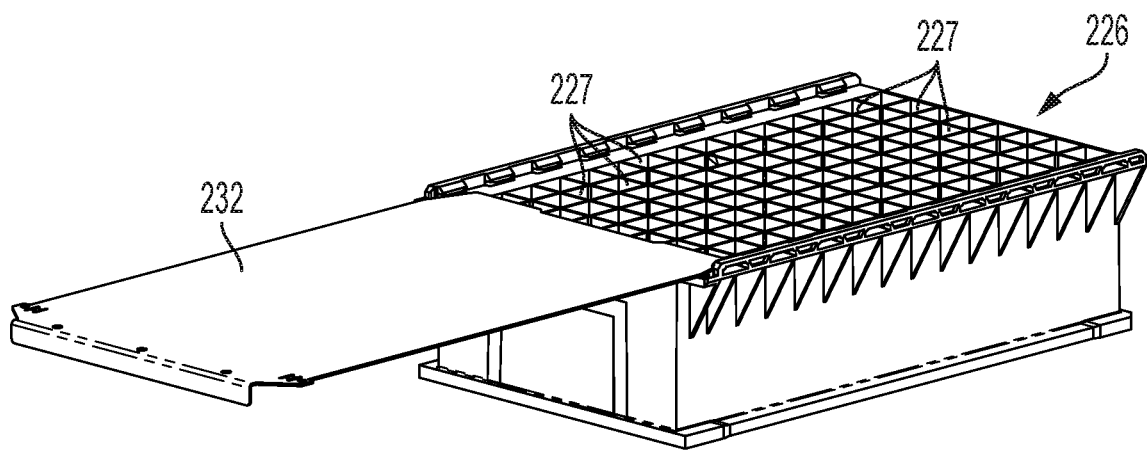
FIGS. 8A-8B are perspective views of a seed rack of a first seed storage unit of the planting unit of FIG. 6.
Figure 8B:
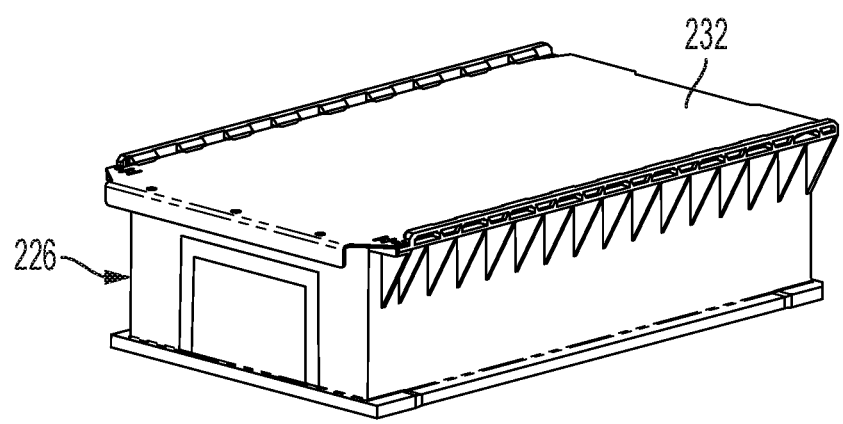
Figure 9:
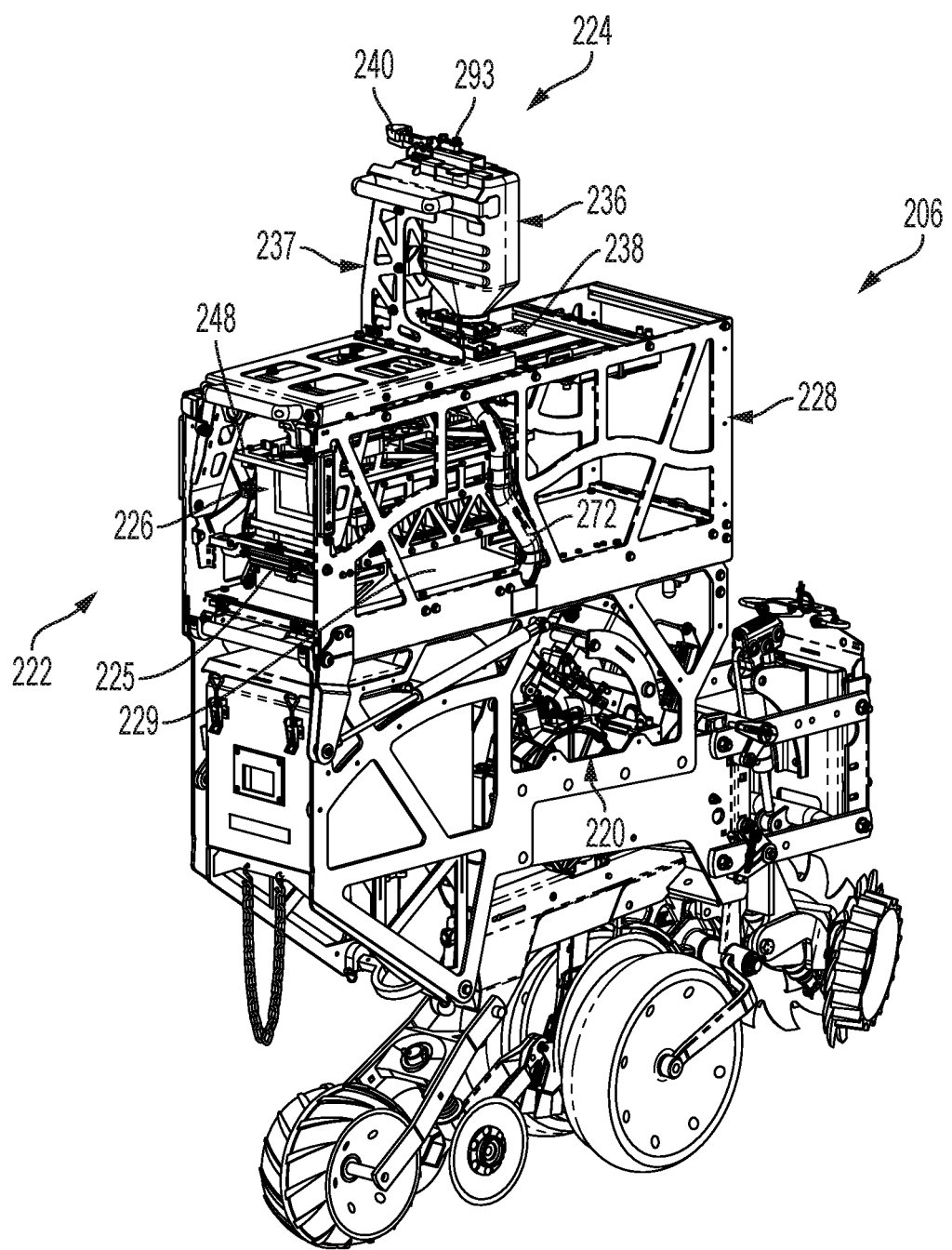
FIG. 9 is a perspective view of the planting unit of FIG. 6.

With additional reference to FIGS. 7-9, the first seed storage unit 222 (e.g., a cassette storage system, etc.) generally includes a seed rack 226 (or cassette) having multiple cells 227 each configured to hold a seed receptacle (e.g., cells, vials, tubes, cups, packets, cassettes, magazines, cartridges, other containers, electronically-mapped seed containers, etc.). The seed receptacles can be pre-loaded, or pre-filled, with desired kinds of seeds to be planted by the planting unit 206 (and the planter 200), such as, for example, seeds of a desired type, trait, quality, breed, size, characteristic, genotype, treatment, etc., and then positioned within the cells 227 of the seed rack 226. The receptacles may be mapped (or indexed) within the cells 227 of the seed rack 226 (when located in the first seed storage unit 222 (FIG. 9)) so that the location of the particular receptacles (and the particular seeds therein) are known. With that said, each of the seed receptacles retained in the cells 227 of the seed rack 226 can be pre-loaded with the same seed kind, or a different seed kind. The first seed storage unit 222 also includes an indexer 228 configured to support the seed rack 226 in the storage unit, and a funnel 229 (see, also, FIG. 5) coupled to a bottom portion of the indexer 228. In connection therewith, the indexer 228 is configured to selectively direct seeds from one or more desired ones of the seed receptacles (within the seed rack 226) into the funnel 229 (via queue 223), and the funnel 229 is configured to then direct the seeds to the seed meter 220 of the planting unit 206 (for planting). This will be described in more detail hereinafter.

As described above, the seed rack 226 includes the multiple cells 227 configured to hold the seed receptacles. Each set of cells 227 is sized and adapted to retain a respective one of the seed receptacles. Particularly, each of the cells 227 may be associated with a particular x-y location within the seed rack 226. The locations of the seed receptacles in the cells 227 of the seed rack 226, then, can be mapped using the particular x-y locations of the corresponding sets of cells 227 (e.g., and stored in memory of a computing device associated with the planter 200 (see, e.g., FIG. 34, etc.), etc.). In this manner, desired ones of the seed receptacles (and the seeds included therein) can be quickly identified for planting (e.g., by control system 208 in communication with the planter 200, etc.).

The seed rack 226 also includes a cap 232 (e.g., a sluice plate, etc.) configured to position (e.g., slidably, etc.) over the cells 227, thereby inhibiting the seed receptacles (and the seeds therein) from prematurely sliding out of the cells 227 (e.g., when the seed rack 226 is inverted, etc.). That said, when the seed rack 226 is loaded in the first seed storage unit 222 (within frame 248 thereof), the cap 232 is generally facing downward (and is located adjacent the funnel 229). For example, to initially position the seed rack 226 in the first seed storage unit 222, the first seed storage unit 222 may be rotated away from the planting unit (FIG. 5) so that the seed rack 226 can be positioned in the frame 248 (although such rotation is not required). The indexer 228, then, includes the queue 223 and corresponding doors 225 (positioned generally below the queue 223). As such, once loaded, the cap 232 of the seed rack 226 may be removed and the seeds contained in the cells 227 allowed to drop into corresponding cells of the queue 223 (so that the particular x-y location/relationship of the seeds is maintained). A linear stage may be selectively moved (e.g., by a motor, screw, and guide bearings, etc.) to position the queue 223 as desired relative to the funnel 229. And, the doors may then be operated to release desired seeds from the queue 223. See also, e.g., Applicant's co-owned U.S. Pat. No. 7,775,167, the entire disclosure of which is incorporated herein by reference, for another example seed rack that may be used with the planting unit 206 of the planter 200 and a corresponding operation thereof.

In other embodiments, the first seed storage unit 222 may include a switching system configured to selectively move one or more of the seed receptacles in the seed rack 226 to a position over the funnel 229 (when desired to release seeds therefrom for planting). In such embodiments, the seed rack 226 (or a portion thereof) may be moveable within the first seed storage unit 222 to effect such positioning of the desired seed receptacles. In addition, in still other embodiments, the first seed storage unit 222 may be associated with a vehicle separate from the planter 200 but that may move with the planter 200 and deliver seeds to the planting units 206 via conduits, etc. Further, it is again noted that the first seed storage unit 222 may include, and may be configured to accommodate, any desired arrangement of seeds whereby different sets of seeds are separately stored and indexed so that locations of the sets of seeds are known or available (e.g., electronically-mapped, multi-population seed containers (or receptacles), etc.).

Figure 10A:
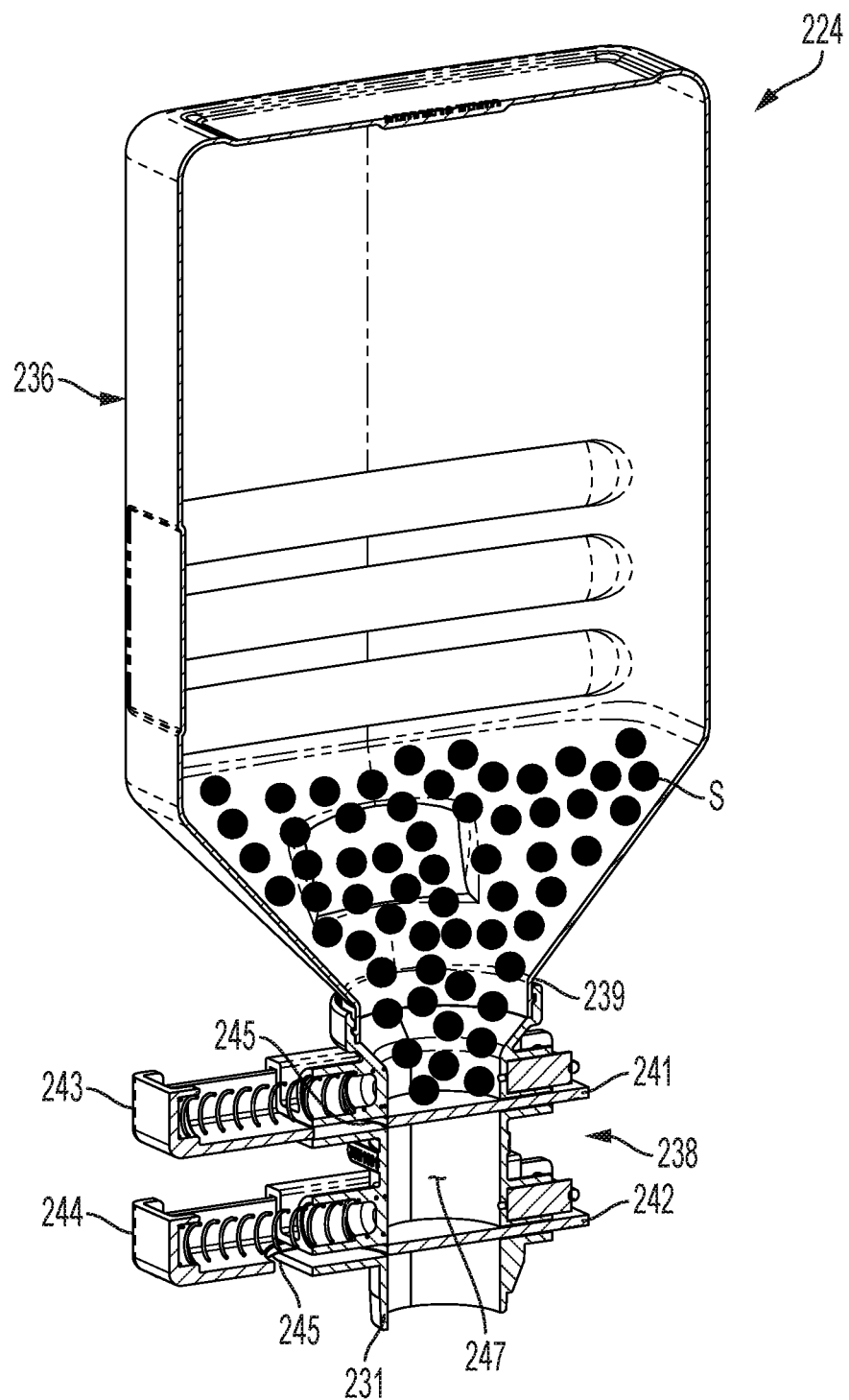
FIGS. 10A-10D are fragmentary perspective views of the second seed storage unit of the planting unit of FIG. 9 illustrating operation of the second seed storage unit to dispense seeds.
Figure 10B:
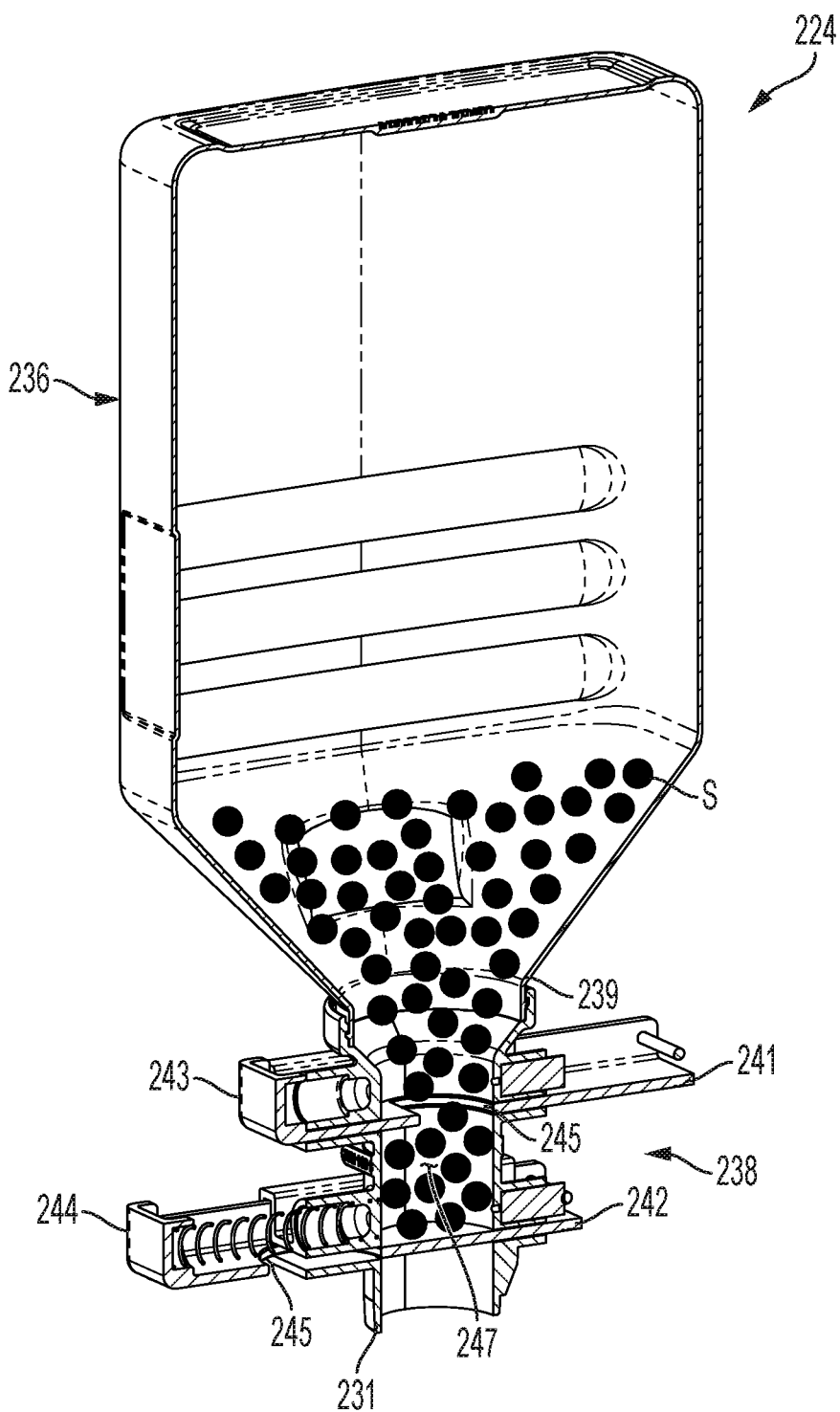
Figure 10C:
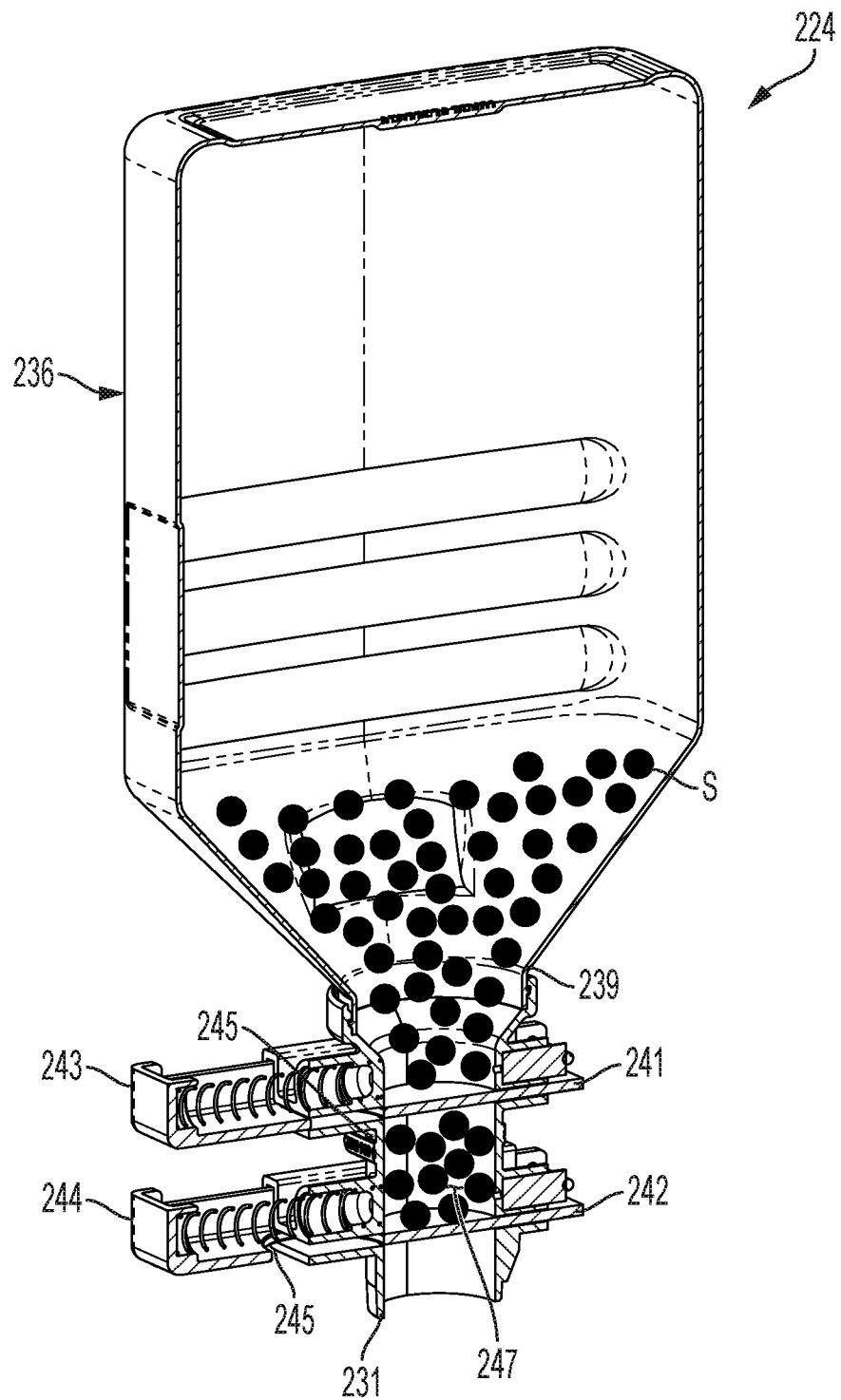
Figure 10D:
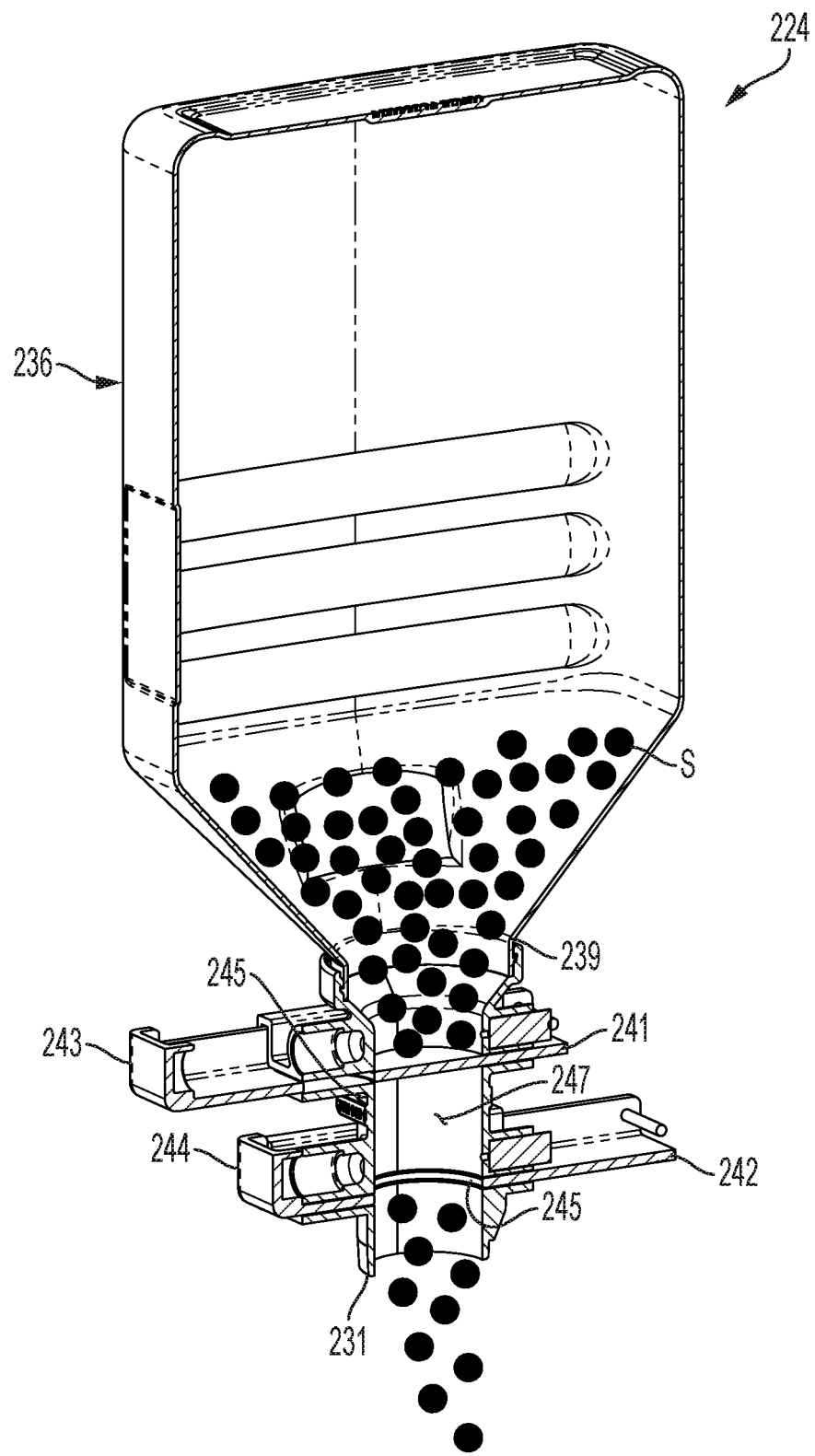

As shown now in FIGS. 9-10D, the second seed storage unit 224 (i.e., the bulk seed storage unit) of the planting unit 206 includes a container 236 (or canister) configured to hold the bulk supply of seeds therein, and a support 237 configured to releasably hold the container 236 on the planting unit 206. In particular, the support 237 includes a nest 238 configured to receive a dispensing spout 239 of the container 236 (when the container 236 is coupled thereto) and a moveable brace 240 configured to secure/retain the container 236 in the support 237. As such, the container 236 may be selectively removed from the support 237 (via pivoting movement of the brace 240 about a hinge device 293) in order to receive the bulk supply of seeds therein, and then, once filled, re-coupled to the support 237. In so doing, the dispensing spout 239 of the container 236 is generally aligned with the nest 238 (FIG. 10A), and the brace 240 is then positioned back over the container 236 to retain the container 236 in the support 237 (FIG. 9).

In the illustrated embodiment, the nest 238 of the second seed storage unit 224 includes first and second sluice plates 241, 242 (e.g., double slide gates, etc.) each configured to selectively move (in a coordinated manner) between a closed position, in which the plates 241, 242 inhibit seeds S from leaving the container 236, and an open position, in which the plates 241, 242 allow the seeds S to flow (e.g., thereby providing a two-stage escapement mechanism, etc.) (broadly, means for portioning the seeds from the container 236). In connection therewith, the nest 238 includes corresponding first and second actuators 243, 244 (e.g., pneumatic cylinders, hydraulic cylinders, other known mechanical actuators, etc.) configured (via communication with the control system 208 associated with the planter 200) to move the respective sluice plates 241, 242 between the closed and open positions.

In particular, in an example operation of the container 236 and nest 238 (via communication of the control system 208 with the actuators 243, 244 of the nest 238), when the first and second sluice plates 241, 242 are in the closed position, the first sluice plate 241 inhibits/blocks movement of seeds S from out of the container 236 (FIG. 10A). To dispense the seeds S from the container 236, the first actuator 243 is operated to push the first sluice plate 241 relative to the container 236 and move an opening 245 of the sluice plate 241 into alignment with the dispensing spout 239 of the container 236. In this open position, seeds S are allowed to flow out of the container 236 (through the dispensing spout 239) and into a staging cavity 247 defined between the first and second sluice plates 241, 242 (FIG. 10B) (where the second sluice plate 242 is still closed and blocks movement of the seeds S out of the staging cavity 247). The first actuator 243 is then configured to allow the first sluice plate 241 to move back to the closed position to block any further seeds from flowing out of the container 236 (e.g., via spring forces acting on the first sluice plate 241, etc.), and thereby capturing a desired volume and/or number of seeds in the staging cavity 247 between the first and second sluice plates 241, 242 (FIG. 10C). At about the same time (or shortly thereafter), the second actuator 244 is configured to push the second sluice plate 242 relative to the container 236 (to the open position) and move an opening 245 thereof into alignment with the staging cavity 247 (FIG. 10D). In so doing, the seeds S in the staging cavity 247 are allowed to flow out of the second seed storage unit 224 (through outlet 231 and delivery tube 272 coupled to the outlet 231) and toward the seed meter 220. The second actuator 244 is then configured to allow the second sluice plate 242 to move back to the closed position (e.g., via spring forces acting on the first sluice plate 241, etc.). This operation is repeated to dispense additional portions (or sets) of seeds from the second seed storage unit 224 to the seed meter 220. While the sluice plates 241, 242 are illustrated as part of the nest 238 in the illustrated embodiment, the sluice plates 242, 242 may instead be formed as part of the container 236, for example, integral with the dispensing spout 239, etc. in other embodiments.

With that said, it should be appreciated that the staging cavity 247 of the container 236 may hold any desired number (or volume) of seeds released from the container 236, prior to directing the seeds to the seed meter 220 (e.g., about 100 seeds, about 50 seeds, about 1,000 seeds, etc.). In addition, in various embodiments, the first and second actuators 243, 244 of the nest 238 may be configured to move the first and second sluice plates 241, 242 to the open position at the same time, to allow direct flow of the seeds from the container 236 to the seed meter 220 (without first portioning the seeds in the staging cavity 247). As can be appreciated, this may be advantageous when planting large plots using the seeds from the second seed storage unit 224. In addition, it should be also appreciated that the container 236 may be configured to hold any desired type of seeds and/or any desired number of seeds. For example, the container 236 may be configured to hold hundreds, thousands, billions or more seeds. As such, the planter 200 may be capable of planting plots with the same seeds (e.g., from the first seed storage unit 222 for subsequent testing, etc.), fill in borders of the plots with seeds from the second seed storage unit 224, and then continue with additional seeds from the first seed storage unit 222, as desired, without stopping and/or without leaving unplanted areas, bare areas, etc.

Figure 11A:
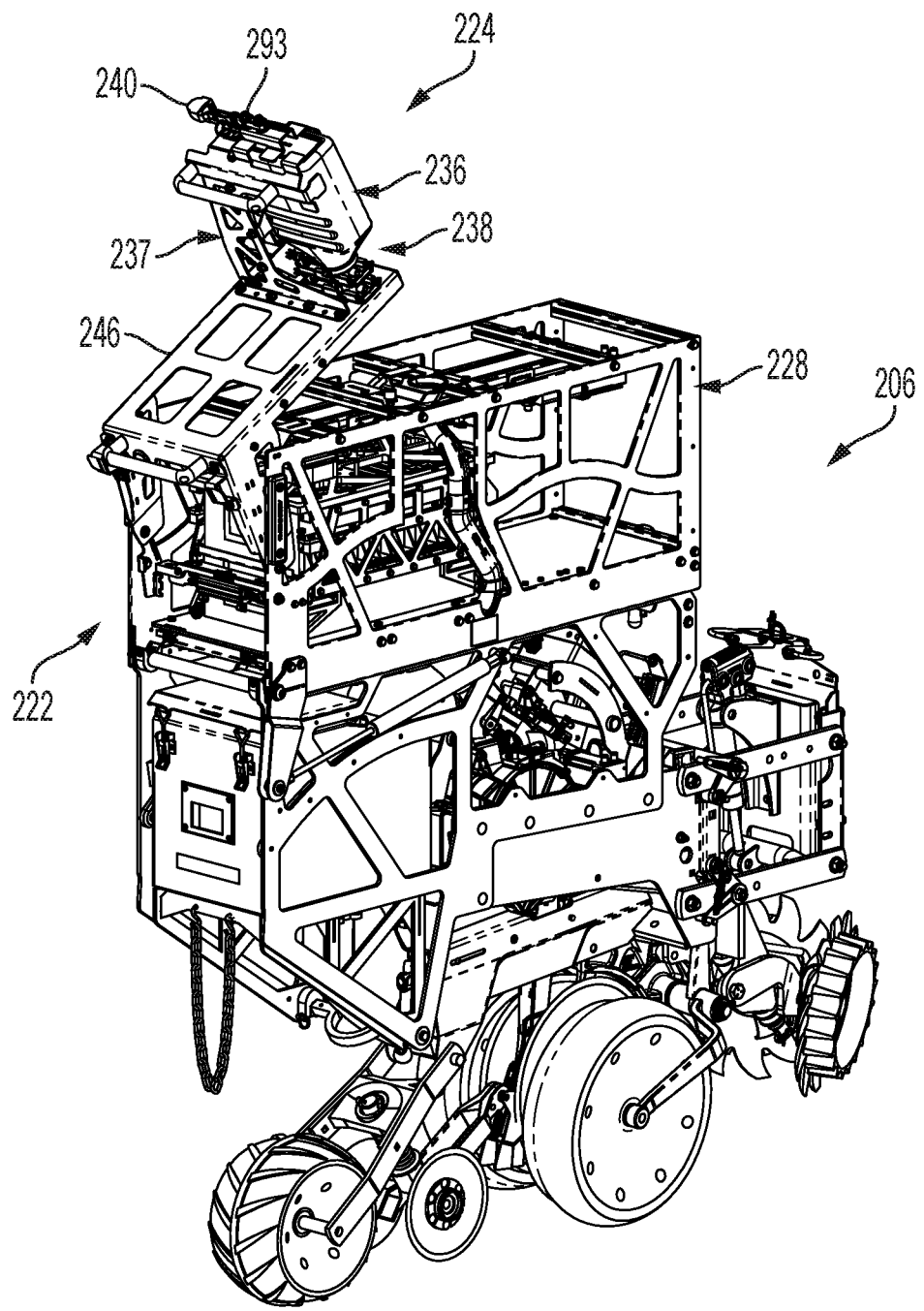
FIGS. 11A-11B are perspective views of the planting unit of FIG. 9 illustrating operation of the second seed storage unit to load and/or unload seeds therefrom.
Figure 11B:
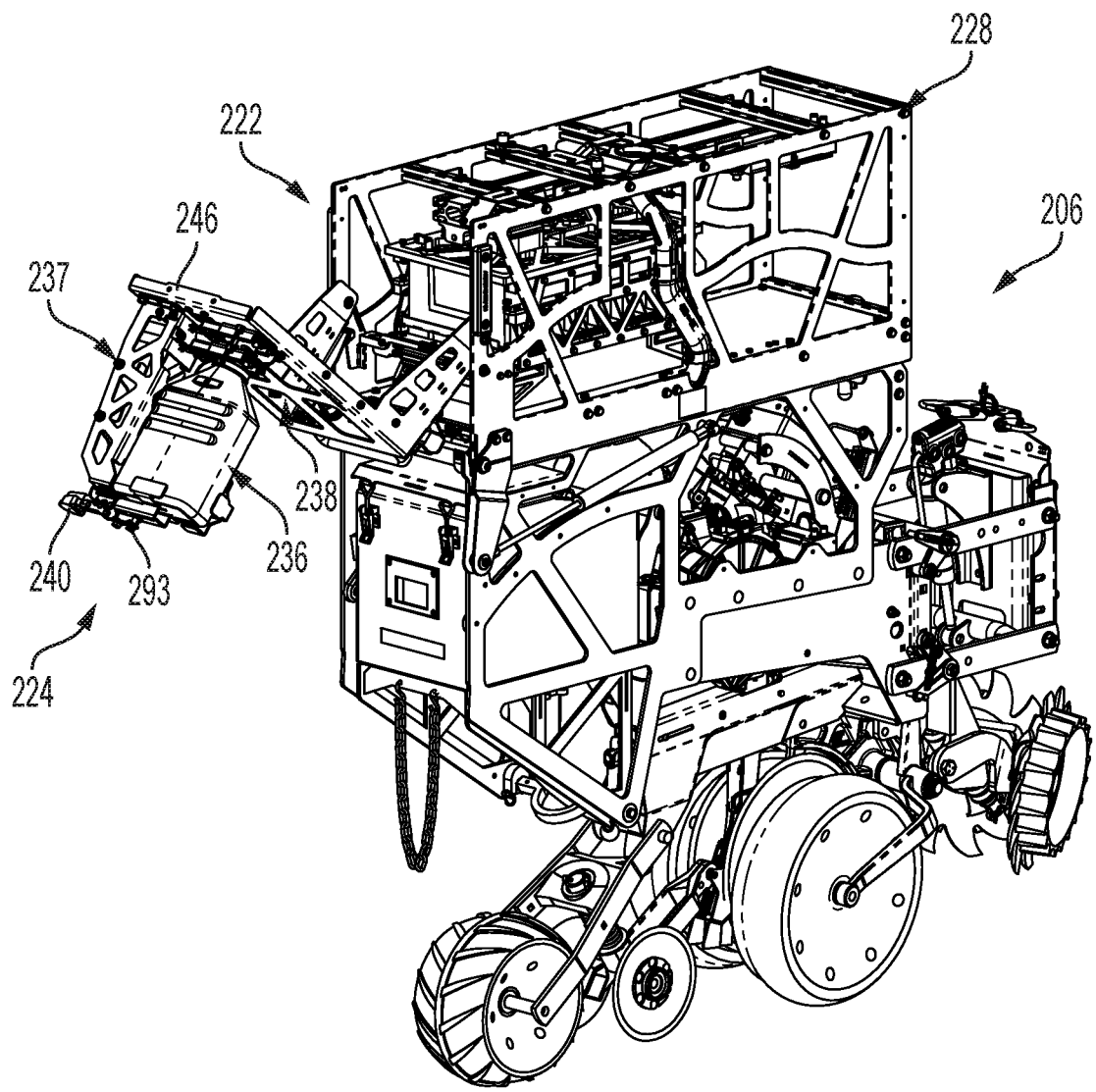
Figure 12:
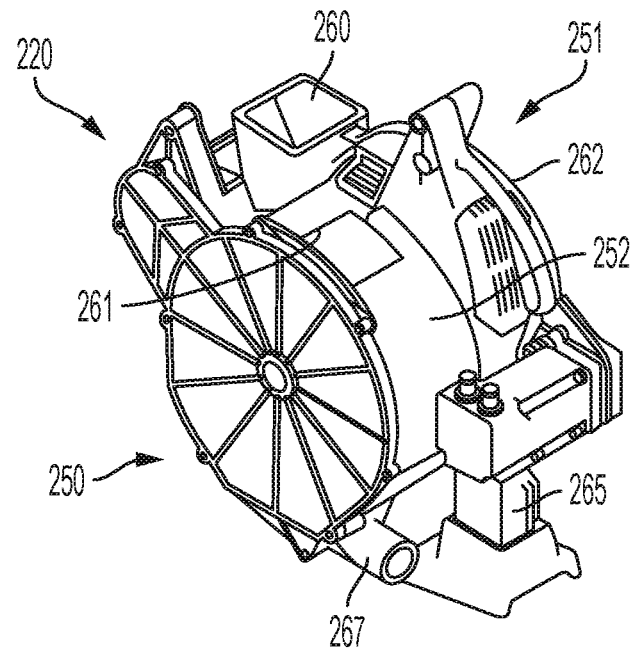
FIG. 12 is a perspective view of a seed meter of the planting unit of FIG. 9.

With additional reference to FIGS. 11A and 11B, the container 236 and the nest 238 of the second seed storage unit 224 (of the planting unit 206) are mounted on a platform 246 (generally on top of the indexer 228 of the first seed storage unit 222) configured to pivot relative to the indexer 228. In so doing, the support 237 of the second seed storage unit 224 may be moved (e.g., rotated, etc.), via the platform 246, toward a rearward part of the planting unit 206 to allow for easy access to the container 236 within the support 237 (FIG. 11B). A user may then selectively remove the container 236 from the support 237 (via pivoting movement of the brace 240 about the hinge device 293), and then position another container in the support 237 (or refill the container 236 and re-couple it to the support 237). The platform 246 can then be pivoted back to its location generally on top of the indexer 228 for use/operation (FIG. 9).

Figure 22:
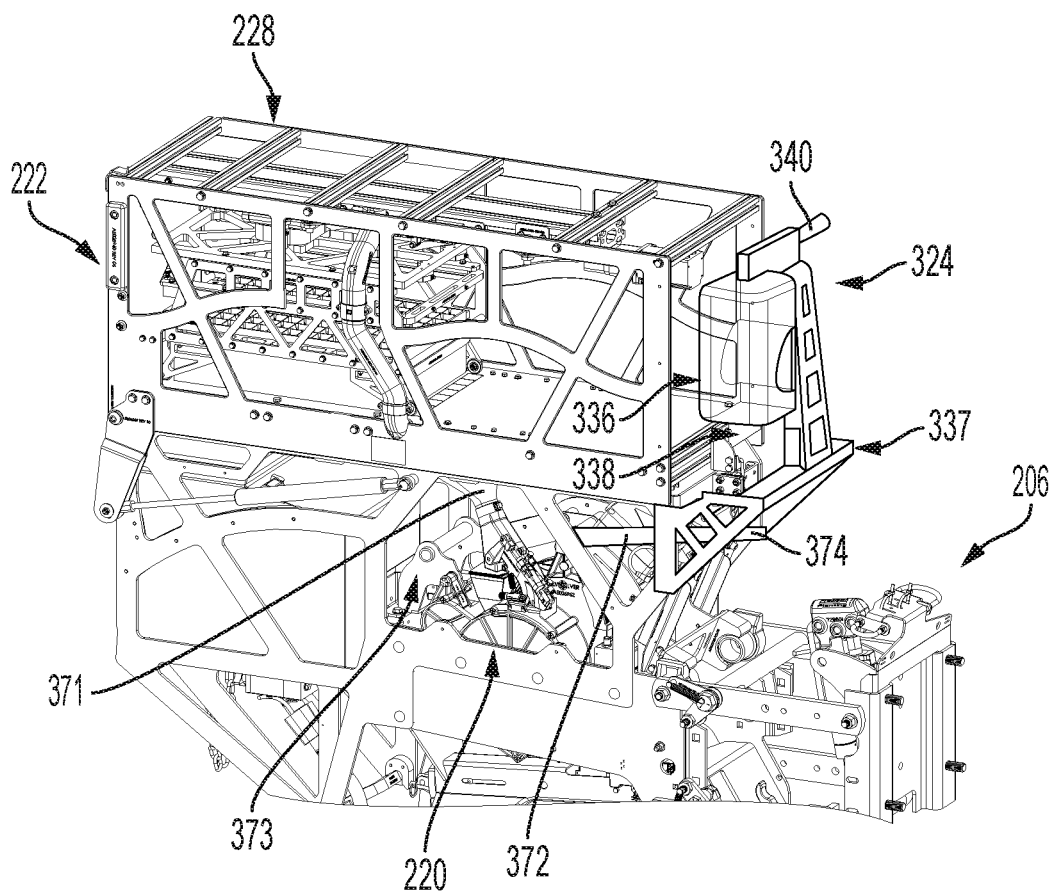
FIG. 22 is a perspective view of another example embodiment of a second seed storage unit and a diverter suitable for use with the planter of FIG. 2.
Figure 29:
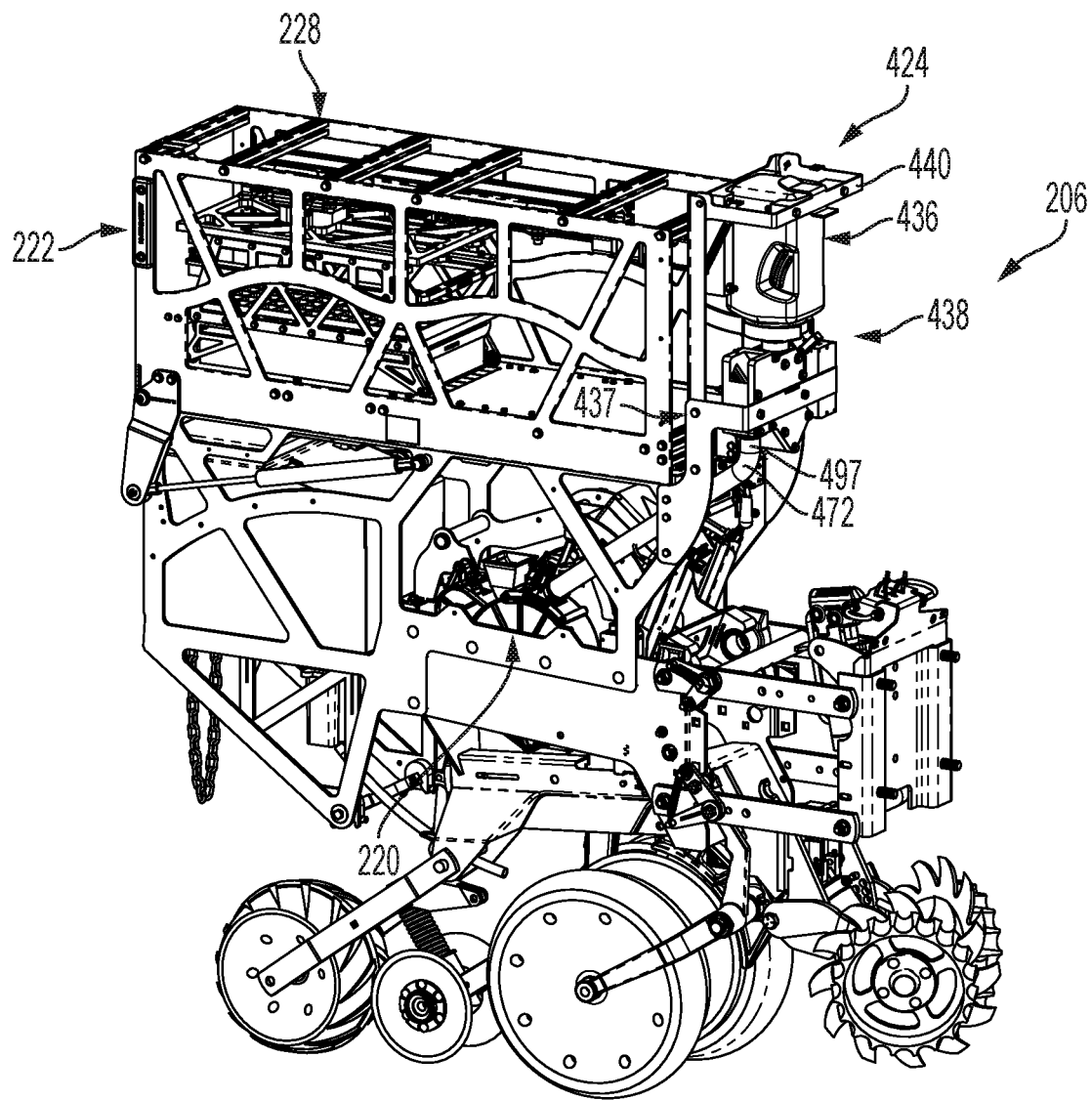
FIG. 29 is a perspective view of another example embodiment of a second seed storage unit suitable for use in the planter of FIG. 2.
Figure 30:
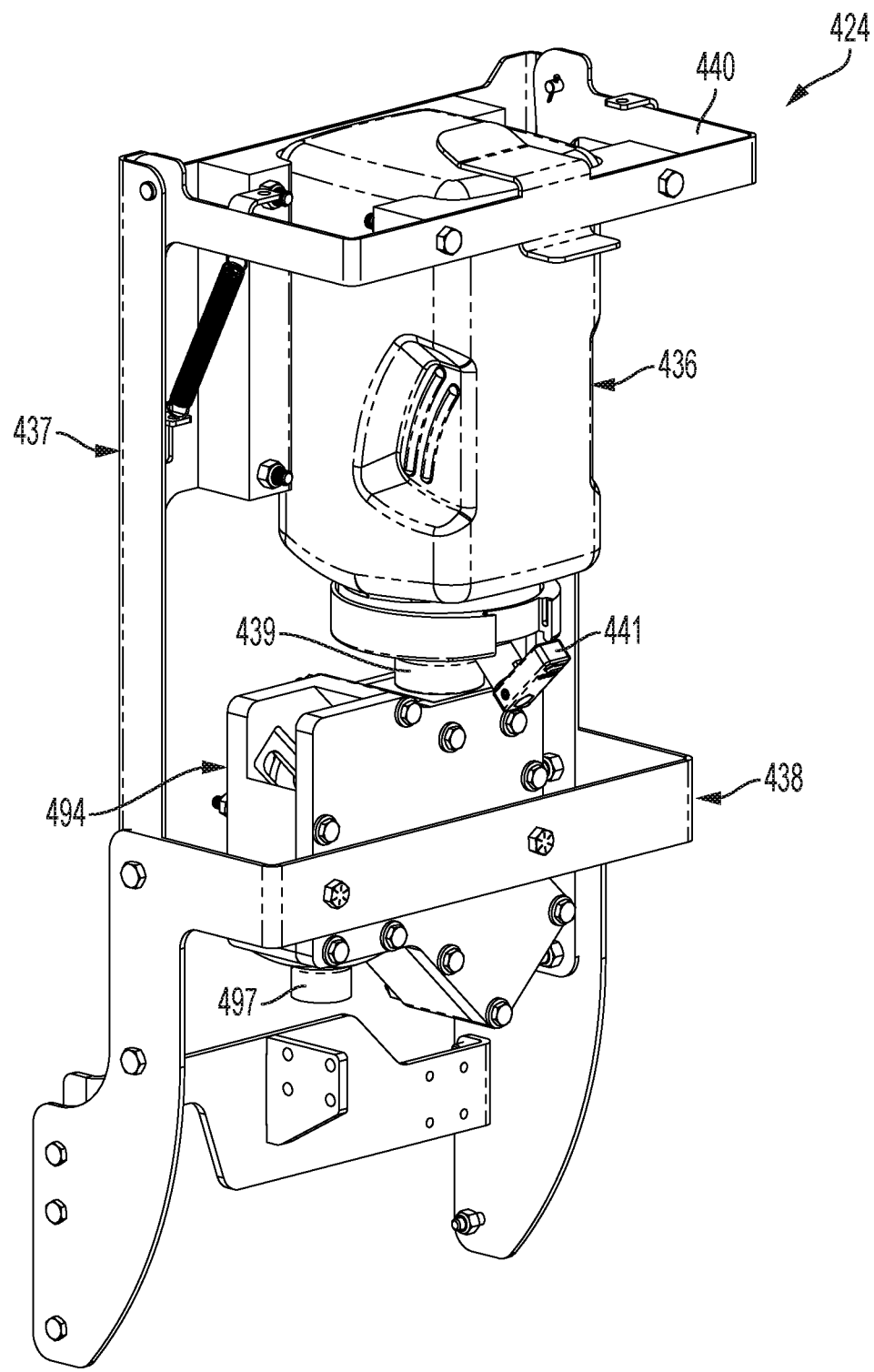
FIG. 30 is another perspective view of the second seed storage unit of FIG. 29.

It should also be appreciated that the second seed storage unit 224 (i.e., the bulk seed storage unit) may include other configurations (e.g., other than the container 236 and the nest 238, etc.) in other embodiments, and may dispense and/or release seeds in other manners. For example, the second seed storage unit 224 may include a container 436 and a nest 438 as illustrated in FIGS. 29-31B (whereby a plunger-style assembly is used to portion and dispense seeds). In addition, or alternatively, the second seed storage unit 224 may include containers mounted at different locations of the planting unit 206 of the planter 200 (e.g., generally toward a forward part of the planting unit 206 as illustrated in FIGS. 22 and 29, etc.). In addition, it should also be appreciated that the planter 200 may include a single second seed storage unit with conduits then leading to each of the planting units 206 of the planter 200 (instead of each planting unit 206 having its own second seed storage unit 224), or the planter 200 may include one or more second seed storage units associated with a vehicle separate from the planter 200 but that may move with the planter 200 and deliver seeds to the planting units 206 via conduits, etc.

Referring now to FIGS. 12-16B, the seed meter 220 of the planting unit 206 includes a seed handler portion 250 and a seed separator portion 251. As will be described, the seed handler portion 250 is generally configured to receive and stage seeds from each of the first and second seed storage units 222, 224 in preparation for planting. And, the seed separator portion 251, then, is generally configured to isolate/singulate (broadly, meter) individual ones of the received seeds and direct them for planting (e.g., to the planting tube 266 (FIG. 5), etc.).

Figure 14:
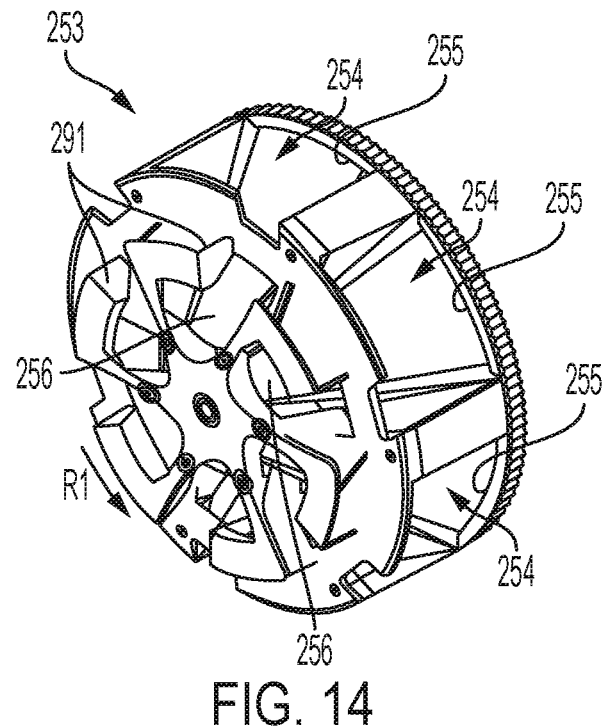
FIG. 14 is a perspective view of a drum of the seed meter of FIG. 12 for use in transporting seeds within the seed meter between different chambers.
Figure 15:
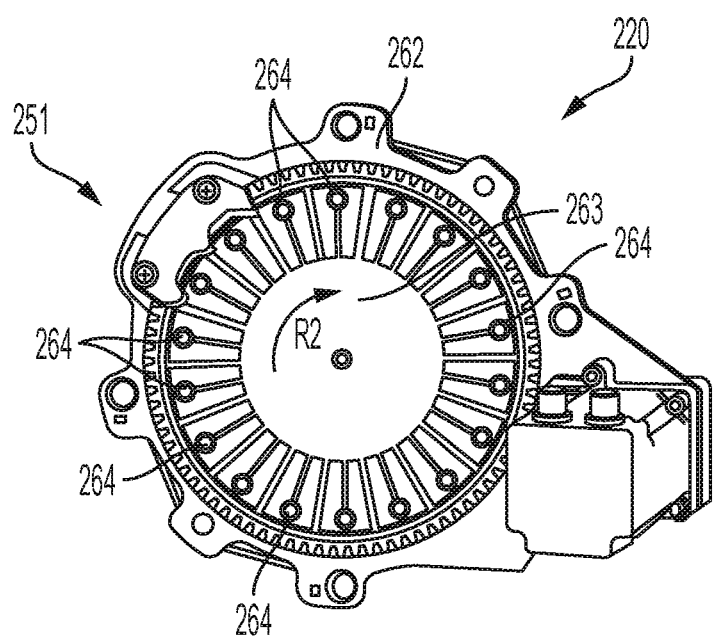
FIG. 15 is a perspective view of the seed meter of FIG. 12, with another portion of the housing of the seed meter removed to illustrate a seed disc of the seed meter.

The seed handler portion 250 of the seed meter 220 includes a housing 252, and a drum 253 disposed within the housing 252. The drum 253 includes multiple seed pockets 254 (FIG. 14) each configured to hold multiple seeds (e.g., a group or set of seeds received from the first and/or second seed storage units 222 and/or 224, etc.). Each of the seed pockets 254 includes a generally funnel shape, having an upper opening 255 (for receiving seeds into the seed pocket 254) and a lower opening 256 (for dispensing seeds from the seed pocket 254, for example, to the seed separator portion 251 during planting operation) (FIG. 14). As such, upon receiving seeds into one of the seed pockets 254 through the upper opening 255 (when the seed pockets 254 are generally vertically oriented), the seeds fall (e.g., via gravity, forced air, etc.) to the lower opening 256 where they are subsequently presented to the seed separator portion 251 for singulation and planting. In the illustrated embodiment, the drum 253 includes six seed pockets 254. In other embodiments, however, the drum 253 may include more than six or fewer than six seed pockets (e.g., two seed pockets, four seed pockets, five seed pockets, eight seed pockets, etc.).

Figure 16A:
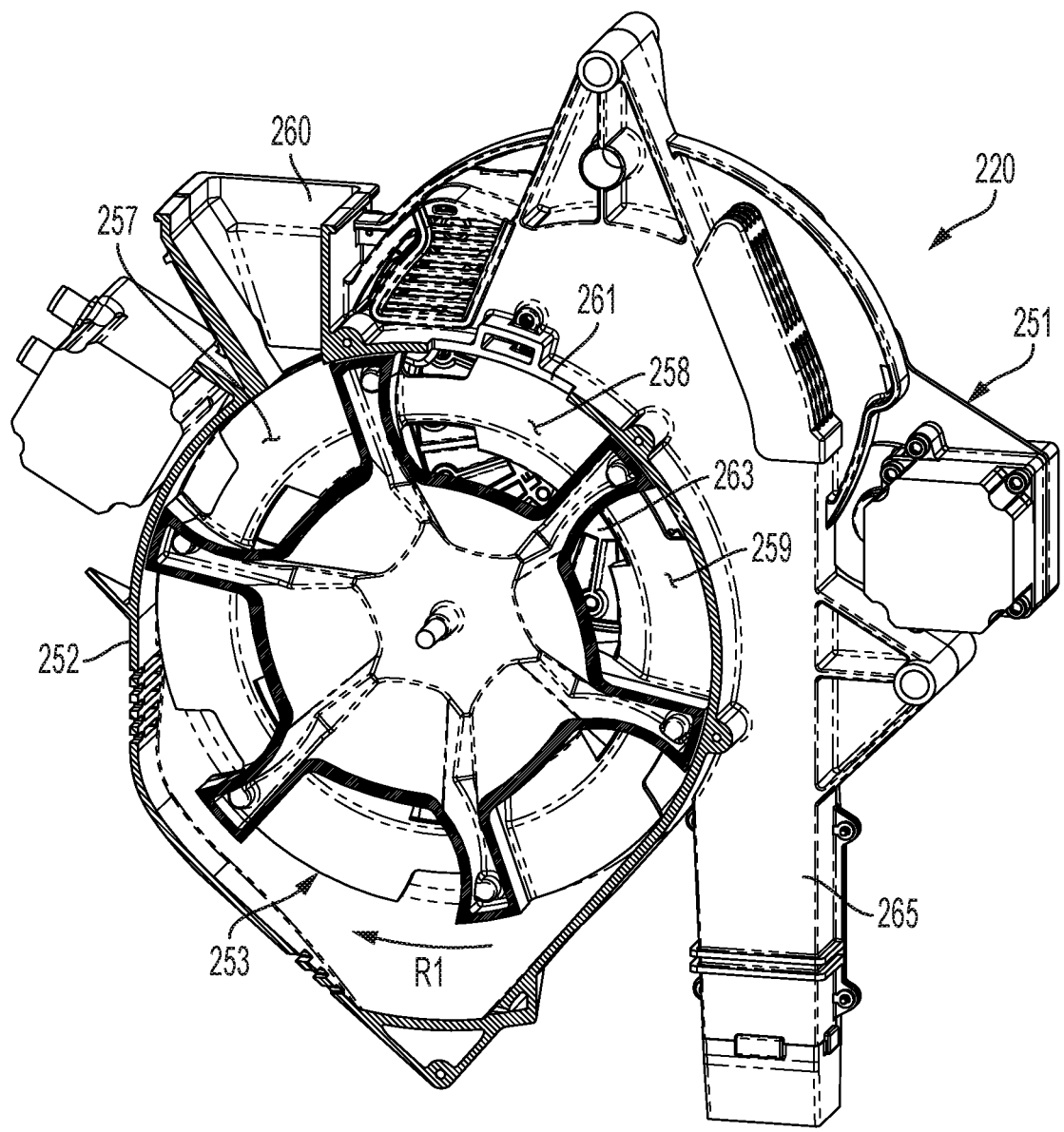
FIGS. 16A and 16B are additional perspective views of the seed meter of FIG. 12, with portions of the housing of the seed meter removed to illustrate chambers of the seed meter.
Figure 16B:
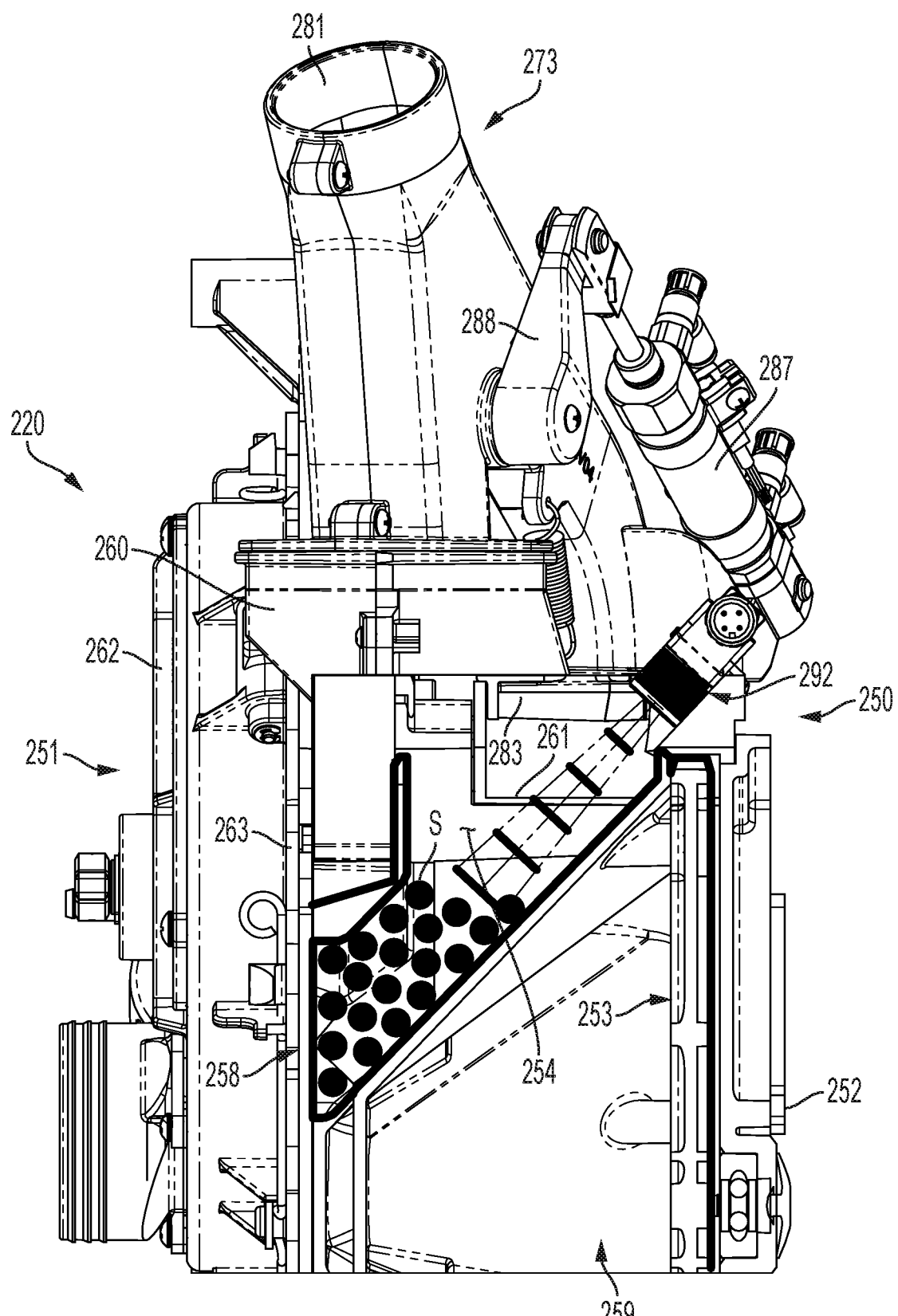
Figure 17:
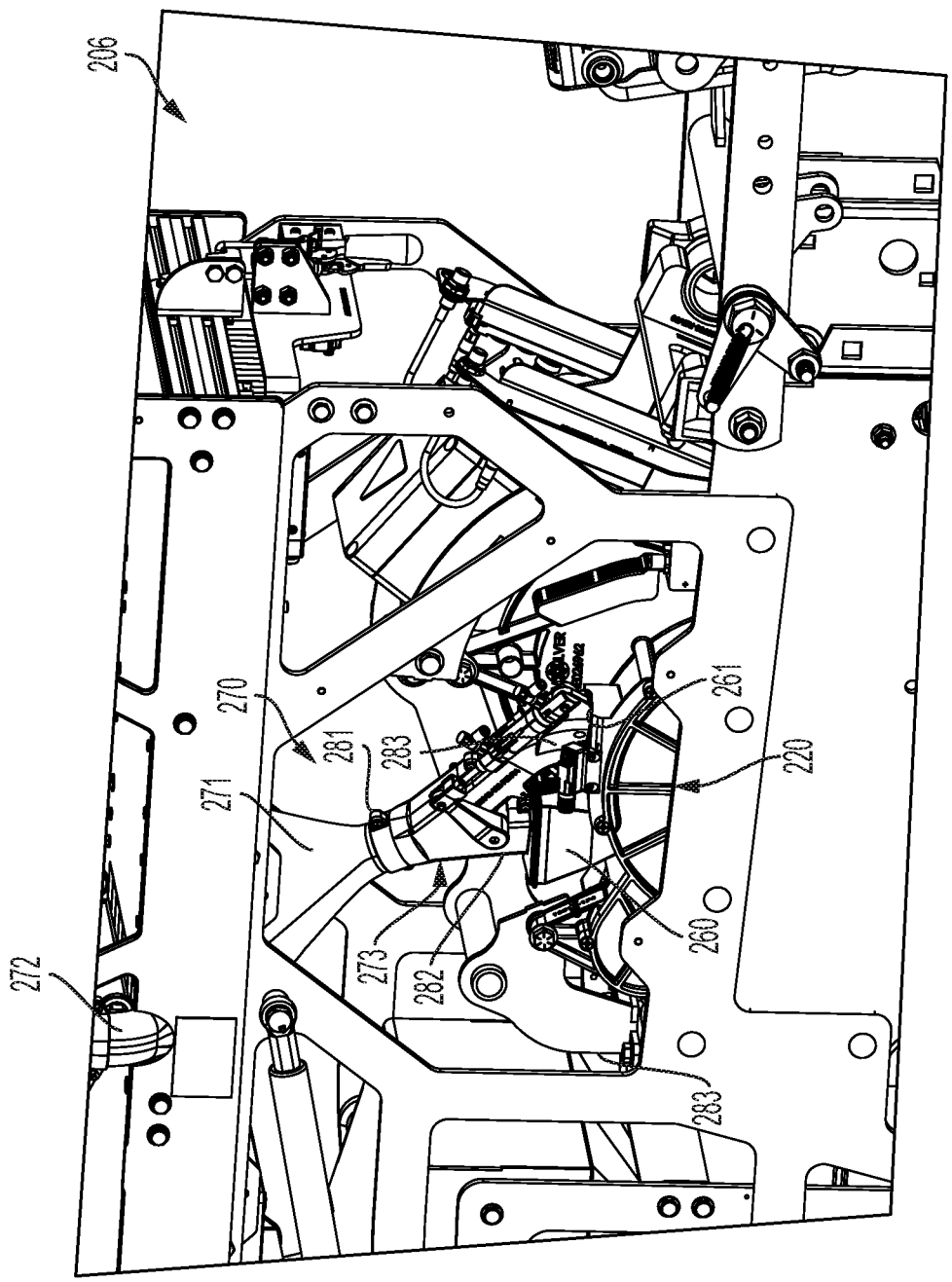
FIG. 17 is a fragmentary perspective view of a seed transport system of the planting unit of FIG. 9.

As best shown in FIG. 16A, the housing 252 of the seed handler portion 250 also generally defines several different chambers therein, through which the drum 253 is configured to rotate during operation of the planting unit 206. In particular, the housing 252 defines a staging chamber 257, a planting (or metering) chamber 258, and an evacuation chamber 259. The drum 253, then, is configured to rotate (in direction R1 in FIGS. 14 and 16A) within the housing 252 and move each of the seed pockets 254, one at a time, between these chambers 257, 258, 259. In connection therewith, the housing 252 also includes a staging inlet 260 in communication with the staging chamber 257 for receiving seeds from the first and second seed storage units 222, 224 into the staging chamber 257 (e.g., into a seed pocket 254 of the drum 253 located, positioned, aligned, etc. in/with the staging chamber 257, etc.). The housing 252 additionally includes a planting inlet 261 in communication with the planting chamber 258 for receiving seeds from the first and second seed storage units 222, 224 into the planting chamber 258, when desired (e.g., into a seed pocket 254 of the drum 253 located, positioned, aligned, etc. in/with the planting chamber 258), and thereby directly into the planting chamber 258 (e.g., and thereby generally bypassing the staging chamber 257; etc.).

In the illustrated embodiment, the drum 253 is configured to rotate within the housing 252 in increments of about sixty degrees, from one station/position to a next station/position, to account for the six seed pockets 254. In other embodiments, however, the drum 253 may be configured to rotate in other increments, for example, based on a number of seed pockets included in the drum 253, a number and/or location of desired positions of the drum 253 within the seed meter 220, a number and/or location of desired chambers within the seed meter 220, etc.

Figure 13:
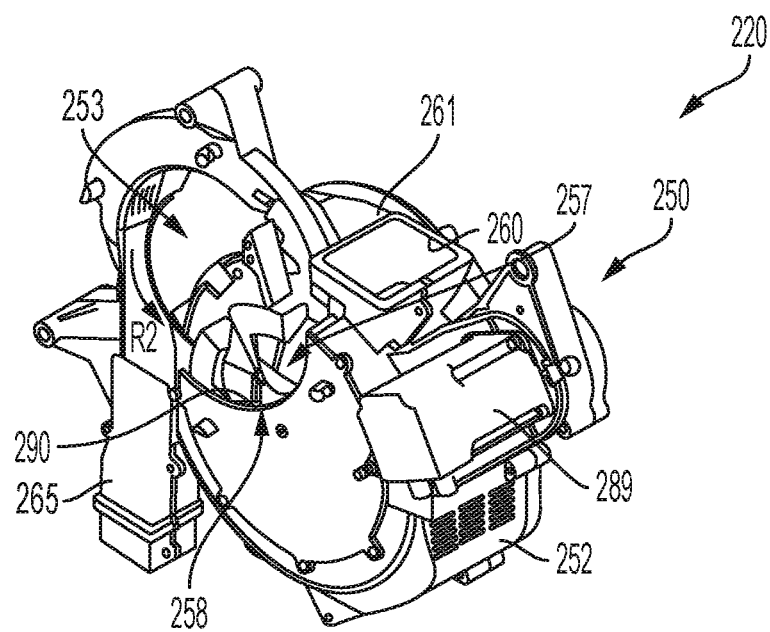
FIG. 13 is another perspective view of the seed meter of FIG. 12, with a portion of a housing of the seed meter removed to illustrate internal components.

With continued reference to FIGS. 12-16B, the seed separator portion 251 of the seed meter 220 includes a housing 262, and a seed disc 263 (or seed singulator) disposed within the housing 262 (where the housing 262 is then coupled to the housing 252 of the seed handler portion 250). The seed disc 263 is configured to rotate generally within the housing 262 (in direction R2 (FIGS. 13 and 15)) to singulate and parse a stipulated, or predetermined, number of seeds from those presented (or delivered) to the seed disc 263 at the planting chamber 258 (e.g., by one of the seed pockets 254 of the drum 253, directly from the planting inlet 261, etc.). In particular, the seed disc 263 includes multiple apertures 264 (FIG. 15) configured to entrain individual seeds thereon (e.g., via vacuum, etc.) as the seeds are presented to the planting chamber 258, through extraction window 290 (located generally between the seed handler portion 250 and the seed separator portion 251 of the seed meter 220) (FIG. 13). The seed disc 263 is configured to then transport the individual seeds to an exit chute 265 where they are dislodged and planted in a corresponding furrow (generally one-by-one, based on the singulation operation of the seed disc 263) via planting tube 266 of the planting unit 206 (FIG. 5). And, when the planting operation is complete for the given seeds in the planting chamber 258 (e.g., in the given seed pocket 254 positioned at the planting chamber 258, etc.), the remainder of the seeds in the seed pocket 254 not planted/deposited is removed from the seed pocket 254 at the evacuation chamber 259 via an evacuation nozzle 267 (upon movement of the seed pocket 254 by the drum 253 to the evacuation chamber 259). This will be described in more detail hereinafter in connection with operation of the seed meter 220.

It should be appreciated that other seed meters may be used with the planter 200 (and the planting units 206 thereof) within the scope of the present disclosure. In connection therewith, the seed meters may include/define any desired number and/or configuration of chambers (i.e., the particular number and arrangement of chambers described herein for the seed meter 220 should not be considered a limiting feature of the present disclosure). For example, seed meters having a single planting chamber may be used, whereby seeds from the first and second seed storage units 222, 224 may be delivered to the single chamber (or may bypass the chamber all together and be delivered directly to the planting tube 266), as desired, by way of the teachings herein. Similarly, seed meters having more than one chamber (i.e., a planting chamber and at least one additional chamber) may be used, again whereby seeds from the first and second seed storage units 222, 224 may be delivered to select ones of the particular chambers (or may bypass the chambers all together), as desired, by way of the teachings herein.

With reference to FIGS. 6 and 17-19B, the planting unit 206 further includes a seed transport system 270 coupled to the seed meter 220 and configured to deliver seeds from each of the first and second seed storage units 222, 224 to the seed meter 220. As best shown in FIGS. 17-19B, the seed transport system 270 includes a delivery funnel 271 positioned generally below the first seed storage unit 222 (e.g., in communication with the funnel 229 of the first seed storage unit 222, etc.), the delivery tube 272 extending from the second seed storage unit 224 and in communication with the delivery funnel 271 (see, also, FIGS. 6 and 20A-20D), and a diverter 273 coupled to (and in communication with)

the delivery funnel 271 and the seed meter 220. In one instance, the delivery funnel 271 is configured to receive seeds from the queue 223 of the first seed storage unit 222, for example, upon actuation of the corresponding doors 225 to allow the seeds to flow out of the queue 223, and then to direct the seeds to the seed meter 220. And, in another instance, the delivery funnel 271 is configured to receive seeds from the second seed storage unit 224, via the delivery tube 272 (coupled to the nest 238 of the second seed storage unit 224 at outlet 231 (see, FIGS. 10A-10D)) and is configured to direct the seeds portioned from the bulk supply of seeds in the container 236 to the seed meter 220.

Figure 18:
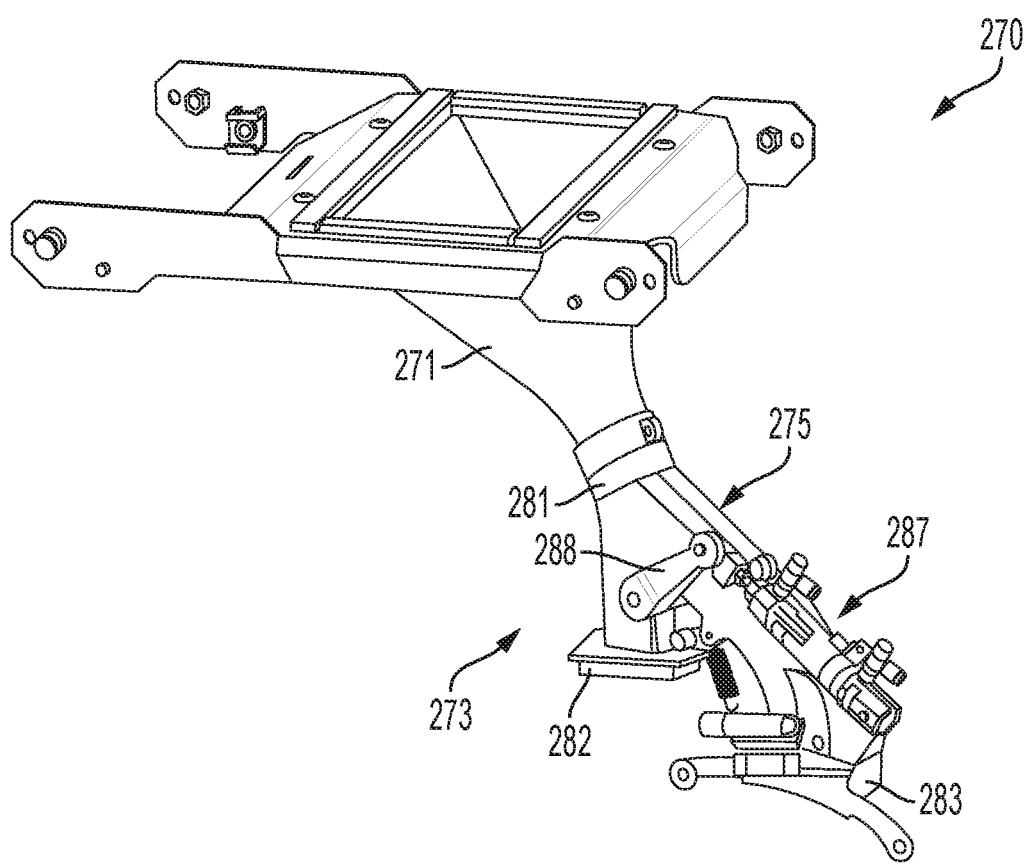
FIG. 18 is a perspective view of a diverter (or diverter unit) of the seed transport system of FIG. 17.
Figure 19B:
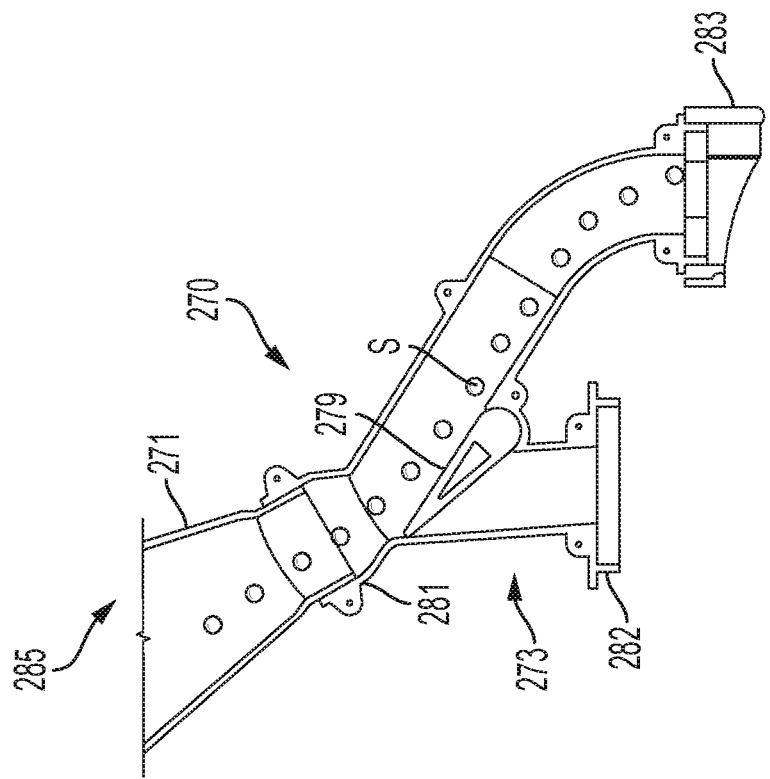
FIGS. 19A-19B are fragmentary elevation views of the diverter of FIG. 18 illustrating operation to direct seeds to the seed meter of the planting unit.
Figure 19A:
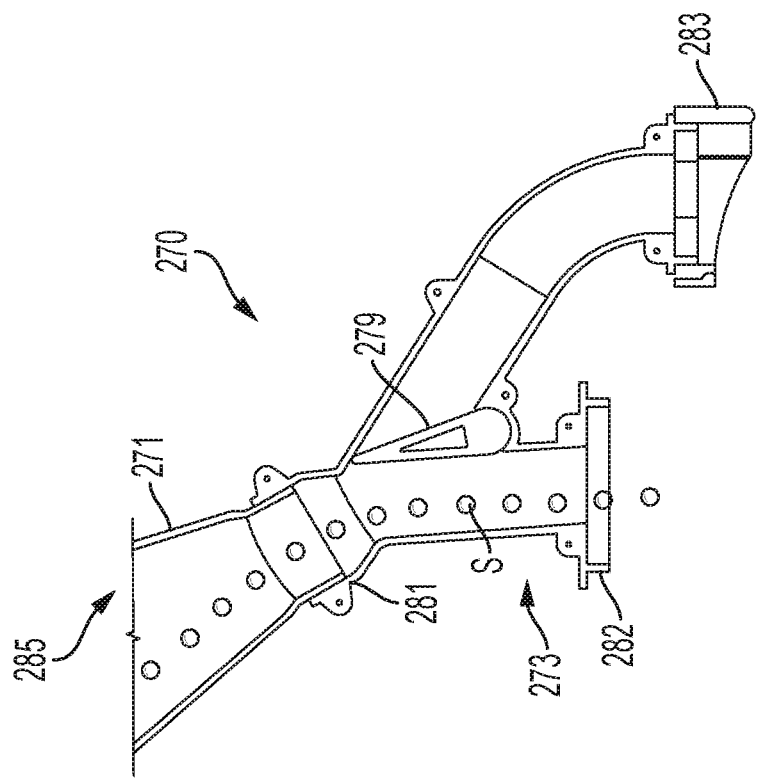
Figure 20A:
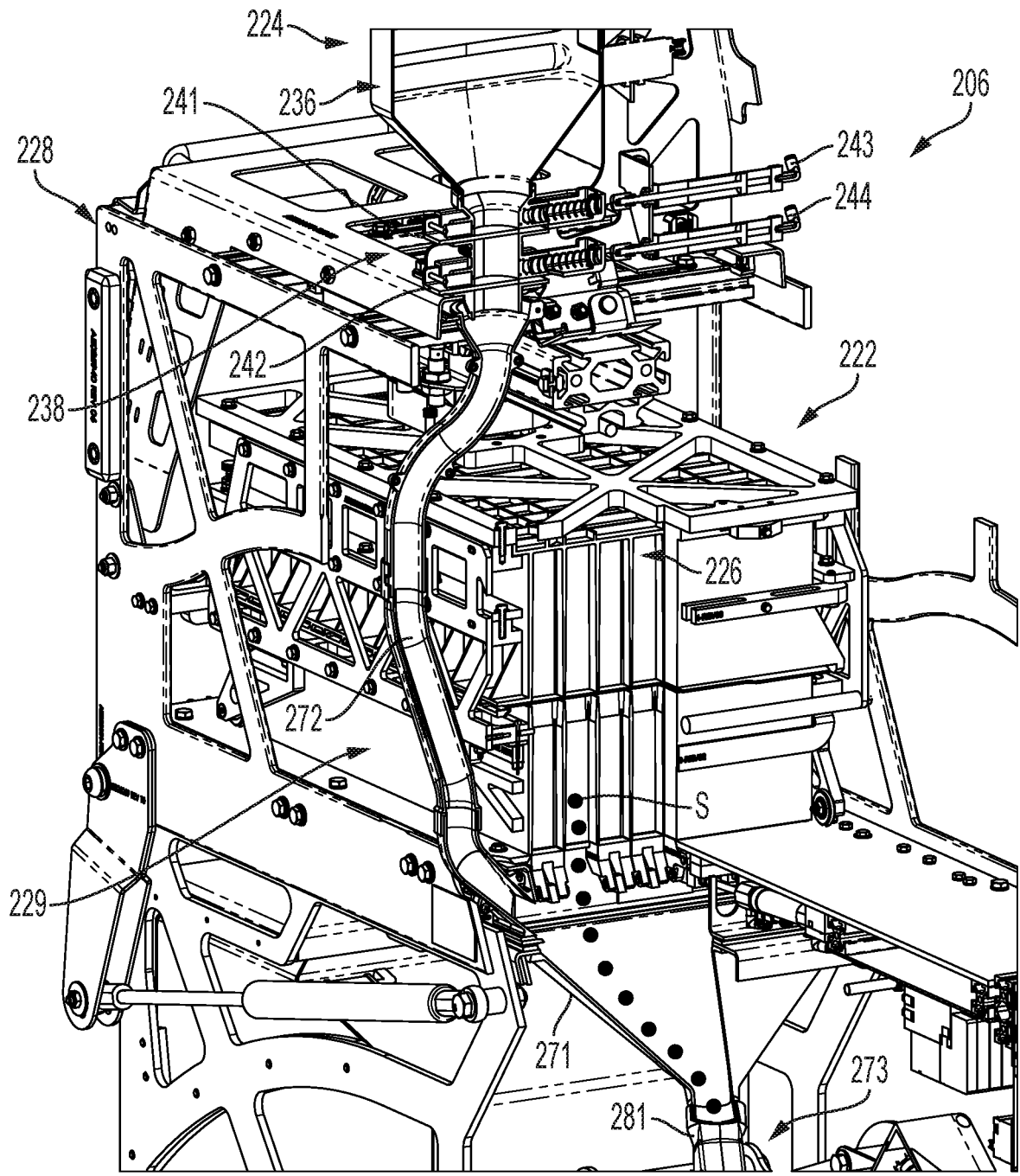
FIGS. 20A-20D are fragmentary perspective views of the planter of FIG. 9 illustrating operation of the planter to dispense seeds from the first and second seed storage units.
Figure 20B:
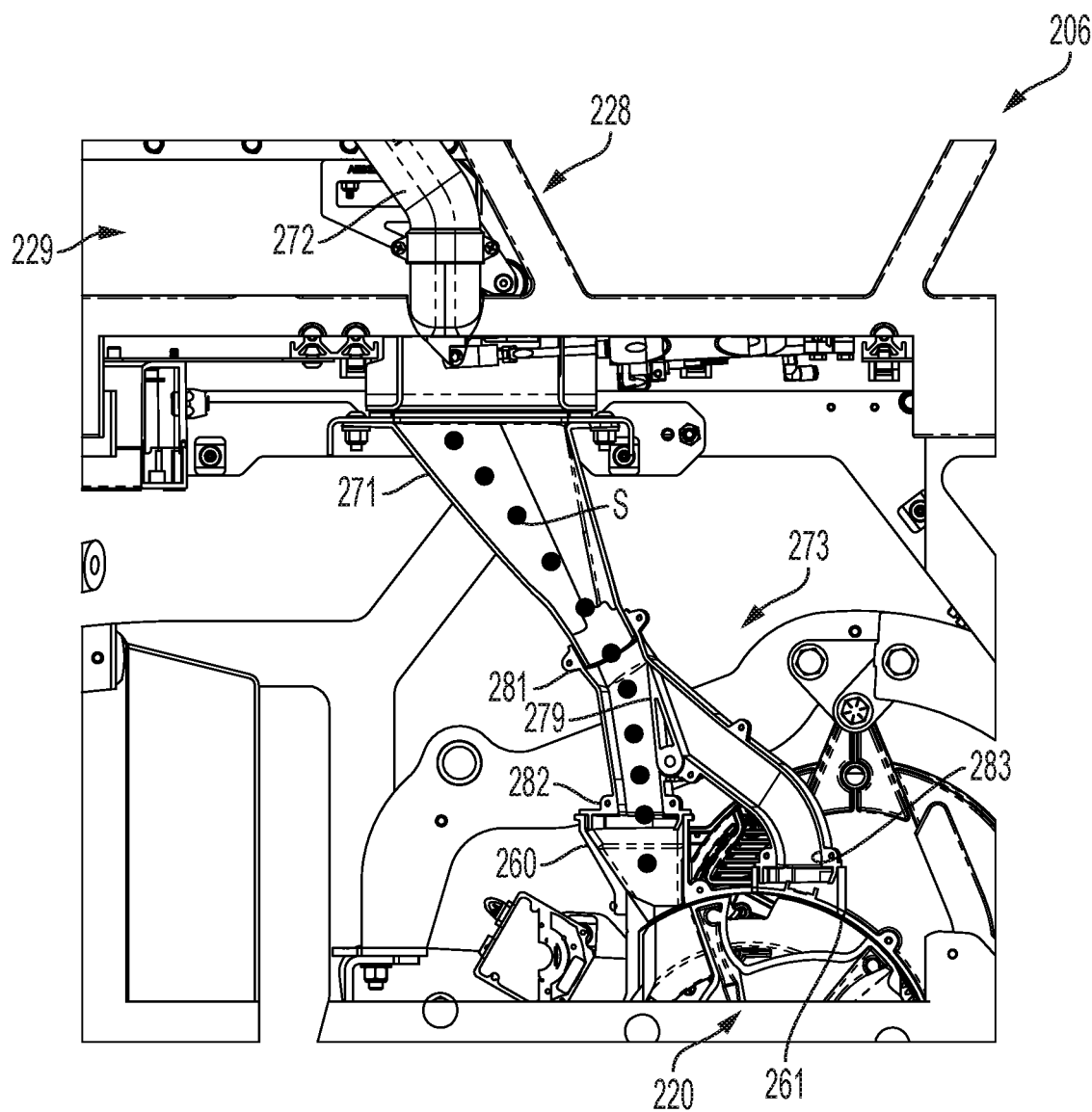
Figure 20C:
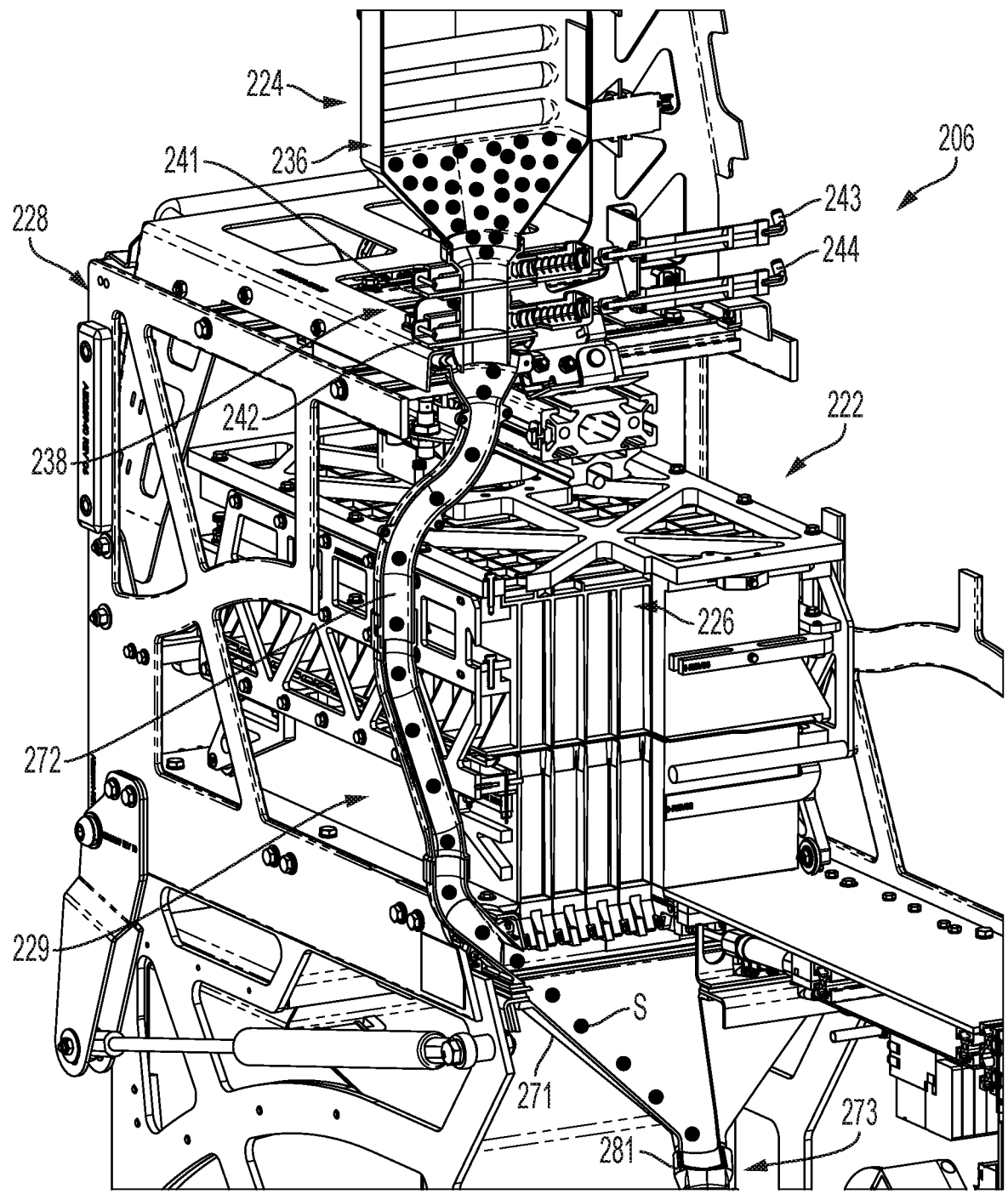
Figure 20D:
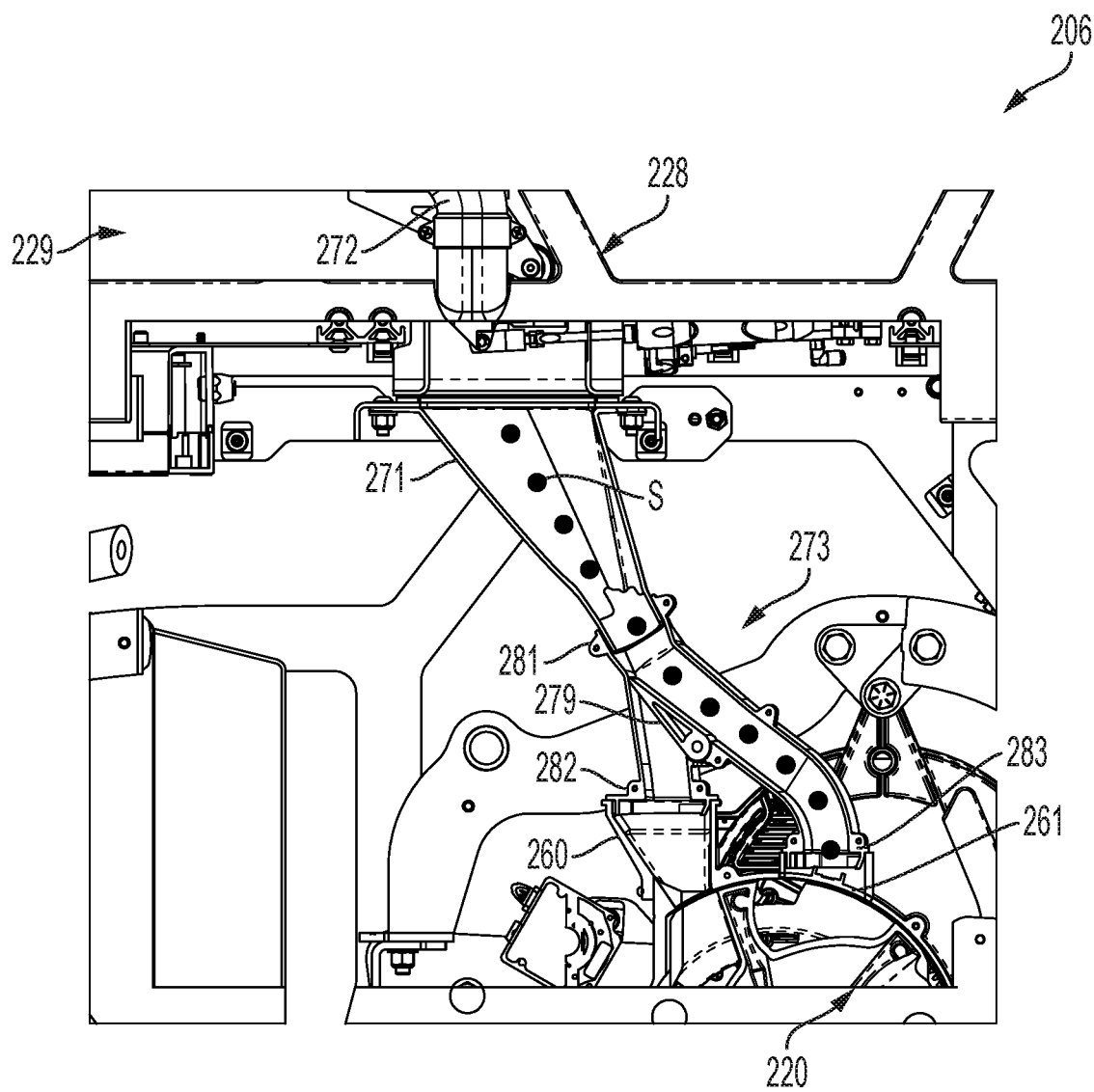

With continued reference to FIGS. 18-19B, the diverter 273 of the seed transport system 270 generally includes a body 275, and a gate 279 disposed within the body 275. In addition, the diverter 273 includes multiple ports 281-283 for receiving seeds into the body 275 and for discharging seeds therefrom. In connection therewith, the diverter 273 defines a flow route 285 through the diverter 273 from the first port 281 to each of the second and third ports 282, 283 (including one path along the flow route 285 to the second port 282 and another path along the flow route 285 to the third port 283). The gate 279 is then provided in the flow route 285 to selectively direct seeds received into the diverter 273 to either the second port 282 or the third port 283 (via operation of the gate 279 by an actuator 287 (e.g., a pneumatic actuator, etc.) of the diverter 273 and a corresponding linkage 288 to the gate 279). In particular, the gate 279 is provided in the flow route 285 to direct seeds received into the diverter 273 via the first port 281 to either the second port 282 or the third port 283. In this manner, the first port 281 is separately in communication with each of the second and third ports 282, 283 (with the particular one of the second and third ports 282, 283 then determined by the positioning of the gate 279).

Based on this unique construction of the diverter 273, in the illustrated embodiment, upon receipt of the seeds from either of the first and second seed storage units 222, 224 (via the delivery funnel 271 and the first port 281), the diverter 273 is configured to selectively deliver the seeds to either the staging chamber 257 of the seed meter 220 (via the staging inlet 260) or the planting chamber 258 of the seed meter 220 (via the planting inlet 261). For instance, in the illustrated embodiment, the first port 281 of the diverter 273 is coupled to the delivery funnel 271 for receiving seeds from both the first and second seed storage units 222, 224. In addition, the second port 282 of the diverter 273 is coupled to the staging inlet 260 of the seed meter 220 at the staging chamber 257, and the third port 283 is coupled to the planting inlet 261 of the seed meter 220 at the planting chamber 258 (see, FIGS. 16A, 16B, and 17). Thus, based on the positioning of the gate 279 within the diverter 273 (as described above), seeds can be selectively delivered from the first and second seed storage units 222, 224 through the diverter 273 to the desired one of the chambers 257, 258 of the seed meter 220 (via the ports 282, 283). With that said, it should be appreciated that the second and third ports 282, 283 of the diverter 273 may be coupled to other chambers of the seed meter 220 as desired. For example, one of the second and third ports 282, 283 may be coupled to the evacuation chamber 259 to allow for clearing the system of seeds if needed. Similarly, one of the second and third ports 282, 283 may be coupled directly to the planting tube 266 to allow for quick planting of seeds (without metering) for planting hill plots, etc.

As described, the illustrated diverter 273 includes the three ports 281-283. In various other embodiments, the diverter 273 may include fewer than three ports or more than three ports. For example, in one exemplary embodiment, the diverter 273 may include the first port 281 coupled to the first and second seed storage units 222, 224 (as described above). The diverter 273 may then include the second and third ports 282, 283 coupled to the staging chamber 257 and the planting chamber 258 (as described above). Then, in this embodiment, the diverter 273 may further include another port coupled to the evacuation chamber 259 (e.g., for clearing seeds from one or more receptacles of the first seed storage unit 222, for clearing seeds from the container 236 of the second seed storage unit 224, etc.) and/or another port coupled directly to the planting tube 266 (bypassing the seed meter 220) (e.g., for facilitating planting spurts of the seeds on hill plots, etc.). In this manner, the diverter 273 is configured to direct seeds from any of the storage units 222, 224 (or from any other storage unit(s) potentially used with the planter 200 through communication of the other storage unit(s) with the diverter 273 as described herein) to any desired destination at the planting unit 206 for subsequently processing the seeds (be it the seed meter 220 or the planting tube 266, etc.).

While the diverter 273 of the seed transport system 270 is described herein as including the gate 279 to selectively direct seeds through the diverter 273, it should be appreciated that other means may be used in other embodiments to similarly direct the seeds. For example, in at least one embodiment, forced air (via an air nozzle similar to nozzle 374) may be used to direct seeds through the diverter 273 instead of the gate 279. In such embodiments, a puff or surge of air from the air nozzle may be applied at about a ninety-degree angle relative to the path of the seed to thereby push the seed toward the desired one of the ports 282, 283.

An example operation of the planter 200 will be described next. Initially, the seed rack 226 for each of the planting units 206 is loaded with seed receptacles filled with selected seeds (e.g., desired seeds to be analyzed/tested, etc.). This may be done on-site where the seeds are to be planted, or off-site at a location remote from where the seeds are to be planted. In either case, once all of the desired seed receptacles are loaded into the cells 227 of the seed rack 226, the cap 232 of the seed rack 226 is installed generally over the seed receptacles (if not already in such position). And then, at the location where the seeds are to be planted (or prior), the seed rack 226 is positioned in the first seed storage unit 222 of the given planting unit 206 on the indexer 228 (e.g., generally upside down such that the cap 232 is disposed adjacent the queue 223 and funnel 229 of the first seed storage unit 222 and the delivery funnel 271 of the seed transport system 270, with the doors 225 generally inhibiting the seeds from moving out of the queue 223; etc.). Similarly, the container 236 of the second seed storage unit 224 is loaded with selected seeds (again, either on-site or off-site), and then, at the location where the seeds are to be planted (or prior), is positioned in the second seed storage unit 224 of the given planting unit 206 (e.g., such that the spout 239 of the container 236 is in communication with the nest 238, etc.).

Once the desired seeds are loaded in each of the planting units 206 of the planter 200, the planter 200 is then positioned in a field in preparation for traversing the field to plant plots of the different kinds of the seeds (from the first and second seed storage units 222, 224 of each of the planting units 206). In so doing, in this example, the control system 208 associated with the planter 200 is configured to operate the first and second seed storage units 222, 224 in conjunction with the diverter 273 and the seed meter 220 to plant a particular combination of the seeds from the first seed storage unit 222 and the second seed storage unit 224 in a plot (e.g., in accordance with a planting plan, etc.).

With that said, to initiate the planting operation in this example (as the planter 200 begins moving), the control system 208 is configured (for a given one of the planting units 206) to incrementally, or stepwise, rotate the drum 253 of the seed meter 220, relative to the housing 252 (in a suitable manner, for example, via motor 289), and position the upper opening 255 of a first seed pocket 254 adjacent the staging inlet 260 (e.g., within the staging chamber 257 and in a seed loading position, etc.). In addition, the control system 208 is configured to actuate a select one of the doors 225 of the first seed storage unit 222 to thereby release desired seeds (e.g., a desired set of seeds, etc.) from the queue 223 to the funnel 229 (in accordance with the planting plan, in accordance with other data provided to the planter 200, etc.) (see, also, FIG. 20A). In turn, the funnel 229 directs the seeds to the delivery funnel 271 and the first port 281 of the diverter 273. Here, because the planting operation is starting, and because the planter 200 is at the beginning of the given plot, the control system 208 is configured to position the gate 279 of the diverter 273 (as located within the flow route 285 of the diverter 273) (via the actuator 287) to block access (and a corresponding path) to the third port 283 (see, also, FIG. 20B). As such, the seeds pass through the diverter 273, along the flow route 285, from the first port 281 to the second port 282, where they then move into the staging chamber 257 of the seed meter 220 via the staging inlet 260. And, the seeds are then delivered into the first seed pocket 254 of the drum 253.

The control system 208 is configured to next rotate the drum 253 and position the first seed pocket 254 (with the seeds disposed therein) adjacent the seed disc 263 of the seed separator portion 251 of the seed meter 220 (within the planting chamber 258 in a seed planting position, etc.). Here, the lower opening 256 of the first seed pocket 254 is disposed in fluid communication with the apertures 264 of the seed disc 263, through the extraction window 290, and the seeds fall (e.g., via gravity, forced air, etc.) to the lower opening 256 where they are presented (through the extraction window 290) to the seed disc 263 (e.g., the seeds slide into contact with the seed disc 263, etc.). In turn, the control system 208 is configured to rotate the seed disc 263 and move each of the apertures 264 through the extraction window 290 and past the lower opening 256 of the first seed pocket 254. In this manner, seeds from the first seed pocket 254 are captured by the apertures 264 (e.g., the seeds are drawn to the apertures 264 via vacuum, etc.) and are rotated, by the seed disc 263, from the extraction window 290 to the exit chute 265 where they are dislodged from the apertures 290 via a wiper 291. The dislodged seeds then fall through the planting tube 266 and are planted in a furrow created by the planting unit 206.

The rotation of the first seed pocket 254 of the drum 253 from the staging chamber 257 of the seed meter 220 to the planting chamber 258 (i.e., to the position adjacent the seed disc 263) also positions a subsequent one of the seed pockets 254, i.e., a second seed pocket 254, adjacent the staging inlet 260 (e.g., in the staging chamber 257, etc.). In this example, the planting plan requires seed from the bulk supply be planted next (adjacent the plot just planted). As such, the control system 208 is configured to actuate the sluice plates 241, 242 of the second seed storage unit 224 (as generally described above) to thereby release seeds from the container 236 to the delivery tube 272 of the seed transport system 270 (via the outlet 231 of the nest 238) (see, also, FIG. 20C). In turn, the delivery tube 272 directs the seeds to the delivery funnel 271, which then delivers the seeds to the diverter 273 (see, again, FIG. 20B). Here, because the planting operation is starting with regard to the seeds from the bulk supply, the control system 208 is further configured to position the gate 279 of the diverter 273, within the flow route 285, to again block access (and a corresponding path) to the third port 283. As such, the seeds from the bulk supply pass through the diverter 273, along the flow route 285, from the first port 281 to the second port 282, where they then move into the staging chamber 257 of the seed meter 220 (and are received in the second seed pocket 254 of the drum 253).

When the first seed pocket 254 of the drum 253 moves to the planting chamber 258 (as described above), a level sensor 292 (e.g., an ultrasonic level sensor, etc.) (FIG. 16B) is configured to monitor, measure, detect, etc. the level of the seeds in the planting chamber 258. If the seed level falls below a predefined level or threshold in connection with planting the given plot, the level sensor 292 is configured to notify the control system 208 whereby the control system 208 is configured to direct additional seeds from the first seed storage unit 222 (of the same type being planted) to the planting chamber 258. In particular, when such a notification is received from the level sensor 292, the control system 208 is configured to identify another set of seeds in the first seed storage unit 222 having the same type of seed as that currently being planted, and then is configured to actuate the door(s) 225 of the first seed storage unit 222 associated therewith to release the seeds to the funnel 229. In turn, again, the funnel 229 directs the seeds to the delivery funnel 271, which in turn directs the seeds to the first port 281 of the diverter 273. Here, though, because the planting operation has already started, and because the subsequent seeds are needed to continue and complete the current planting operation, the control system 208 is configured to position the gate 279, within the flow route 285 of the diverter 273, to block access (and a corresponding path) to the second port 282 (see, also, FIG. 20D). As such, the subsequent seeds pass through the diverter 273, along the flow route 285, from the first port 281 to the third port 283, where they then move directly into the planting chamber 258 of the seed meter 220 (such that planting can immediately continue with the subsequent seeds without further movement of the drum 253, etc.).

In this manner, the planning of the seeds for the given plot is not interrupted, even though additional seeds are required to complete the planting. In addition, by delivery of the subsequent seeds directly to the planting chamber 258 of the seed meter 220 (as opposed to the staging chamber 257), filling of the second pocket 254 of the drum 253 with the seeds from the bulk supply, as described above (based on the given planting plan in this example), is not delayed. In other words, such redirection of the subsequent seeds (and bypass of the staging chamber) facilitates and preserves the sequential operation of the seed meter 220 based on the given planting plan, particularly when it is determined that additional seeds are required for planting at any given time.

Next in this example, once the stipulated number of seeds are parsed from the first seed pocket 254 by the seed disc 263 to complete the given plot, the control system 208 is configured to rotate the drum 253 and position the first seed pocket 254 in the evacuation chamber 259 of the seed meter 220 (e.g., in an evacuation position, etc.). Here, the upper opening 255 of the first seed pocket 254 is disposed adjacent the evacuation nozzle 267 (such that the first seed pocket 254 is in communication with the evacuation nozzle 267 via the evacuation chamber 259), and any seeds remaining in the first seed pocket 254 are removed (e.g., by vacuum, gravity, forced air, combinations thereof, etc.) through the evacuation nozzle 267 (e.g., to an evacuation receptacle, etc.). In so doing, the drum 253 moves through a wiping position generally between the planting chamber 258 and the evacuation chamber 259, where the wiper 291 of the seed pocket 254 is configured to dislodge any excess seeds, as still entrained by the seed disc 263, back into the first seed pocket 254 (for removal).

This movement of the first seed pocket 254 of the drum 253 to the evacuation chamber 259 further positions a subsequent one of the seed pockets 254, i.e., a third seed pocket 254, in the staging chamber 257. And, in this example (according to the planting plan), seeds from another seed receptacle in the first seed storage unit 222 are released to the staging chamber 257 of the seed meter 220, for receipt in the third seed pocket 254 (in the same manner as described above). Further, the second seed pocket 254 moves to the planting chamber 258, whereby the seeds from the bulk supply contained in the second seed pocket 254 are presented to the seed disc 263 (in the same manner as described above) for planting. Again, the level sensor 292 is configured to monitor the level of the seeds in the planting chamber 258 and, if the seed level falls below the predefined level, the level sensor 292 is configured to notify the control system 208 whereby the control system 208 can direct additional seeds from the second seed storage unit 224 to the planting chamber 258 for planting. In particular, when such a notification is received from the level sensor 292 with regard to the seeds from the bulk supply, the control system 208 is configured to actuate the sluice plates 241, 242 of the container 236 to thereby release additional seeds from the container 236 to the delivery tube 272. In turn, the delivery tube 272 directs the seeds to the delivery funnel 271, which then delivers the seeds to the diverter 273. Here, though, because the planting operation has already started, and because the subsequent seeds are needed to continue/complete the current planting operation, the control system 208 is configured to position the gate 279 of the diverter 273 to block access (and a corresponding path) to the second port 282 along the flow route 285. As such, the subsequent seeds from the bulk supply pass through the diverter 273, along the flow route 285, from the first port 281 to the third port 283, where they then move directly into the planting chamber 258 of the seed meter 220 (bypassing the staging chamber 257).

The above operation of the planter 200 continues for the given planting unit 206 until the planting plan is complete (with continued rotation of the drum 253 moving the various seed pockets 254, one by one, through each of the stations of the seed meter 220, as appropriate). In addition, it should be appreciated that the above operation similarly applies to each of the other planting units 206 of the planter 200. Accordingly, as the planter 200 traverses across the field, each of the planting units 206 can independently control (and independently change) the kind and/or rate and/or row spacing of seeds dispensed by its seed meter 220 and planted in the field (e.g., one of the planting units 206 may plant seeds from the first seed storage unit 222 while, at the same time, an adjacent one of the planting units 206 may plant seeds from the second seed storage unit 224; etc.).

Also in the above planting operation, the control system 208 may utilize GPS data to effect one or more of the given operations. For example, the control system 208 may compare GPS-reported locations of the planter 200 to a map associated with the planting plan in order to determine the particular seeds to be planted in and/or around a given plot, and in order to determine boundary locations at which the drum 253 of the seed meter 220 is to be operated to change the types of seeds being planted. In addition, in some embodiments, operator inputs may also, or alternatively, be used to determine the particular seeds to be planted and the locations for such planting. Or, sensors associated with (e.g., mounted to and/or otherwise in communication with, etc.) the planter 200 (or artificial intelligence (and related data) provided to the planter 200 from one or more remote sources) may be used to determine the particular seeds to be planted based on sensed field conditions at the given location of the planter 200, etc. Further, in various embodiments, the control system 208 may be configured to command the seed meter 220 to drive the seed disc 263 either at a constant rate or at a rate determined by comparing a GPS-reported location of the planter 200 to the map associated with the planting plan. Such GPS-reported locations may also be used by the control system 208 to determine proper spacing between the planting units 206 of the planter 200 (whereby the spacing may be adjusted by moving one or more of the planting units 206 along the frame 204, etc.).

As an alternative to the above planting operation, when the planting plan (or other communication with the planter 200) requires seeds from the bulk supply to be planted, the control system 208 may be configured (at the outset of planting the seeds from the bulk supply) to direct the seeds straight to the planting chamber 258 of the seed meter 220, instead of the staging chamber 257. In this alternative, then, only seeds from the first seed storage unit 222 are received in the seed pockets 254 of the drum 253 at the staging chamber 257 (in other words, in this alternative, only the seeds from the first seed storage unit 222 are staged for planting).

In particular, and as generally described above, once the stipulated number of seeds from the first seed storage unit 222 are parsed from the first seed pocket 254 by the seed disc 263, the control system 208 is configured to rotate the drum 253 and position the first seed pocket 254 in the evacuation chamber 259 of the seed meter 220. In so doing, the drum 253 moves through the wiping position generally between the planting chamber 258 and the evacuation chamber 259, where the wiper 291 of the seed pocket 254 dislodges any excess seeds still entrained by the seed disc 263 back into the first seed pocket 254 (for removal). At this position, the control system 208 may be configured to stop the drum 253 and hold the first seed pocket 254 in the wiping position. Then, based on the planting plan (or other communication to the planter 200) requiring seeds from the bulk supply be planted next, the control system 208 may be configured to actuate the sluice plates 241, 242 of the second seed storage unit 224 (as generally described above) to thereby cause the container 236 to release seeds to the delivery tube 272 of the seed transport system 270. In turn, the delivery tube 272 directs the seeds to the delivery funnel 271, which then delivers the seeds to the diverter 273. Here, though, the control system 208 is configured to position the gate 279 in the diverter 273 to block access (and a corresponding path) to the second port 282 along the flow route 285. As such, the seeds pass through the diverter 273, along the flow route 285, from the first port 281 to the third port 283, where they then move directly into the planting chamber 258 of the seed meter 220. The seeds from the bulk supply may then be planted, through operation of the seed disc 263 (as described above), without actual staging of the seeds.

As still another alternative to the above planting operation(s), when the planting plan (or other communication to the planter 200) requires seeds from either of the first or second seed storage units 222, 224 to be planted in spurts, for example, to plant seeds on hill plots (e.g., two or more unsingulated seeds at substantially the same time, etc.), the control system 208 may be configured to direct the seeds straight to the planting tube 266 (via a port of the diverter 273 and suitable conduit), instead of to the seed meter 220 (whereby the seeds are not singulated by the seed meter 220).

In various embodiments, the seed meter 220 may further include one or more pre-singulators, teeth, wedges, etc. located in the path of the seed disc 263 (e.g., along the drum 253, etc.) to remove (or dislodge) seeds from the seed disc 263, for example, when multiple seeds are captured by a single one of the apertures 264. In so doing, the extra seeds may fall back into the given seed pocket 254 of the drum 253 (such that only one seed remains entrained on each respective aperture 264 of the seed disc 263), whereby they may be subsequently captured by the seed disc 263 (and delivered for planting). Or, the dislodged seeds may fall back into a bin associated with the seed pocket 254 (and may then be removed from the seed meter 220 when the seed pocket 254 moves into position to evacuate unused seeds therefrom.

In some embodiments, planting units may be modified to include the seed meter 220 and the diverter 273 of the present disclosure (e.g., existing cassette planters, etc.). In such planting units, a portion of a frame for supporting the seed meter 220 may need to be removed in order to accommodate the diverter 273. In such embodiments, in anticipation of such modification, the portion of the frame of the planting units to be removed may be perforated to allow for easy removal.

As described above, the planter 200 (and the various components and/or operations thereof) may be controlled (and/or coordinated) by the control system 208 (broadly, a computing device). In connection therewith, FIG. 21 illustrates an example relationship between the planter 200 and the control system 208. As shown, the planter 200 is coupled to (and is in communication with) the control system 208 via network 212, to facilitate the communication and interactions described above. And, in connection therewith, the network 212 may include, without limitation, a local area network (LAN), a wide area network (WAN) (e.g., the Internet, etc.), a mobile network, a virtual network, and/or another suitable public and/or private network capable of supporting communication among the planter 200 and the control system 208, or any combination thereof. Alternatively, as indicated by the dotted line in FIG. 20, the planter 200 may be directly coupled to (and in communication with) the control system 208, for example, via a wired connection, etc. (e.g., the control system 208 may be an integral part of the planter 200 located onboard the planter 200, etc.).

FIGS. 22-28D illustrate another example embodiment of a second seed storage unit 324 and diverter 373 that may be used in a planting unit 206 of the planter 200 described above with reference to FIGS. 2-21 (e.g., as a bulk seed storage unit thereof, etc.) (with like reference numbers in the following description referring to like parts in FIGS. 2-21).

The second seed storage unit 324 of this embodiment is substantially similar to the second seed storage unit 224 described above. For example, the storage unit 324 of this embodiment again generally includes a container 336 configured to hold the bulk supply of seeds therein, and a support 337 configured to releasably hold the container 336 on the planting unit 206. In particular, the support 337 includes a nest 338 configured to receive a dispensing spout 339 of the container 336 (when the container 336 is coupled thereto) and a moveable brace 340 configured to secure/retain the container 336 in the support 337. As such, the container 336 may be selectively removed from the support 337 (via pivoting movement of the brace 340) in order to receive the bulk supply of seeds therein, and then, once filled, re-coupled to the support 337 in the manner described above for the container 236. Seeds may then also be dispensed from the container 336 in the same manner described above for the container 236 (e.g., via selective activation of sluice plates 341, 342 of the nest 338, etc.).

Figure 23:
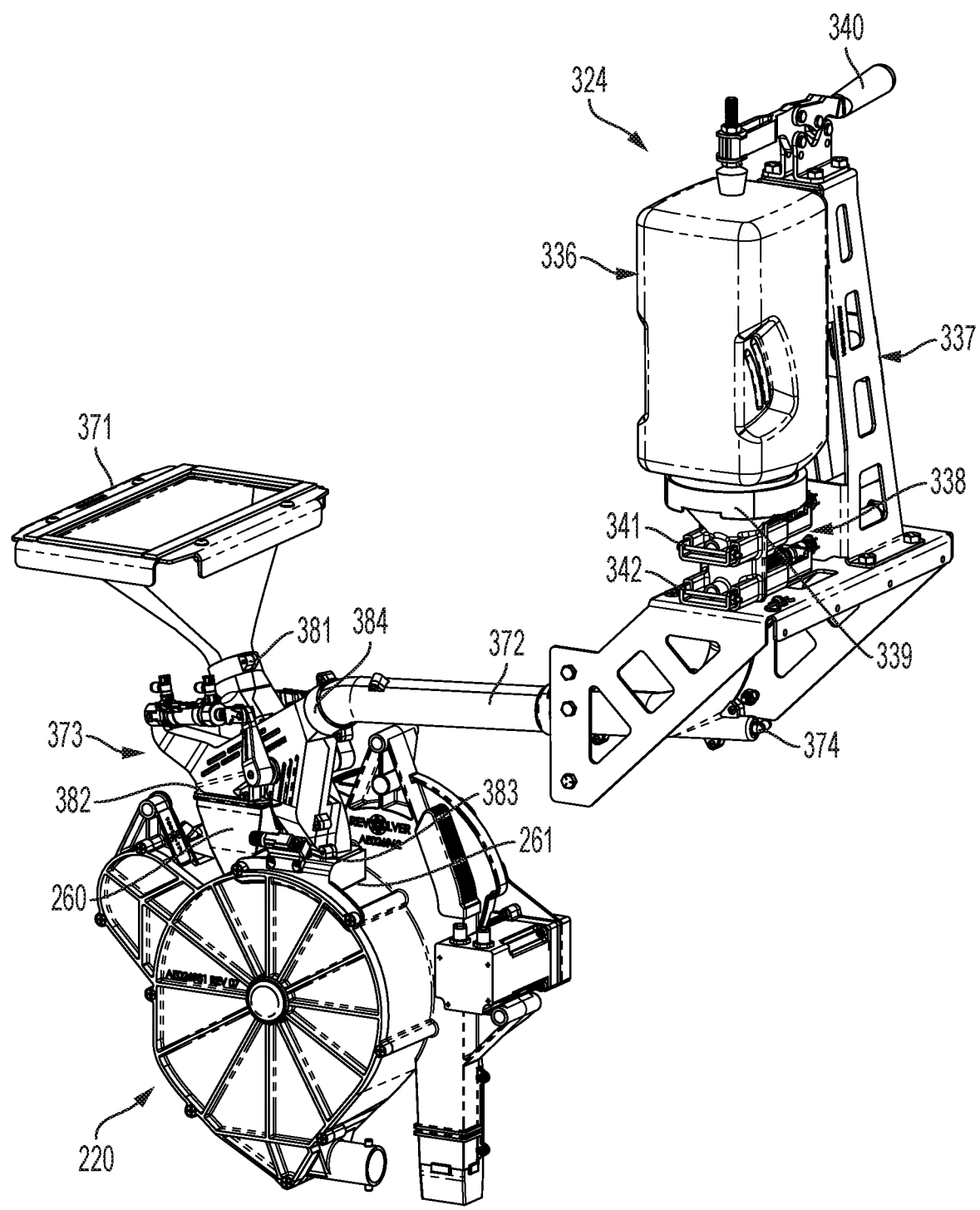

In this embodiment, though, as shown in FIGS. 22-24, the seed storage unit 324 is configured to couple to the planting unit 206 (via the support 337) at a generally forward location of the planting unit 206 (and generally forward of the first seed storage unit 222, and apart from the indexer 228) (e.g., to a frame portion of the planting unit 206, etc.). In connection therewith, to accommodate this positioning of the seed storage unit 324, the planting unit 206 also includes the diverter 373. The diverter 373 is coupled to the seed meter 220 and is again configured to deliver seeds from each of the first and second seed storage units 222, 324 to the seed meter 220. In particular, a delivery funnel 371 is positioned to deliver seeds to the diverter 373 from the first seed storage unit 222 (e.g., where the delivery funnel 371 is in communication with the funnel 229 of the first seed storage unit 222, etc.). And, a delivery tube 372 extends between the second seed storage unit 324 and the diverter 373 to deliver seeds to the diverter 373 from the second seed storage unit 324. In addition in this embodiment, an air nozzle 374 is coupled to the delivery tube 372 adjacent the nest 338 of the second seed storage unit 324 and is configured to direct air (e.g., compressed air, forced air from a reservoir, etc.) into the tube 372 to help facilitate movement of the seeds (when released from the container 336, as described above) through the tube 372 to the diverter 373 and seed meter 220 (in conjunction with a vent structure 369).

Figure 26:
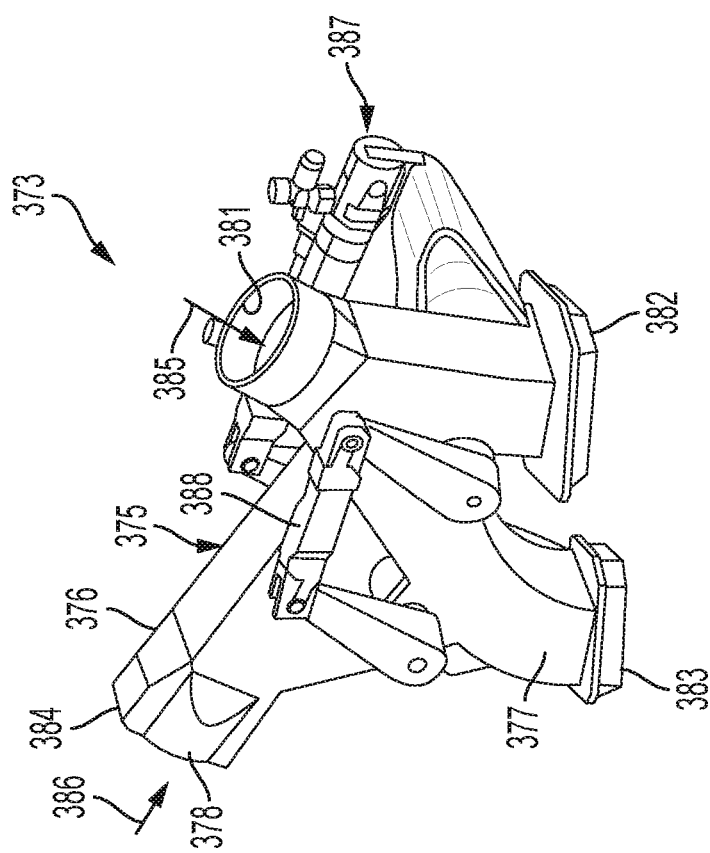
FIGS. 25-26 are perspective views of the diverter of FIG. 22.
Figure 25:
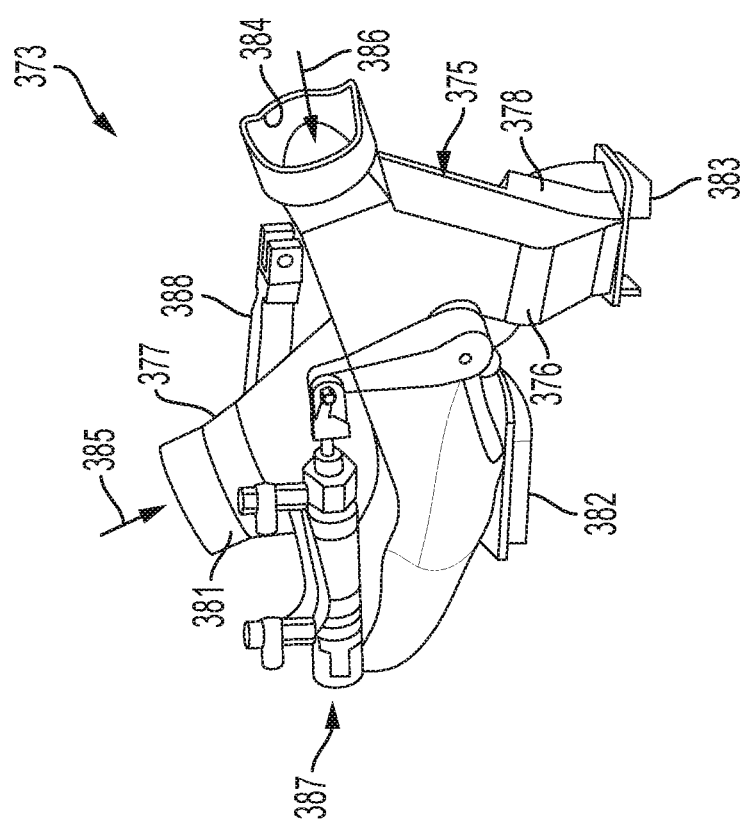
Figure 27:
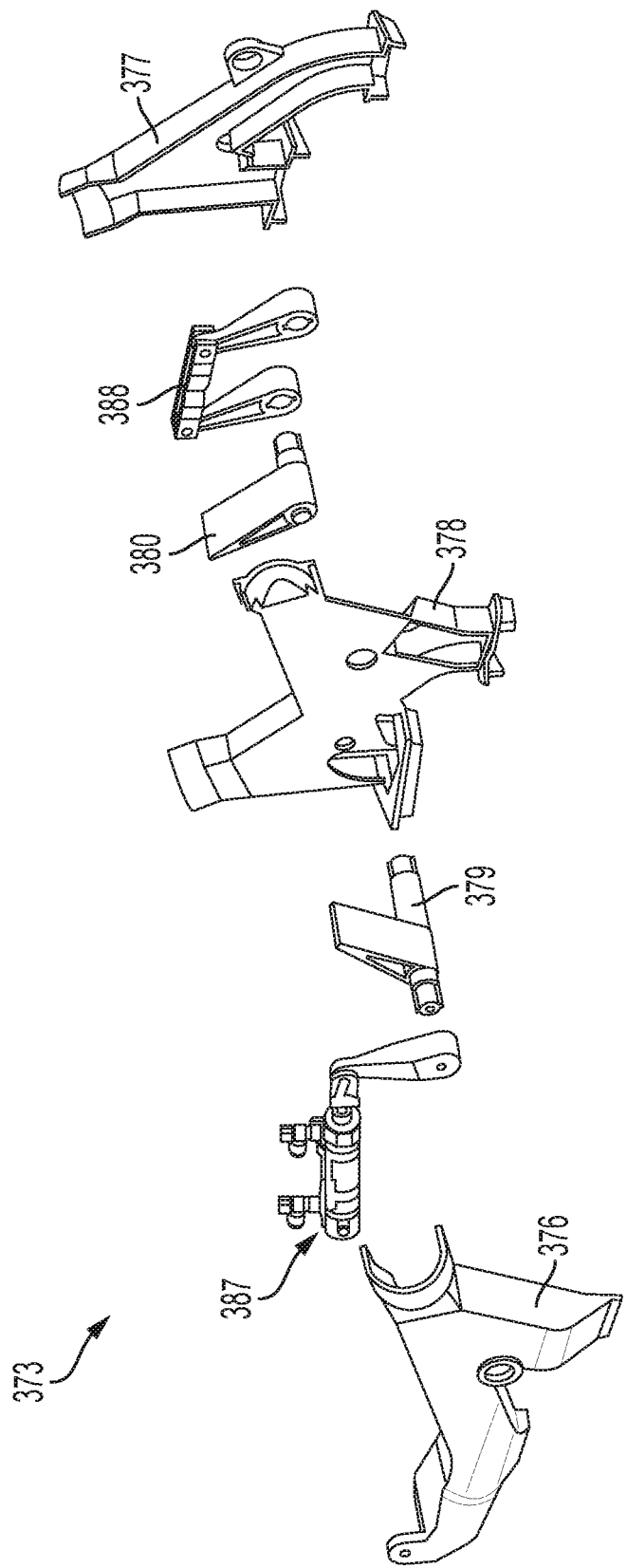
FIG. 27 is an exploded perspective view of the diverter of FIG. 22.
Figure 28A:
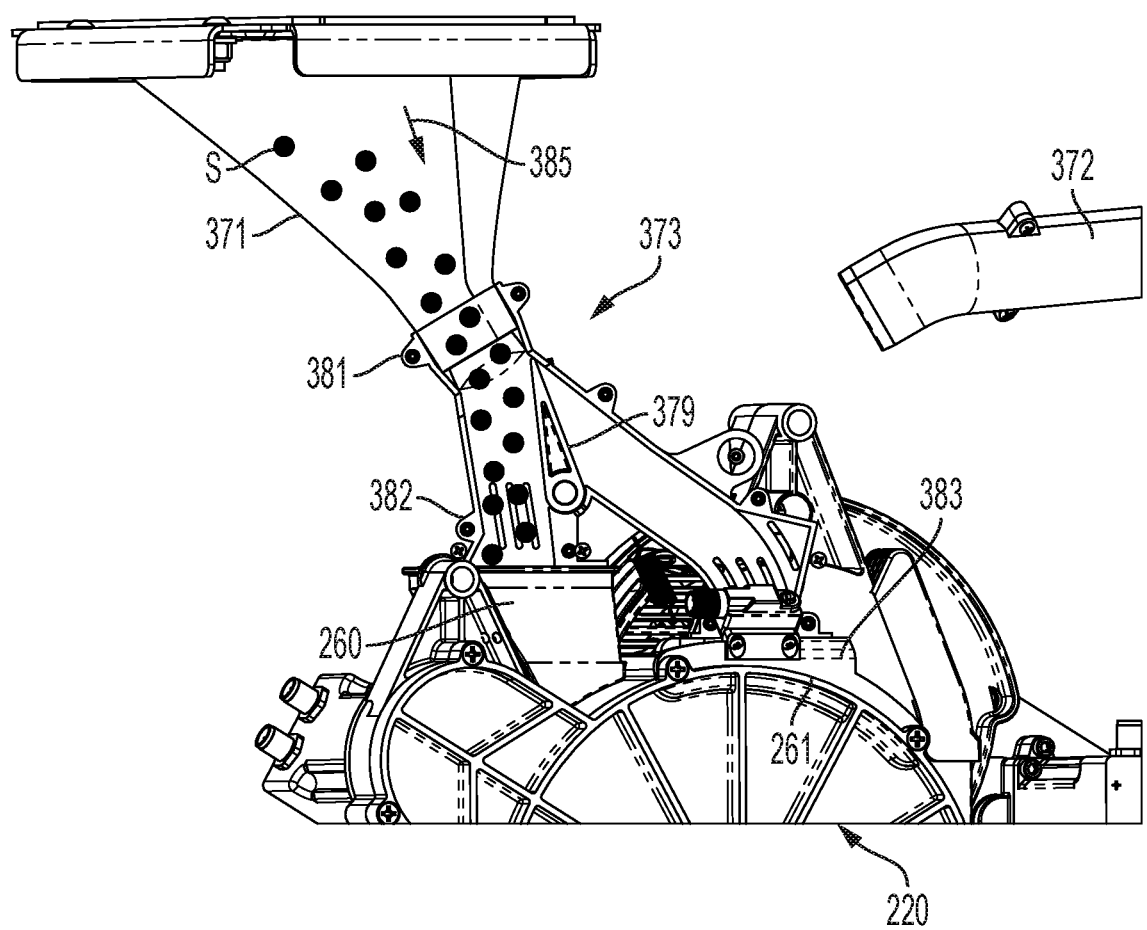
FIGS. 28A-28D are fragmentary perspective views of the second seed storage unit and diverter of FIG. 22 illustrating operation thereof to direct seeds from the first and second seed storage units to the seed meter.
Figure 28B:
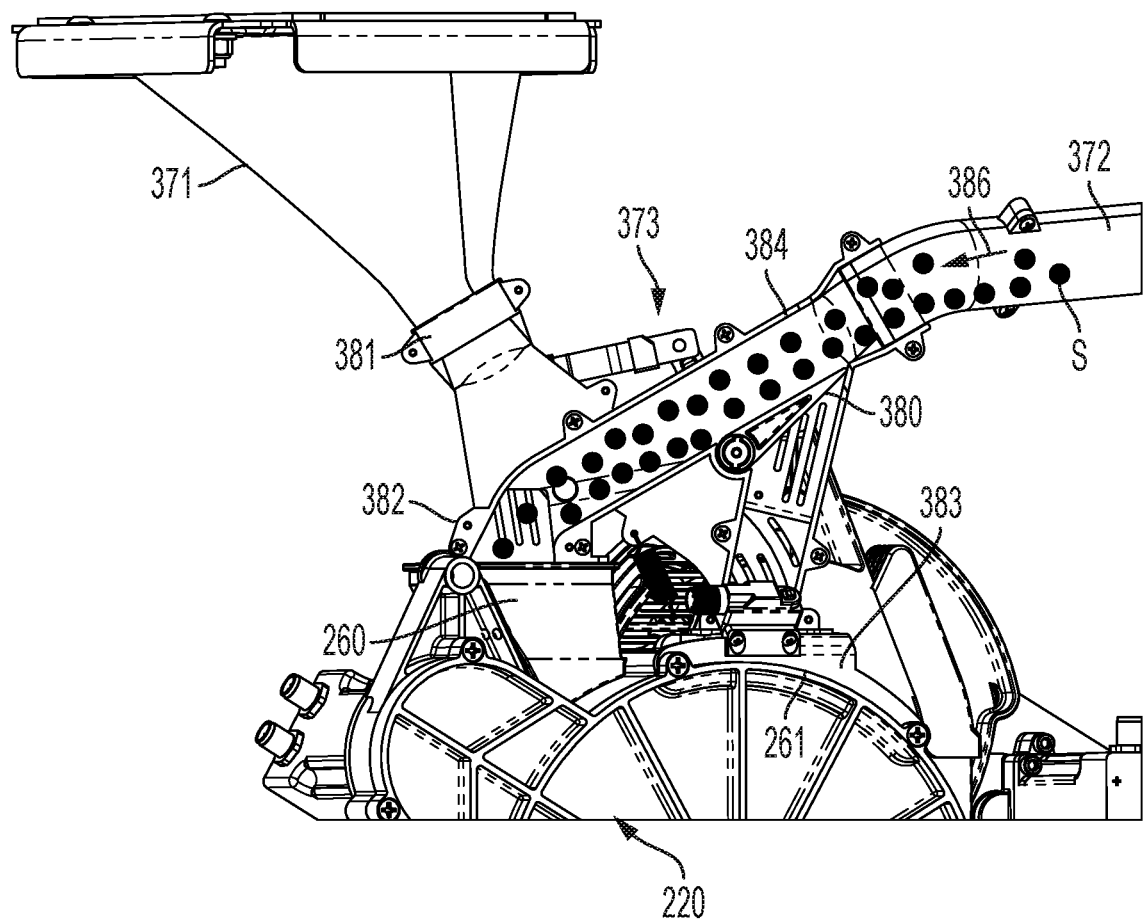
Figure 28C:
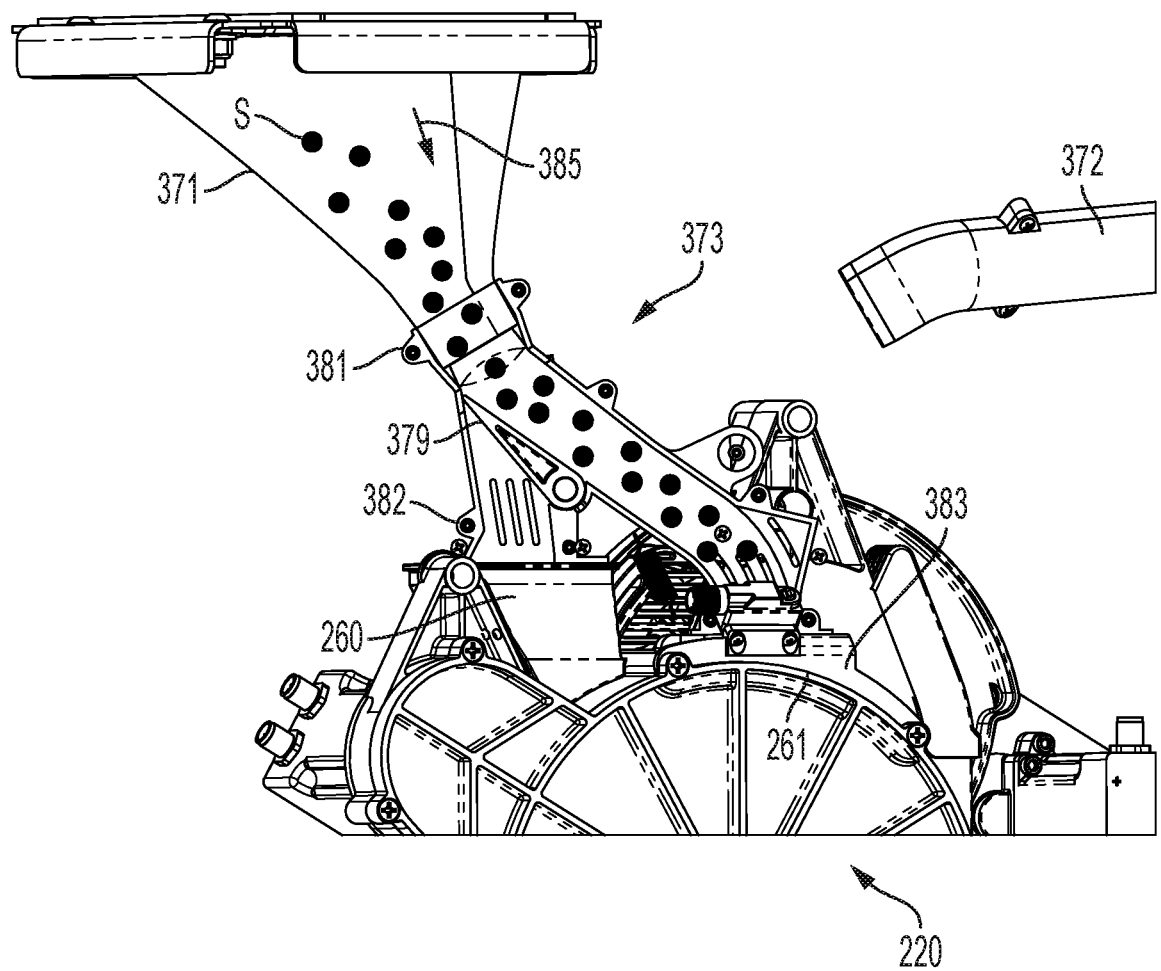
Figure 28D:
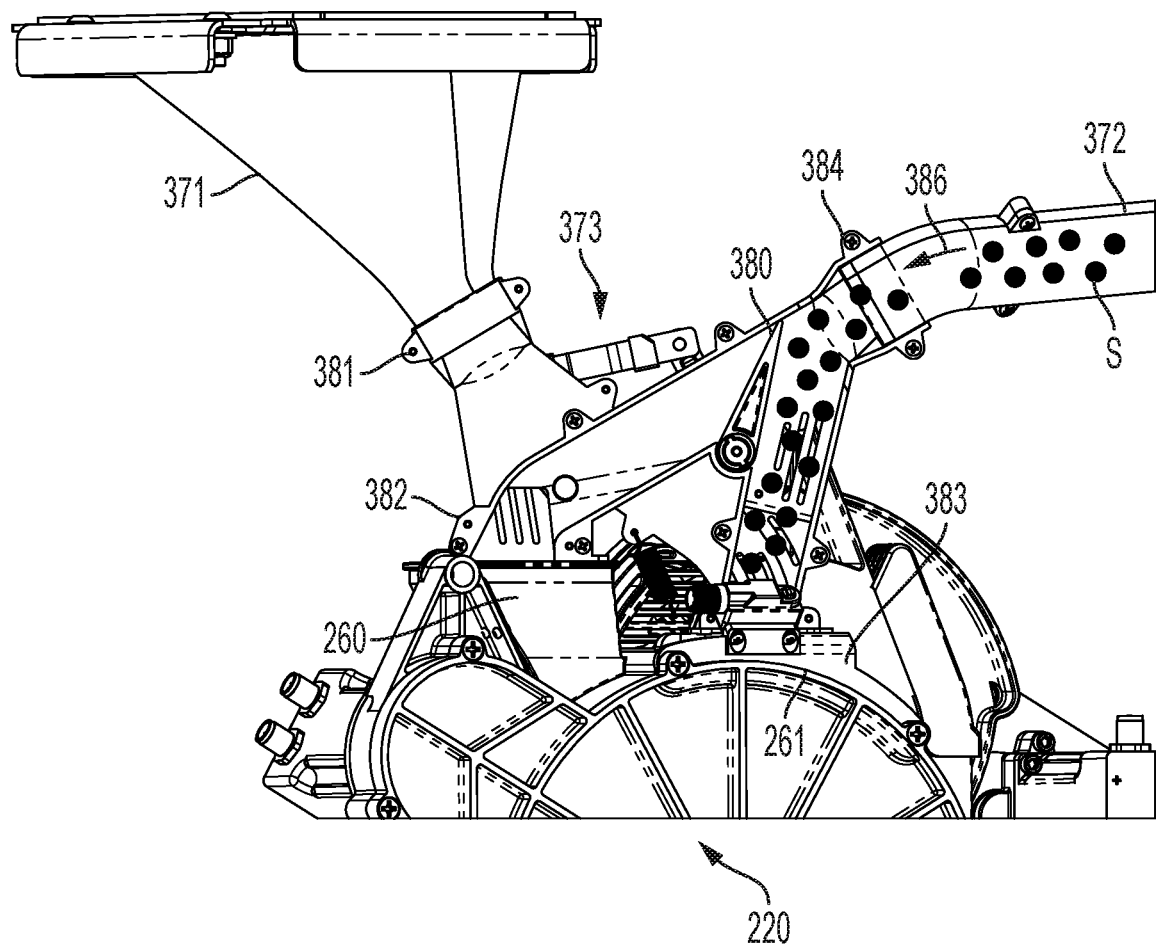

As best shown in FIGS. 25-27, the diverter 373 of this embodiment generally includes a body 375 having first and second external frames 376, 377 and an interior wall 378 coupled there between. A first gate 379 is disposed within the body 375 between the first external frame 376 and the interior wall 378, and a second gate 380 is disposed within the body 375 between the second external frame 377 and the interior wall 378. In addition, the diverter 373 includes multiple ports 381-384 for receiving seeds into the body 375 and for discharging seeds therefrom. In connection therewith, the diverter 373 defines a flow route 385 through the diverter 373 from the first port 381 to each of the second and third ports 382, 383 (including one path along the flow route 385 to the second port 383 and another path along the flow route 385 to the third port 383), and a flow route 386 from the fourth port 384 to each of the second and third ports 382, 383 (again including one path along the flow route 386 to the second port 382 and another path along the flow route 386 to the third port 383). As such, in this embodiment, the diverter 373 includes two separate input ports (one in communication with each of the first and second seed storage units 222, 324). The first and second gates 379, 380 are then provided in the respective flow routes 385, 386 to selectively direct seeds received into the diverter 373 to either the second port 382 or the third port 383 (via operation of the gates 379, 380 by an actuator 387 (e.g., a pneumatic actuator, etc.) of the diverter 373 and a corresponding linkage 388 between the gates 379, 380). In particular, the first gate 379 is provided in the flow route 385 to direct seeds received into the diverter 373 via the first port 381 to either the second port 382 or the third port 383, and the second gate 380 is provided in the flow route 386 to direct seeds received into the diverter 373 via the fourth port 384 to either the second port 382 or the third port 383. In this manner, the first and fourth ports 381, 384 are both, separately, in communication with each of the second and third ports 382, 383 (with the particular one of the second and third ports 382, 383 then determined by the positioning of the corresponding gates 379, 380).

Based on this unique construction of the diverter 373, in the illustrated embodiment, upon receipt of the seeds from the first and second seed storage units 222, 324 (via the corresponding one of the first and fourth ports 381, 384), the diverter 373 is configured to selectively deliver the seeds to either the staging chamber 257 of the seed meter 220 (via the staging inlet 260) or the planting chamber 258 of the seed meter 220 (via the planting inlet 261). For instance, in the illustrated embodiment, the first port 381 of the diverter 373 is coupled to the delivery funnel 371 for receiving seeds from the first seed storage unit 222 and the fourth port 384 is coupled to the delivery tube 372 for receiving seeds from the second seed storage unit 324. In addition, the second port 382 of the diverter 373 is coupled to the staging inlet 260 of the seed meter 220 at the staging chamber 257, and the third port 383 is coupled to the planting inlet 261 of the seed meter 220 at the planting chamber 258. Thus, based on the positioning of the gates 379, 380 within the diverter 373 (as described above), seeds can be selectively delivered from the first and second seed storage units 222, 324 through the diverter 373 to the desired one of the chambers 257, 258 of the seed meter 220. With that said, it should be appreciated that the second and third ports 382, 383 of the diverter 373 may be coupled to other chambers of the seed meter 220 as desired. For example, one of the second and third ports 382, 383 may be coupled to the evacuation chamber 259 to allow for clearing the system of seeds if needed. Similarly, one of the second and third ports 382, 383 (or a an additional port of the diverter 373) may be coupled directly to the planting tube 266 of the planting unit 206 to allow for quick planting of seeds (without metering) for planting seeds on hill plots, etc.

As described, the illustrated diverter 373 includes the four ports 381-384. In various other embodiments, the diverter 373 may include fewer than four ports or more than four ports. For example, in one exemplary embodiment, the diverter 373 may include the first and fourth ports 381, 384 coupled to the first and second seed storage units 222, 324 (as described above). The diverter 373 may then include the second and third ports 382, 383 coupled to the staging chamber 257 and the planting chamber 258 (as described above). Then, in this embodiment, the diverter 373 may further include a port coupled to the evacuation chamber 259 (e.g., for clearing seeds from one or more receptacles of the first seed storage unit 222, for clearing seeds from the container 336 of the second seed storage unit 324, etc.) and/or a port coupled directly to the planting tube 266 (bypassing the seed meter 220) (e.g., for facilitating planting spurts of the seeds on hill plots, etc.). In this manner, the diverter 373 is configured to direct seeds from any of the storage units 222, 324 (or from any other storage unit(s) potentially used with the planter 200 and/or planting unit 206) to any desired destination at the planting unit 206 for subsequently processing the seeds (be it to the seed meter 220 or the planting tube 266, etc.).

Again, while the diverter 373 of this embodiment is described as including the gates 379, 380 to selectively direct seeds through the diverter 373, it should be appreciated that other means may be used in other embodiments to similarly direct the seeds. For example, in at least one embodiment, forced air (via air nozzles similar to nozzle 374) may be used to direct seeds through the diverter 373 instead of (or in place of) the gates 379, 380 (e.g., where each of the gates may be replaced by an air nozzle, etc.). In such embodiments, a puff or surge of air from the air nozzles may be applied at about a ninety-degree angle relative to the path of the seeds to thereby push the seeds toward the desired one of the ports 382, 383.

In operation of the planter 200 (which is substantially similar to the operation described above), the seed rack 226 for each of the planting units 206 is again loaded with seed receptacles filled with selected seeds. And, once all of the desired seed receptacles are loaded, the seed rack 226 is positioned in the first seed storage unit 222 of the planting unit 206 (on the indexer 228). Similarly, the container 336 of the second seed storage unit 324 is loaded with selected seeds (again, either on-site or off-site), and then, at the location where the seeds are to be planted (or prior), is positioned in the second seed storage unit 324 of the given planting unit 206 via selective pivoting movement of the brace 340 (e.g., such that the spout 339 of the container 336 is in communication with the nest 338, etc.).

Once the desired seeds are loaded, the planter 200 (and planting unit 206) is/are then positioned in a field in preparation for traversing the field to plant plots of the different kinds of the seeds (from the first and second seed storage units 222, 324 of each of the planting units 206). In so doing, in this example, the control system 208 associated with the planter 200 is configured to operate the first and second seed storage units 222, 324 in conjunction with the diverter 373 and the seed meter 220 to plant a particular combination of the seeds from the first seed storage unit 222 and the second seed storage unit 324 in a plot (e.g., in accordance with a planting plan, etc.).

To initiate the planting operation in this example (as the planter 200 begins moving), the control system 208 is configured (for a given one of the planting units 206) to incrementally, or stepwise, rotate the drum 253 of the seed meter 220, relative to the housing 252 as described above, and position the upper opening 255 of a first seed pocket 254 adjacent the staging inlet 260 (e.g., within the staging chamber 257 and in a seed loading position, etc.). In addition, the control system 208 is configured to actuate a select one of the doors 225 of the first seed storage unit 222 to thereby release the desired seeds from the queue 223 to the funnel 229. In turn, the funnel 229 directs the seeds to the delivery funnel 371 and the first port 381 of the diverter 373 (see, also, FIG. 28A). Here, because the planting operation is starting, and because the planter 200 is at the beginning of the given plot, the control system 208 is configured to position the first gate 379 of the diverter 373 (as located within the flow route 385 of the diverter 373) (via the actuator 387) to block access (and a corresponding path) to the third port 383. As such, the seeds pass through the diverter 373, along the flow route 385, from the first port 381 to the second port 382, where they then move into the staging chamber 257 of the seed meter 220 via the staging inlet 260. And, the seeds are then delivered into the first seed pocket 254 of the drum 253.

The control system 208 is configured to next rotate the drum 253 and position the first seed pocket 254 (with the seeds disposed therein) adjacent the seed disc 263 of the seed separator portion 251 of the seed meter 220 (within the planting chamber 258 in a seed planting position, etc.) in the manner described with reference to FIGS. 2-21, whereby the seeds are planted via the planting tube 266. This rotation also positions a subsequent one of the seed pockets 254, i.e., a second seed pocket 254, adjacent the staging inlet 260 (e.g., in the staging chamber 257, etc.). In this example, the planting plan again requires seed from the bulk supply be planted next (adjacent the plot just planted). As such, the control system 208 is configured to actuate the sluice plates 341, 342 of the second seed storage unit 324 (as generally described above) to thereby release seeds from the container 336 to the delivery tube 372 (via outlet 331). In turn, the delivery tube 372 directs the seeds to fourth port 384 of the diverter 373 (see, also, FIG. 28B). Here, because the planting operation is starting with regard to the seeds from the bulk supply, the control system 208 is further configured to position the second gate 380 of the diverter 373, within the flow route 386, to block access (and a corresponding path) to the third port 383. As such, the seeds from the bulk supply pass through the diverter 373, along the flow route 386, from the fourth port 384 to the second port 382, where they then move into the staging chamber 257 of the seed meter 220 via the staging inlet 260 (and are received in the second seed pocket 254 of the drum 253).

At this point in the operation, with the first seed pocket 254 of the drum 253 positioned at the planting chamber 258, if the seed level in the pocket 254 falls below a predefined level or threshold, the level sensor 292 is configured to notify the control system 208 whereby the control system 208 is configured to direct additional seeds from the first seed storage unit 222 (of the same type being planted) to the planting chamber 258. In so doing, the desired (identified) seeds are released from the first seed storage unit 222 to the funnel 229, and the funnel 229 directs the seeds to the delivery funnel 371 and on to the diverter 373 (via the first port 381). Here, though, because the planting operation has already started, and because the subsequent seeds are needed to continue and complete the current planting operation, the control system 208 is configured to position the first gate 379, within the flow route 385 of the diverter 373, to block access (and a corresponding path) to the second port 382 (see, also, FIG. 28C). As such, the subsequent seeds pass through the diverter 373, along the flow route 385, from the first port 381 to the third port 383, where they then move directly into the planting chamber 258 of the seed meter 220, via the planting inlet 261 (such that planting can immediately continue with the subsequent seeds without further movement of the drum 253, etc.).

Next in this example, once the stipulated number of seeds are parsed from the first seed pocket 254 by the seed disc 263 to complete the given plot, the control system 208 is configured to rotate the drum 253 and position the first seed pocket 254 in the evacuation chamber 259 of the seed meter 220 (e.g., in an evacuation position, etc.) to remove any remaining seeds therefrom. This movement further positions a subsequent one of the seed pockets 254, i.e., a third seed pocket 254, in the staging chamber 257. And, in this example (according to the planting plan), seeds from another seed receptacle in the first seed storage unit 222 are released to staging chamber 257 of the seed meter 220, for receipt in the third seed pocket 254 (in the same manner as described above). Further, the second seed pocket 254 moves to the planting chamber 258, whereby the seeds from the bulk supply contained in the second seed pocket 254 are presented to the seed disc 263 (in the same manner as described above) for planting. Again, the level sensor 292 is configured to monitor the level of the seeds in the planting chamber 258 and, if the seed level falls below the predefined level, the level sensor 292 is configured to notify the control system 208 whereby the control system 208 can direct additional seeds from the second seed storage unit 324 to the planting chamber 258 for planting. In particular, when such a notification is received from the level sensor 292 with regard to the seeds from the bulk supply, the control system 208 is configured to actuate the sluice plates 341, 342 of the second seed storage unit 324 to thereby release additional seeds from the container 336 to the delivery tube 372. In turn, the delivery tube 372 directs the seeds to the fourth port 384 of the diverter 373. Here, though, because the planting operation has already started, and because the subsequent seeds are needed to continue/complete the current planting operation, the control system 208 is configured to position the second gate 380 of the diverter 373 to block access (and a corresponding path) to the second port 382 along the flow route 386 (see, also, FIG. 28D). As such, the subsequent seeds from the bulk supply pass through the diverter 373, along the flow route 386, from the fourth port 384 to the third port 383, where they then move directly into the planting chamber 258 of the seed meter 220, via the planting inlet 261 (bypassing the staging chamber 257).

FIGS. 29-31B illustrate another example embodiment of a second seed storage unit 424 that may be used in a planting unit 206 of the planter 200 described above with reference to FIGS. 2-21 (e.g., as a bulk seed storage unit thereof, etc.) (with like reference numbers in the following description referring to like parts in FIGS. 2-21). In this embodiment, the seed storage unit 424 is again configured to couple to the planting unit 206 (via a support 437 thereof) at a generally forward location of the planting unit 206 (and generally forward of the first seed storage unit 222, and apart from the indexer 228) (e.g., to a frame portion of the planting unit 206, etc.). In connection therewith, the second seed storage unit 424 may be usable with the diverter 373 described above with reference to FIGS. 22-28D.

In general, the second seed storage unit 424 of this embodiment is similar to the second seed storage units 224, 324 described above. For example, the storage unit 424 of this embodiment again generally includes a container 436 configured to hold the bulk supply of seeds therein, and the support 437 configured to releasably hold the container 436 on the planting unit 206. In particular, the support 437 includes a nest 438 configured to receive a dispensing spout 439 of the container 436 (when the container 436 is coupled thereto) and a moveable brace 440 configured to secure/retain the container 436 in the support 437. As such, the container 436 may be selectively removed from the support 437 (via pivoting movement of the brace 440 upward relative to the container 436) in order to receive the bulk supply of seeds therein, and then, once filled, re-coupled to the support 437. In so doing, the dispensing spout 439 of the container 436 is generally aligned with the nest 438, and the brace 440 is then positioned back over the container 436 to retain the container 436 in the support 437.

In this embodiment, the dispensing spout 439 of the container 436 includes a moveable slide 441 configured to selectively move between a closed position in which the slide 441 inhibits movement of seeds from out of the container 436 through the spout 439, and an open position in which the slide uncovers an opening of the container 436 and releases the seeds from the container 436. In addition in this embodiment, the support 437 includes an actuator 494 configured to transfer seeds released from the container 436 to the seed meter 220 of the planting unit 206 (broadly, means for portioning the seeds from the container 436).

Figure 31A:
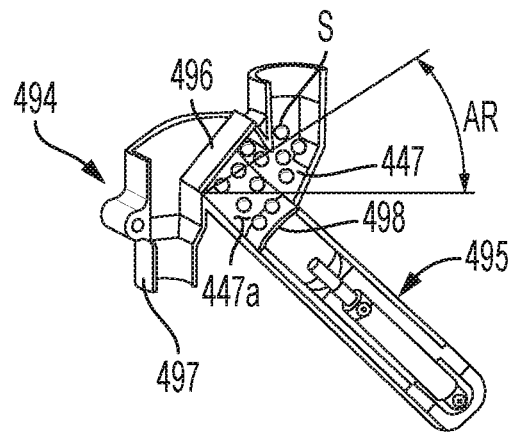
FIGS. 31A-31B are perspective views of an actuator of the second seed storage unit of FIG. 29 suitable for use in dispensing seeds from a container of the second seed storage unit.
Figure 31B:
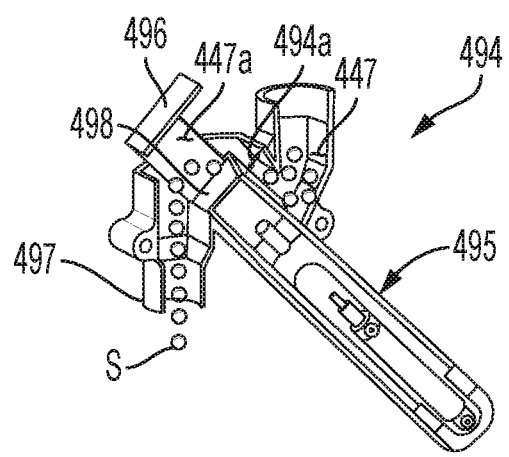

As best shown in FIGS. 31A-31B, the actuator 494 of the second seed storage unit 424 includes (or defines) a staging cavity 447 in communication with the container 436 (when the container 436 is coupled to the support 437 and when the slide 441 is in the open position), and configured to receive and hold seeds (indicated as S in FIGS. 31A and 31B) from the container 436. The actuator 494 also includes a piston 495 (or plunger, or pulser, etc.) configured to move relative to the staging cavity 447 between a holding position and a dispensing position. In the holding position (FIG. 31A), a dispensing cavity 447a defined between a cap 496 and a base 498 of the piston 495 is positioned adjacent the staging cavity 447 so that seeds from the container 436 can be received into the dispensing cavity 447a (via the staging cavity 447). An angle of repose AR (e.g., the steepest angle that a seed will form, etc.), along with the cap 496, generally inhibits movement of the seeds from the staging cavity 447 to an outlet 497 of the actuator 494 (e.g., without crushing or pinching the seeds, etc.). In the dispensing position (FIG. 31B), the cap 496 of the piston 495 extends away from the staging cavity 447 (via movement of the piston 495) while a base 498 of the piston 495 pushes the seeds received into the dispensing cavity 447a to the outlet 497 (and into a delivery tube 472 coupled thereto, for example, for transport to the diverter 373 and seed meter 220 (via gravity, compressed air, etc.)). A gap 494a is defined adjacent the staging cavity 447 (and generally above the piston 495) to allow flow of air and/or water through the gap 494a when the piston 495 is in the dispensing position, as desired (e.g., during dispensing of the seeds to help inhibit the piston 495 from clogging (based on dirt, debris, etc. flowing out of the container 436 with the seeds), to help avoid pinching or crushing the seeds during movement of the piston 495, etc.). And, the angle of repose AR again generally inhibits unwanted movement of additional seeds from the staging cavity 447 to the outlet 497 of the actuator 494 (e.g., without crushing or pinching the seeds, etc.). Then, when the piston 495 returns to the holding position, the dispensing cavity 447a moves back into position adjacent the staging cavity 447 for receiving additional seeds from the container 436. With that said, it should be appreciated that the staging cavity 447 and the dispensing cavity 447a of the actuator 494 may hold any desired number (or volume) of seeds released from the container 436 (the same or different) prior to releasing (and portioning) the seeds to the seed meter 220 (e.g., about 100 seeds, about 50 seeds, about 1,000 seeds, etc.).

Further, in this embodiment, the dispensing spout 439 of the container 436 is provided, generally, in the form of a lid or cover that is removable from the container 436 (e.g., via a threaded connection, via snap-fit connection, etc.) to allow for filling the container 436 with the bulk supply of seeds. In other example embodiments, though, the dispensing spout 439 may be formed integral with the container 436, and the container 436 may then include other openings, doors, etc. to facilitate filling the container 436 with the bulk supply of seeds.

Figure 32:
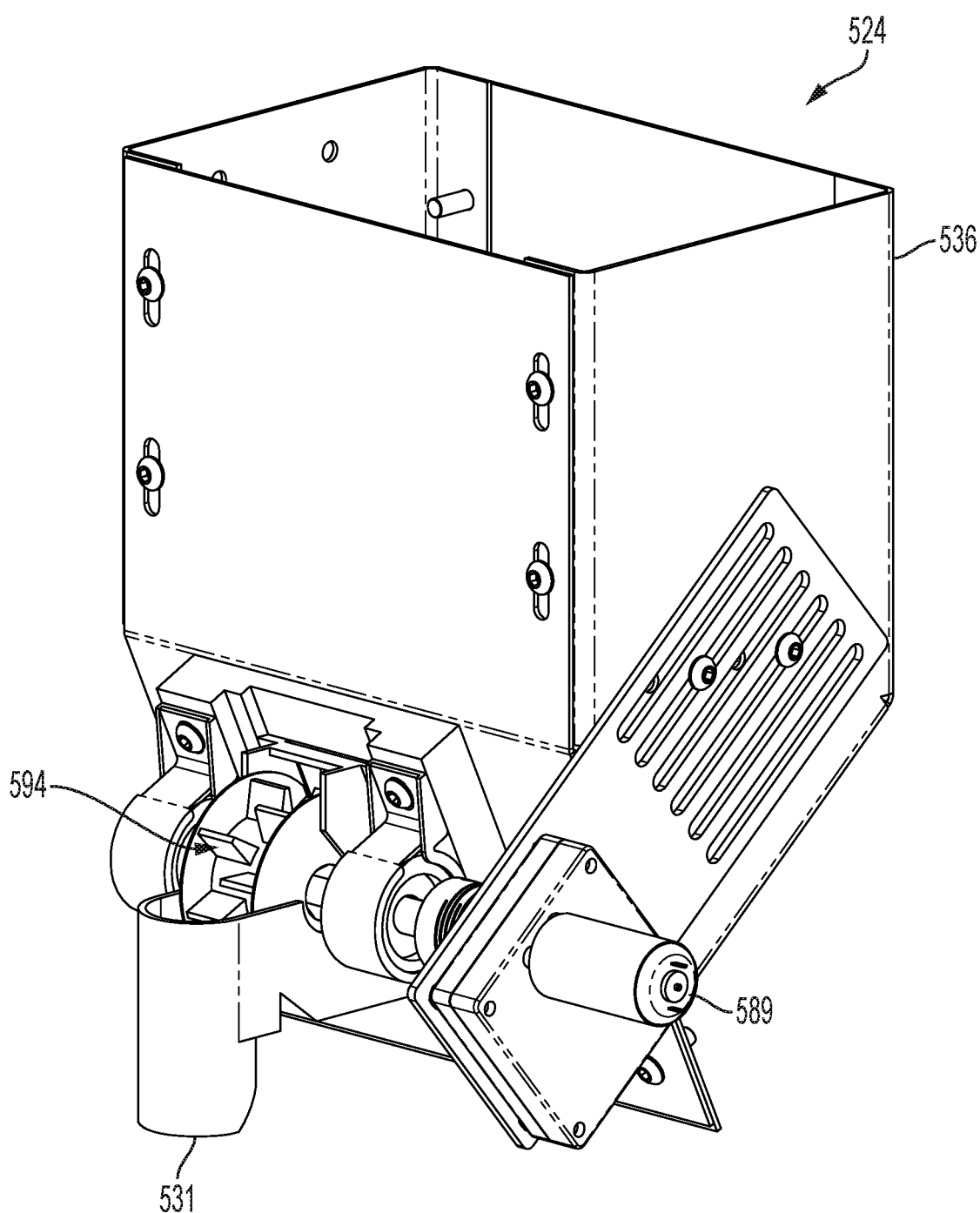
FIG. 32 is a perspective view of another example embodiment of a second seed storage unit suitable for use in the planter of FIG. 2.
Figure 33:
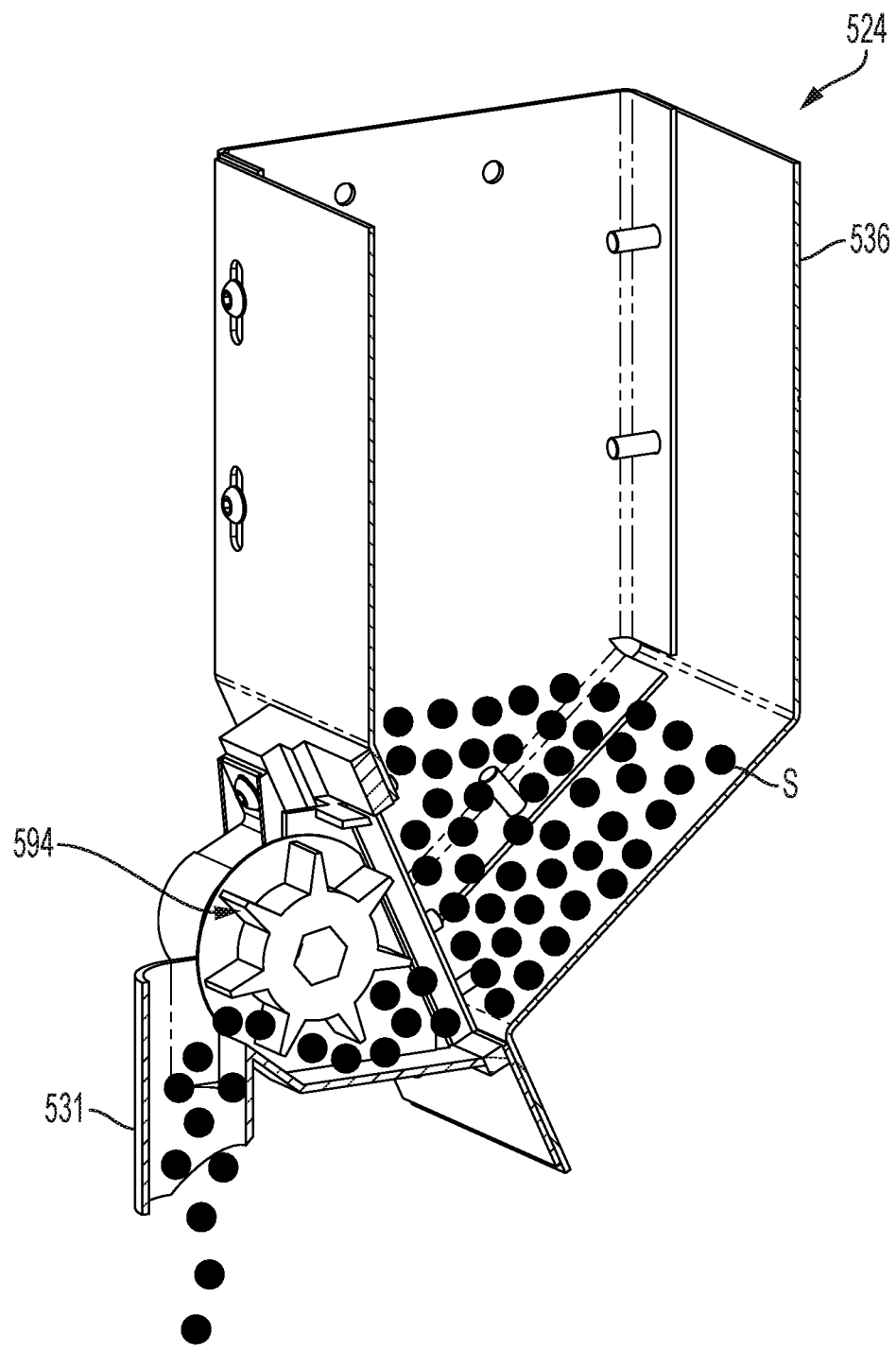
FIG. 33 is a fragmentary perspective view of the second seed storage unit of FIG. 32.

FIGS. 32 and 33 illustrate still another example embodiment of a second seed storage unit 524 that may be used in a planting unit 206 of the planter 200 described above with reference to FIGS. 2-21 (e.g., as a bulk seed storage unit thereof, etc.). In connection therewith, the seed storage unit 524 may be located as desired on the planting unit 206, for example, generally above the first seed storage unit 222 (and mounted on the indexer 228), or generally toward a forward portion of the planting unit 206 (and generally forward of the first seed storage unit 222, and apart from the indexer 228).

With that said, the second seed storage unit 524 of this embodiment is provided generally in the form of a motorized seed feeder. In particular, the seed storage unit 524 generally includes a hopper 536 (broadly, a container) for holding the bulk seeds, and a feed wheel 594 (having teeth, paddles, etc.) (broadly, an actuator) in communication with the hopper 536 for portioning the seeds from the hopper 536 (via operation of motor 589). As such, in operation of the seed storage unit 524, the motor 589 is configured to rotate the feed wheel 594 (generally in a clockwise direction in FIG. 33). And, in turn, as the feed wheel 594 rotates, it pushes seeds (indicated S in FIG. 33) from the hopper 536 (via an opening in the lower portion of the hopper 536) to an outlet 531 (which may then be coupled to any of the delivery tubes 272, 372, 472 described herein for directing the seeds to one of the diverters 273, 273 (e.g., depending on a location of the second seed storage unit 524 on the planting unit, etc.)). The motor 589 may rotate the feed wheel 594 at any desired speed or rate (be it a constant speed or rate, or a variable seed or rate), such that the seed storage unit 524 may dispense seeds to the seed meter 220 of the planting unit 206 constantly (at a constant volume) or variable (at a variable volume) (e.g., based on motor speed, run time, etc.).

In connection therewith, the second seed storage unit 524 of this embodiment may be used to generally meter (and singulate) seeds from the second seed storage unit 524 (via the motor 589 and the feed wheel 594). As such, in various operations of the planter 200 (and the planting units 206 including the second seed storage unit 524) where seeds are directed from the second seed storage unit 524 to the planting tube 266 (and bypassing the seed meter 220), the second seed storage unit 524 may allow for dispensing the seeds therefrom generally one-by-one (instead of in spurts). As such, in this embodiment, singulation of the seeds from the second seed storage unit 524 may still be achieved for planting (directly via the planting tube 266), even when the seeds do not pass through the seed meter 220 (i.e., when they bypass the seed meter 220).

With that said, it should be appreciated that other means for portioning (e.g., measuring, metering, etc.) seeds from a second seed storage unit (e.g., from a bulk seed storage unit, etc.) may be used in the planter 200 within the scope of the present disclosure (e.g., other than volumetric chambers such as cavities 247, 447, etc.). As an example, one or more optical sensors may be positioned adjacent a container of the second seed storage unit and configured to count a number of seeds released from the container. In so doing, an actuator (e.g., a stepper motor, etc.) may be employed to open the container and allow seeds to flow past the one or more optical sensors and, when the sensors indicate that the desired number of seeds have been released, the actuator may be employed to close the container. As another example, a seed meter (e.g., such as one available from Gandy Company, etc.) may be positioned adjacent a container of the second seed storage unit and configured to count a number of seeds released from the container. In so doing, again, an actuator may be employed to open the container and allow seeds to flow into the seed meter and, when the seed meter indicates that the desired number of seeds have been released, the actuator may be employed to close the container. As can be appreciated, this use of the seed meter may help ensure that only the number of bulk seeds required for planting are actually released and/or delivered from the second seed storage unit (as opposed to always drawing the same number and/or volume of seeds from the second seed storage unit regardless of the planting requirements).

As such, the second seed storage unit may employ various different means for portioning seeds therefrom including, for example, means (e.g., cavities, etc.) for portioning fixed numbers and/or volumes of seeds (e.g., such that the same number and/or volume of seeds is portioned from the second seed storage unit each time, etc.), and means (e.g., seed meters, sensors, etc.) for portioning variable numbers/volumes of seeds (e.g., such that a same number and/or volume of seeds may be metered from the second seed storage unit each time or such that a different number and/or volume of seeds may be metered from the second seed storage unit, etc.), all within the scope of the present disclosure.

Figure 34:
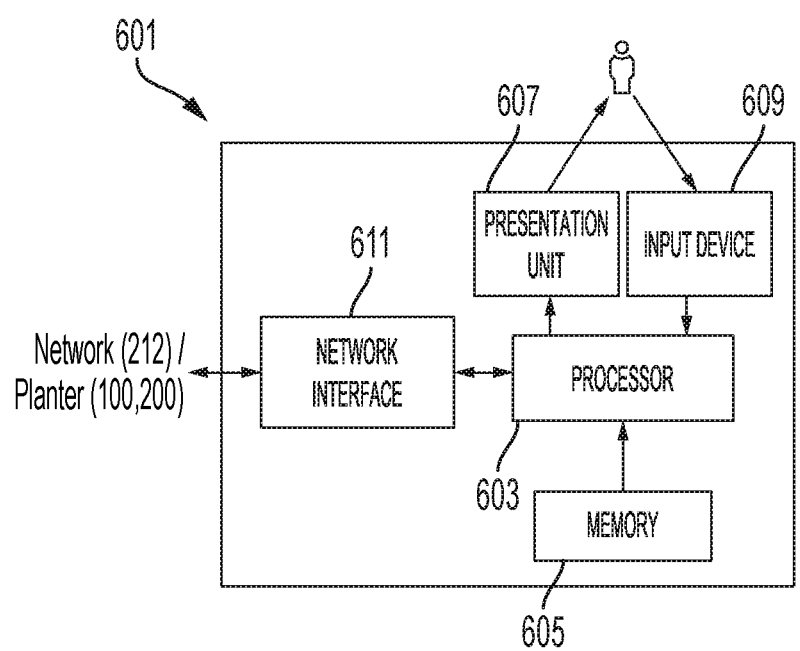
FIG. 34 is a block diagram of a computing device that may be used in the example arrangement of FIG. 20.

FIG. 34 illustrates an example computing device 601 that can be used in connection with the planters 100, 200 and the control systems 108, 208 described herein. The computing device 601 may include, for example, one or more servers, workstations, personal computers, laptops, tablets, smartphones, etc. In addition, the computing device 601 may include a single computing device, or it may include multiple computing devices located in close proximity or distributed over a geographic region, so long as the computing devices are specifically configured to function as described herein. In the example embodiments herein, each of the planters 100, 200 and the control systems 108, 208 may be considered as including and/or being implemented in at least one computing device consistent with computing device 601. However, the present disclosure should not be considered to be limited to the computing device 601, as described below, as different computing devices and/or arrangements of computing devices and/or arrangement of components associated with such computing devices may be used.

Referring to FIG. 34, the example computing device 601 includes a processor 603 and a memory 605 coupled to (and in communication with) the processor 603. The processor 603 may include one or more processing units (e.g., in a multi-core configuration, etc.). For example, the processor 603 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 605, as described herein, is one or more devices that permit data, instructions, etc., to be stored therein and retrieved therefrom. The memory 605 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 605 may be configured to store, without limitation, planting plans, planting maps, the various data (and/or corresponding data structures) described herein. Furthermore, in various embodiments, computer-executable instructions may be stored in the memory 605 for execution by the processor 603 to cause the processor 603 to perform one or more of the functions described herein (e.g., in connection with operation of the planters 100, 200, etc.), such that the memory 605 is a physical, tangible, and non-transitory computer readable storage media. Such instructions often improve the efficiencies and/or performance of the processor 603 and/or other computer system components configured to perform one or more of the various operations herein. It should be appreciated that the memory 605 may include a variety of different memories, each implemented in one or more of the functions or processes described herein.

In the example embodiment, the computing device 601 also includes a presentation unit 607 that is coupled to (and is in communication with) the processor 603 (however, it should be appreciated that the computing device 601 could include output devices other than the presentation unit 607, etc.). The presentation unit 607 outputs information to users of the computing device 601 as desired. And, various interfaces (e.g., as defined by network-based applications, etc.) may be displayed at computing device 601, and in particular at presentation unit 607, to display such information. The presentation unit 607 may include, without limitation, a liquid crystal display (LCD), a light-emitting diode (LED) display, an organic LED (OLED) display, an "electronic ink" display, speakers, etc. In some embodiments, the presentation unit 607 may include multiple devices.

In addition, the computing device 601 includes an input device 609 that receives inputs from the users of the computing device 601. The input device 609 may include a single input device or multiple input devices. The input device 609 is coupled to (and is in communication with) the processor 603 and may include, for example, one or more of a keyboard, a pointing device, a mouse, a touch sensitive panel (e.g., a touch pad or a touch screen, etc.), another computing device, and/or an audio input device. Further, in various example embodiments, a touch screen, such as that included in a tablet, a smartphone, or similar device, may behave as both the presentation unit 607 and the input device 609.

Further, the illustrated computing device 601 also includes a network interface 611 coupled to (and in communication with) the processor 603 and the memory 605. The network interface 611 may include, without limitation, a wired network adapter, a wireless network adapter, a mobile network adapter, or other device capable of communicating to one or more different networks, including the network 212, the planters 100, 200, and/or the GPS receiver 110. In some example embodiments, the computing device 601 may include the processor 603 and one or more network interfaces incorporated into or with the processor 603.

In view of the above, in some implementations, the planters of the present disclosure may be used in (or in association with) breeding programs (e.g., to plant test plots, etc.) and, in connection therewith, may enable the freedom to make adjustments and fine tuning of breeding pipelines in ways that were previously unfeasible (based on the ease of switching between different ones of the seed storage units "on the fly" allowed by the diverters described herein).

In addition, the planters of the present disclosure may be used to plant fields without alleys or with different arrangements (or patterns) of alleys so that the planted environments may more closely represents those in which customers will use the seeds (i.e., how customers will actually plant their fields with the given seeds). The planters of the present disclosure may also be used to plant plots in fields with boundaries defined between and/or around the plots anywhere (based on the ease of switching between different ones of the seed storage units "on the fly," as allowed by the diverters described herein). Thus, through use of the planters herein, boundaries between/around plots may be defined anywhere (i.e., rows of seeds can be planted with alleys, without alleys, with check plants (e.g., from seeds in bulk storage units, etc.), without check plants, and any iteration thereof, etc.). What's more, in some instances, "check plants" (e.g., based on seeds from the second seed storage units (or bulk storage units), etc.) may be planted in those spaces instead (i.e., in the spaces where alleys may traditionally be located). The habit of these check plants is sufficiently conspicuous that humans or algorithms can be taught to recognize, thereby serving as reliable markers of the boundaries between test plots. The planters described herein make switching to this planting scheme (e.g., planting fields without alleys, etc.) much easier and more efficient.

Figure 35:
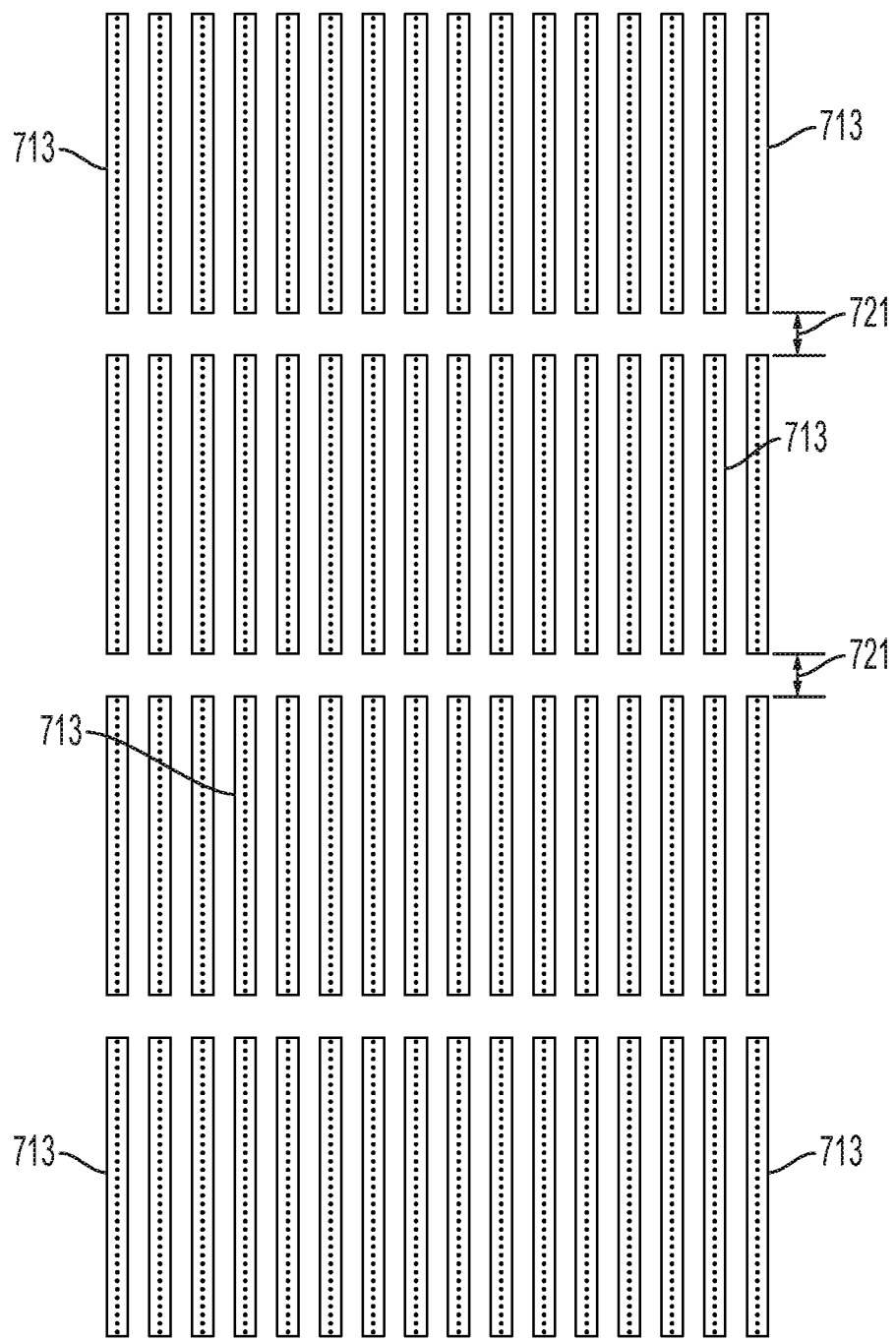
FIGS. 35-38 illustrate different example patterns and configurations of plots of seeds capable of being planted by the planter of FIG. 2.
Figure 36:
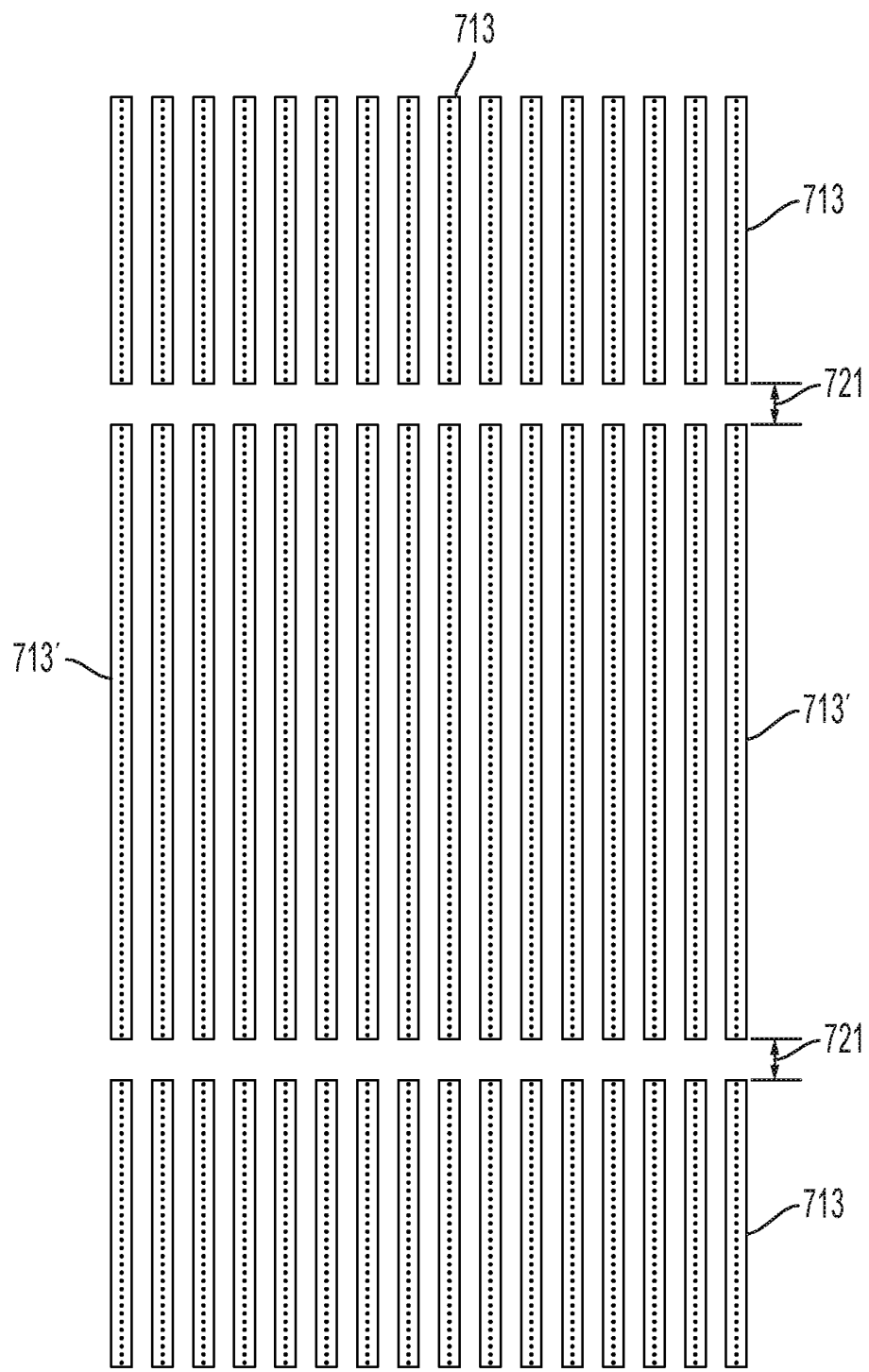
Figure 37:
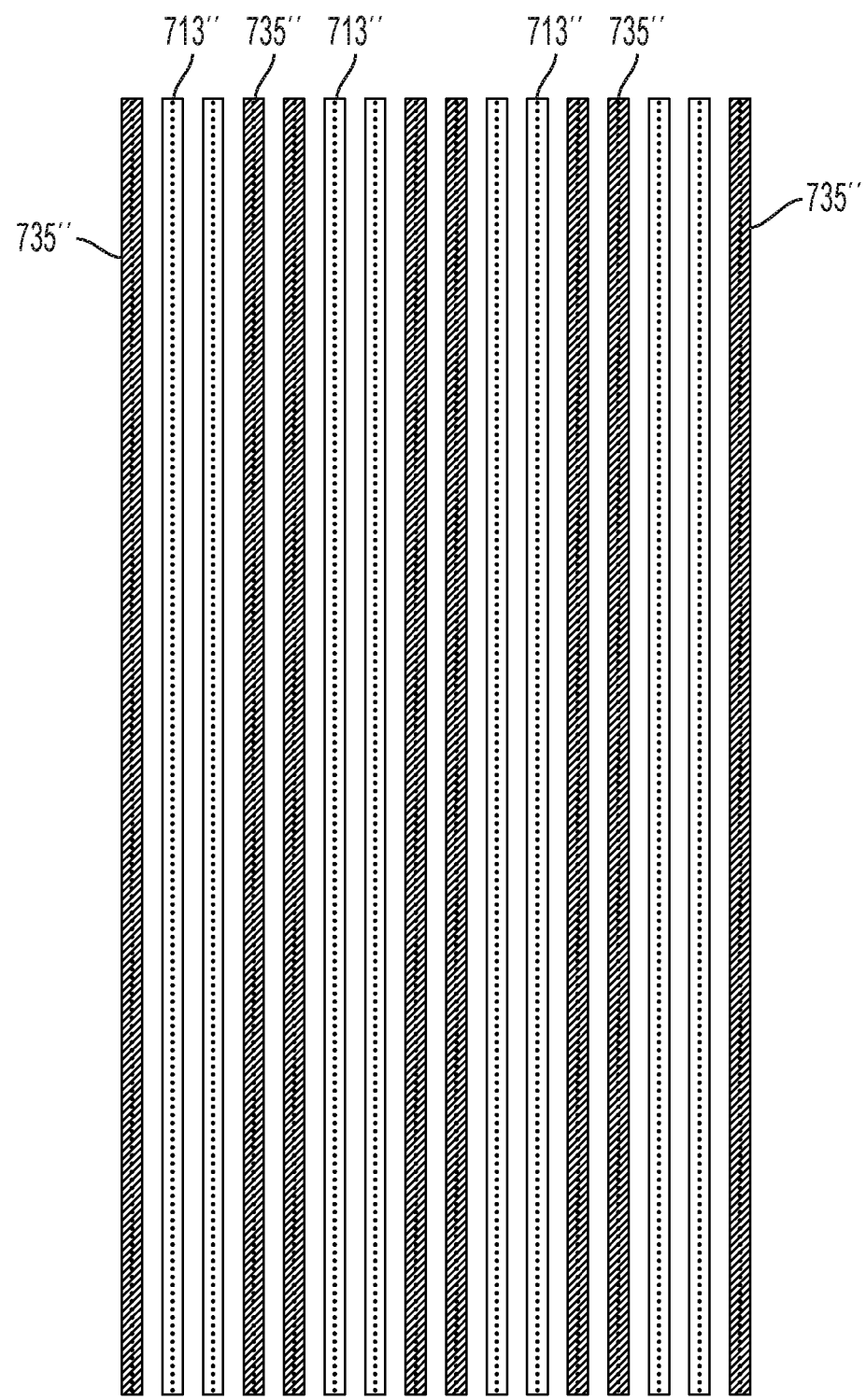
Figure 38:
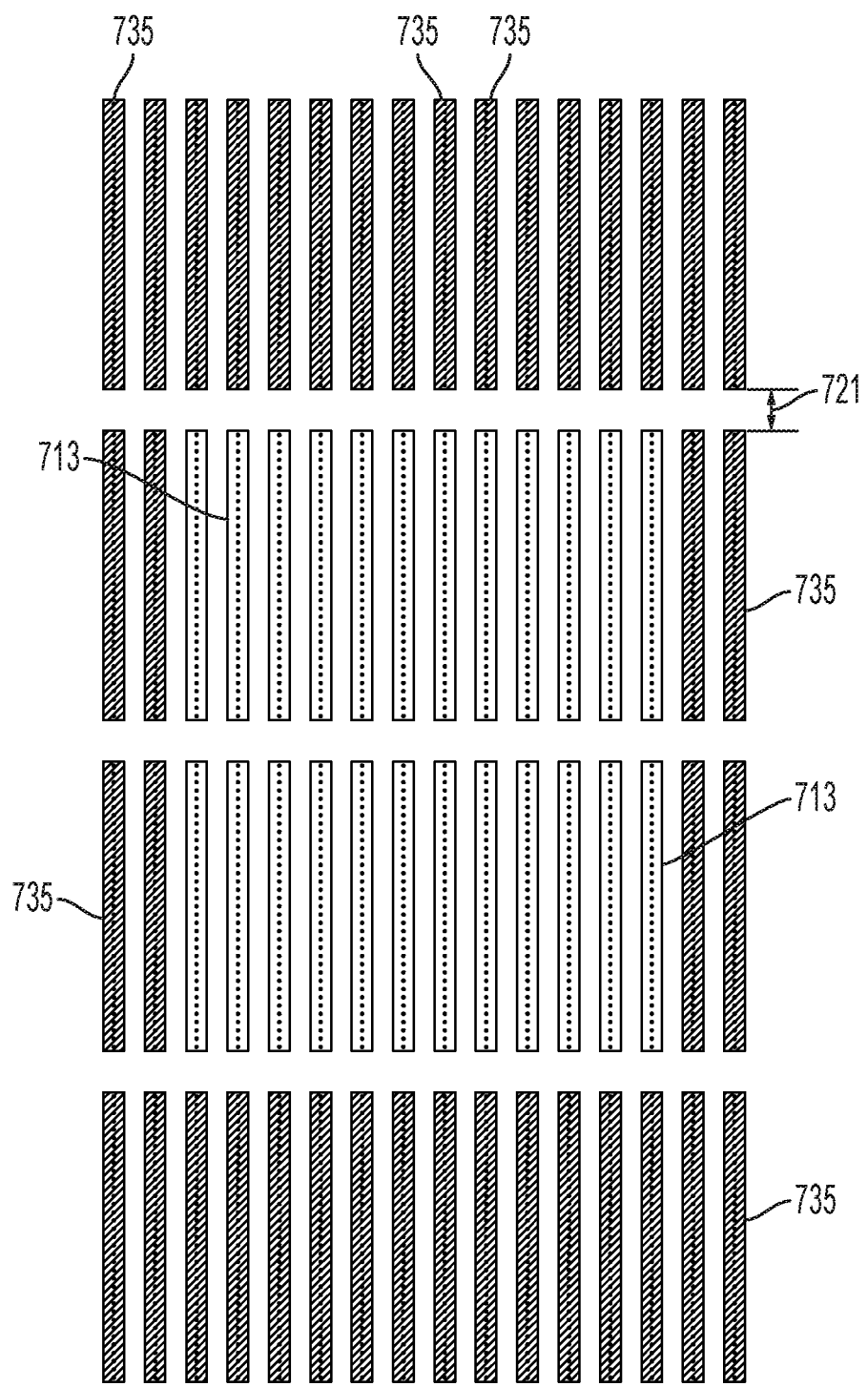

Previously, in planting test plots in fields, researchers have been limited to planting seeds to be tested (e.g., seeds from first seed storage units, etc.) in grid patterns, wherein alleys between the plots then all line up (e.g., where the alleys are formed when seeds are advanced in seed meters of the planters from staging chambers to planting chambers, etc.). This is shown in FIG. 35, illustrating a field with multiple plots 713 of seeds planted from a first seed storage unit of a planter and separated by alleys 721. Because of the unique operation of the diverters described herein, all or some of such alleys 721 can be removed from the field and instead planted "on the fly" with additional seeds from the first or second seed storage units (wherein at least some of the plots would no longer need be laid out in a grid fashion to keep track of them but can instead be any desired length and/or orientation). In connection therewith, FIG. 36 illustrates a field having multiple traditional test plots 713 of seeds planted from the first seed storage unit (all having a shorter length), along with multiple plots 713' of seeds planted from the first seed storage unit (all having a longer length) where a row of alleys has been removed for the plots 713' (in accordance with the present disclosure, and as compared to the plots 713). In so doing, the test plots 713' have instead been planted at longer lengths than the traditional test plots 713 (e.g., by combining multiple receptacles of seeds from the first seed storage units and dropping them in sequence to the diverters for routing to planting chambers of the seed meters of the planters, etc.). As such, the planters herein allow for standard plot configurations (e.g., FIG. 35, etc.) to be mixed with long strip trials (e.g., FIG. 36, etc.). Further, FIG. 37 illustrates a field having multiple plots 713" of seeds planted from the first seed storage unit, where all alleys have been removed for the plots 713" (in accordance with the present disclosure). In addition, multiple plots 735" of seeds planted from a second seed storage unit of the planter are planted together with the seeds planted from the first seed storage units. And, FIG. 38 illustrates a field having multiple traditional length plots 713 of seeds planted from a first seed storage unit of a planter herein and multiple traditional length plots 735 of seeds planting from a second seed storage unit of the planter. In so doing, the plots 735 are provided generally around the plots 713 as borders (e.g., via operation of the planter to plant different seeds via different ones of its planting units during a pass through the field, etc.).

As can thus be seen, the planters herein allow for near continuous planting of seeds from both the first and second seed storage units in a variety of different patterns, and with or without alleys. They also may also be used to plant fields with boundaries between and/or around plots defined anywhere (based on the ease of switching between different ones of the seed storage units "on the fly" allowed by the diverters described herein).

The planters of the present disclosure may also allow for postponing decisions about which particular types of seeds to plant at certain locations in the fields until the planters actually reach those points in the fields (again, based on the ease of switching between different ones of the seed storage units "on the fly" allowed by the diverters described herein). As can be appreciated, this provides flexibility in planting over the conventional prescription-based planting plans (where receptacles of first seed storage units are filled with seeds based on the given planting plans, and the plans are then locked in place). For example, an initial planting plan may indicate that seeds from one particular receptacle of the first seed storage unit are to be planted at a certain location in a field (e.g., in short plots of 10-30 plants of the same genotype, etc.). However, in one instance, when the planter reaches that location, information may be provided to the planter (via one or more sensors mounted to or remote from the planter and in communication with the planter (either directly or via a network connection), via artificial intelligence in communication with the planter, etc.) indicating that additional seeds (from one or more additional receptacles of the first seed storage unit having seeds with the same genotype (or seeds with different genotypes)) should also be planted in the field at the location (e.g., in longer plots of hundreds of plants, etc.). The additional seeds may then be directed to planting units of the planter as desired (e.g., to a particular chamber of the seed meter or directly to a planting tube via the diverter, etc.). In still another instance, when the planter reaches the location, information may be provided to the planter (via one or more sensors in communication with the planter, or otherwise) indicating that the location is unsuitable for the seeds from the first seed storage unit for some reason (e.g., a drone with a moisture sensor may indicate that the location was a flood zone and would not be suitable for test seeds, etc.). Here, the planter may then be configured to remap the planting plan and direct seeds from the second seed storage unit to the diverter and, for example, directly to the planting tube, to plant bulk seeds in the location (in order to fill the flood zone gap, for example, with check plants, etc.).

In addition, and as indicated above, the planters of the present disclosure may permit for better "alley control" during planting. In general, during conventional planting operation, when seeds are delivered to the staging chambers of seed meters, there are periods of time that the planters move forward but no seeds are planted (while the seeds are rotated from the staging chambers to the planting chambers and while seeds are wiped from the seed discs). This is typically where alleys are created, whereby such alleys then help inhibit carryover of seeds between plots. However, in some instances such alleys may not be desired. That said, in some implementations, the diverters herein enable the planters to combine the contents of different sets (or cells) of seeds from the first seed storage units directly into the planting chambers of the seed meters, thus avoiding having to rotate the seed meter, causing wiping effects, and creating undesired alleys between the two sets of seeds. What's more, in other implementations, the diverters herein enable the planters to direct seeds from the first and/or second seed storage units directly to planting tubes to allow for continuous planting at the alleys (and, again, avoiding having to rotate the seed meter and causing a wiping effect).

Further, the planters of the present disclosure may allow for mixed planting of seeds from the first seed storage units together with seeds from the second seed storage units into a single plot (i.e., mixed plots of seeds) (again, based on the ease of switching between different ones of the seed storage units "on the fly" allowed by the diverters described herein). In so doing, desired numbers and/or volumes of bulk seeds from the second seed storage units may be delivered to the seed meters and combined with seeds from the first seed storage units (e.g., in the planting chambers of the seed meters, etc.). The combined seeds may then be planted, to provide plots comprising certain percentages of bulk seeds mixed in with the seeds from the first seed storage units. These mixed plots may provide more flexible ways to produce "Refuge In a Bag" (RIB)-type planting results, which traditionally must be planned out before planting when the receptacles of the first seed storage units are being filled/prepared (whereby such RIB results may allow for a mixture of some disease (or insect) susceptible seeds/plants among otherwise tolerant seeds/plants to slow disease (or insect) evolution) (e.g., in desired percentages of each seed/plant to be planted such as five percent of one and ninety-five percent of another; ten percent of one and ninety percent of another; ten percent of one, ten percent of another, and then eighty percent of a third; fifty percent of one and fifty percent of another; etc.), or they may allow for planting a small number of "male" plants in a plot comprising mostly female plants, etc. This may also be accomplished by combining seeds from the same seed storage units, in which different seeds stored within the same seed storage units may be delivered to (and combined within) the seed meters. And, as above, the combined seeds may then be planted, to provide plots having desired percentages of each of the different seeds.

While the above description is provided in the context of planters, it should be appreciated that the present disclosure (e.g., the seed transport systems described herein, the diverters described herein, the storage units described herein, etc.) may also be applicable to directing seeds (or other small objects) from first locations to second locations in other systems. For example, the present disclosure may be applicable to seed processing lines where different types of seeds are distributed from different supplies of seeds to different containers (e.g., to cassettes, etc. in preparing for planting; etc.), prior to the containers then being transported to other machines for devices, such as planters or other seed processing devices 266 (see, e.g., Applicant's co-owned US Patent Application Publication No. US 2018/0317375 and International PCT Publication No. WO 2016/200825, the entire disclosures of which are incorporated herein by reference; etc.). In connection therewith, in some embodiments, it should be appreciated that the present disclosure may be applicable to and/or utilized in fixed and/or indoor environments, such as warehouses, laboratories, etc. whereby it is not limited to fields or planters.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments have been provided so that this disclosure will be thorough, and will fully convey the scope to those who are skilled in the art. Numerous specific details are set forth such as examples of specific components, assemblies, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, components, and/or groups thereof, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" and the phrase "at least one of" includes any and all combinations of one or more of the associated listed items.

Although the terms first, second, third, etc. may be used herein to describe various elements, components, seeds, members and/or sections, these elements, components, seeds, members and/or sections should not be limited by these terms. These terms may be only used to distinguish one element, component, seed, member or section from another element, component, seed, member or section. Terms such as "first," "second," and other numerical terms when used herein do not imply a sequence or order unless clearly indicated by the context. Thus, a first element, component, seed, member or section discussed below could be termed a second element, component, seed, member or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A planting unit for planting plots of seeds in a field, the planting unit comprising:
   a first seed storage unit disposed onboard the planting unit and configured to provide seeds to the planting unit, the first seed storage unit including multiple storage compartments each configured to hold a seed receptacle having seeds stored therein;
   a second seed storage unit disposed onboard the planting unit and configured to provide seeds to the planting unit, wherein the second seed storage unit is separate from the first seed storage unit;
   a seed meter configured to plant seeds from the first seed storage unit and the second seed storage unit in a field; and
   a diverter coupled to the seed meter, the diverter configured to selectively direct seeds from the first seed storage unit and the second seed storage unit to the seed meter.

2. The planting unit of claim 1, wherein the second seed storage unit includes a container configured to hold the seeds stored in the second seed storage unit, the container including means to portion a predetermined number and/or volume of the seeds from the container.

3. The planting unit of claim 2, wherein the means includes at least one plate coupled to the container and configured to move relative to the container to selectively cover and uncover a spout of the container.

4. The planting unit of claim 2, wherein the means includes at least one actuator configured to move relative to the container.

5. The planting unit of claim 1, wherein the seed meter defines a staging chamber for receiving the seeds from the first seed storage unit into the seed meter and/or for receiving the seeds from the second seed storage unit into the seed meter and a planting chamber; and
   wherein the seed meter is configured to move the seeds received in the staging chamber to the planting chamber prior to planting the seeds.

6. The planting unit of claim 5, wherein the diverter includes a first port coupled to the staging chamber of the seed meter and a second port coupled to the planting chamber of the seed meter.

7. The planting unit of claim 6, wherein the diverter further includes at least one gate disposed within the diverter and configured to move relative to the diverter to selectively block either the first port or the second port.

8. The planting unit of claim 6, wherein the diverter further includes:
   a third port in communication with both the first seed storage unit and the second seed storage unit, the third port in communication with each of the first and second ports thereby defining a seed pathway between the third port and the first and second ports; and
   a gate disposed within the diverter along the seed pathway, the gate configured to move relative to the diverter to selectively block either the first port or the second port.

9. The planting unit of claim 6, wherein the diverter further includes:
   a third port coupled to the first seed storage unit, the third port in communication with each of the first and second ports thereby defining a first seed pathway between the third port and the first and second ports;
   a fourth port coupled to the second seed storage unit, the fourth port in communication with each of the first and second ports thereby defining a second seed pathway between the fourth port and the first and second ports;
   a first gate disposed within the diverter along the first seed pathway, the first gate configured to move relative to the diverter to selectively block either the first port or the second port; and
   a second gate disposed within the diverter along the second seed pathway, the second gate configured to move relative to the diverter to selectively block either the first port or the second port.

10. The planting unit of claim 5, further comprising a sensor for measuring a seed level in the planting chamber of the seed meter.

11. The planting unit of claim 1, wherein the first and second seed storage units are disposed onboard the planting unit, and wherein the second seed storage unit is disposed generally above the first seed storage unit.

12. A planter for planting multiple rows of seeds in a field, the planter comprising multiple ones of the planting units of claim 1.

13. A method of planting seeds in a field using an automated planting unit, the method comprising:
   delivering a first set of seeds from a seed storage unit to a seed meter of the planting unit through a diverter coupled to the seed meter, along a first flow path of the diverter;
   dispensing one or more of the first set of seeds from the seed meter to the field;
   moving a gate of the diverter to block the first flow path; and
   delivering a second set of seeds from the seed storage unit to a planting tube of the planting unit through the diverter, along a second flow path of the diverter bypassing the seed meter, and dispensing one or more of said second set of seeds to the field.

14. The method of claim 13, wherein the seeds of the first set and the seeds of the second set are the same type of seeds.

15. The method of claim 13, wherein the seed storage unit is a first seed storage unit; and
   wherein the method further comprises delivering a third set of seeds from a second seed storage unit, different from the first seed storage unit, to the seed meter through the diverter.

16. The method of claim 15, wherein delivering the third set of seeds from the second seed storage unit to the seed meter includes delivering the third set of seeds to the seed meter along a third flow path of the diverter; and
   wherein the method further comprises:
   moving another gate of the diverter to block the third flow path; and
   delivering a fourth set of seeds from the second seed storage unit to either the seed meter or the planting tube through the diverter, along a fourth flow path of the diverter, and dispensing one or more of said fourth set of seeds to the field.

17. A diverter for use in a planting unit configured to plant seeds in a field, the diverter comprising:
a housing;
a first port configured to receive seeds into the housing from a seed storage unit associated with the planting unit;
a second port in fluid communication with the first port along a first pathway defined by the housing, the second port configured to deliver seeds out of the housing to a seed meter of the planting unit;
a third port in fluid communication with the first port along the first pathway, the third port configured to deliver seeds out of the housing to either the seed meter or a planting tube of the planting unit;
a fourth port in fluid communication with the second port and the third port along a second pathway, the fourth port configured to receive seeds into the housing from a second seed storage unit associated with the planting unit;
a first gate disposed within the housing along the first pathway, the first gate configured to move relative to the housing to selectively block either the second port or the third port, whereby the seeds received into the housing through the first port are able to flow through the housing along the first pathway to either the second port or the third port based on a position of the first gate; and
a second gate disposed within the housing along the second pathway, the second gate configured to move relative to the housing to selectively block either the second port or the third port, whereby the seeds received into the housing through the fourth port are able to flow through the housing along the second pathway to either the second port or the third port based on a position of the second gate.

18. A method of planting seeds in a field using an automated planting unit, the method comprising:
delivering a first set of seeds from a seed storage unit to a first chamber of a seed meter of the planting unit through a diverter coupled to the seed meter, along a first flow path of the diverter;
moving a gate of the diverter to block the first flow path;
delivering a second set of seeds to a second chamber of the seed meter through the diverter, along a second flow path of the diverter; and
dispensing one or more of said first and second sets of seeds to the field, to thereby plant a mixed combination of the first and second sets of seeds in the field.

19. A planting unit for planting plots of seeds in a field, the planting unit comprising:
a first seed storage unit configured to provide seeds to the planting unit;
a second seed storage unit configured to provide seeds to the planting unit;
a seed meter configured to plant seeds from the first seed storage unit and the second seed storage unit in a field, the seed meter defining a staging chamber for receiving the seeds from the first seed storage unit into the seed meter and/or for receiving the seeds from the second seed storage unit into the seed meter and a planting chamber, and wherein the seed meter is configured to move the seeds received in the staging chamber to the planting chamber prior to planting the seeds; and
a diverter including a first port coupled to the staging chamber of the seed meter and a second port coupled to the planting chamber of the seed meter, the diverter configured to selectively direct seeds from the first seed storage unit and the second seed storage unit to either the staging chamber or the planting chamber of the seed meter.

20. The planting unit of claim 19, wherein the diverter further includes at least one gate disposed within the diverter and configured to move relative to the diverter to selectively block either the first port or the second port.

21. A planting unit for planting plots of seeds in a field, the planting unit comprising:
a first seed storage unit disposed onboard the planting unit and configured to provide seeds to the planting unit;
a second seed storage unit disposed onboard the planting unit and configured to provide seeds to the planting unit, wherein the second seed storage unit is disposed generally above the first seed storage unit;
a seed meter configured to plant seeds from the first seed storage unit and the second seed storage unit in a field; and
a diverter coupled to the seed meter, the diverter configured to selectively direct seeds from the first seed storage unit and the second seed storage unit to the seed meter.

* * * * *